(12) United States Patent
Kisliakov

(10) Patent No.: US 7,194,768 B2
(45) Date of Patent: Mar. 20, 2007

(54) ACCESS CONTROL FOR A MICROPROCESSOR CARD

(75) Inventor: Andrew Kisliakov, Burwood (AU)

(73) Assignee: Canon Information Systems Research Australia Pty Ltd., North Ryde (AU)

( * ) Notice: Subject to any disclaimer, the term of this patent is extended or adjusted under 35 U.S.C. 154(b) by 858 days.

(21) Appl. No.: 10/323,802

(22) Filed: Dec. 20, 2002

(65) Prior Publication Data

US 2003/0212895 A1 Nov. 13, 2003

(30) Foreign Application Priority Data

Dec. 20, 2001 (AU) .................................... PR9660
Aug. 16, 2002 (AU) .............................. 2002950930

(51) Int. Cl.
*H04L 9/32* (2006.01)
*H04K 1/00* (2006.01)

(52) U.S. Cl. ............................ 726/20; 713/189; 726/9; 726/19

(58) Field of Classification Search ...................... None
See application file for complete search history.

(56) References Cited

U.S. PATENT DOCUMENTS

| | | | | |
|---|---|---|---|---|
| 5,002,062 A | | 3/1991 | Suzuki ....................... 128/696 |
| 5,353,016 A | | 10/1994 | Kurita et al. ........... 340/825.22 |
| 5,601,489 A | | 2/1997 | Komaki ....................... 463/44 |
| 5,729,717 A | * | 3/1998 | Tamada et al. ............. 711/164 |
| 5,949,492 A | | 9/1999 | Mankovitz .................. 348/473 |
| 5,973,475 A | | 10/1999 | Combaluzier ............... 320/107 |
| 6,014,593 A | | 1/2000 | Grufman ..................... 700/136 |
| 6,229,694 B1 | | 5/2001 | Kono .......................... 361/683 |
| 6,606,707 B1 | * | 8/2003 | Hirota et al. ................ 713/172 |
| 6,721,891 B1 | * | 4/2004 | Borza ............................ 726/20 |
| 6,742,117 B1 | * | 5/2004 | Hikita et al. ................ 713/172 |
| 7,046,810 B2 | * | 5/2006 | Takada et al. .............. 380/284 |
| 2001/0017616 A1 | | 8/2001 | Kobayashi ................... 345/173 |
| 2003/0212896 A1 | * | 11/2003 | Kisliakov .................... 713/193 |

FOREIGN PATENT DOCUMENTS

| | | |
|---|---|---|
| AU | 28896/95 | 2/1996 |
| DE | 3637684 | 5/1987 |
| EP | 0 469 581 | 2/1992 |
| JP | 59-123986 | 7/1984 |
| JP | 04-88547 | 3/1992 |
| JP | U03-71329 | 6/2000 |
| WO | 95/35534 | 12/1995 |

* cited by examiner

Primary Examiner—Christopher Revak
(74) Attorney, Agent, or Firm—Fitzpatrick, Cella, Harper & Scinto

(57) ABSTRACT

A method and apparatus for executing messages using a plurality of applications resident in a memory means (276) of an electronic card (100), is disclosed. The electronic card (100) is adapted for coupling to a reader device (300) to facilitate reading of the memory means (276). The reading device (300) is configured for communication with a remote apparatus (computer 700) having a further application executing thereon. The one or more card resident applications are required to process one or more messages received from the further application. Depending on the determination, the one or more messages are executed using a first of the card resident applications if one or more predetermined criteria are met. Alternatively, the one or more messages are executed using a second of the card resident applications if one or more further criteria are met. The one or more further criteria are determined via an array containing the one or more further criteria.

13 Claims, 55 Drawing Sheets

| User Interface Element | User Interface Element Object Fields |  |  |  |  |  |
|---|---|---|---|---|---|---|
|  | Flags | X1 | Y1 | X2 | Y2 | Data |
| △ | 0x20 | 0005 | 0005 | 0006 | 0006 | xxxx |
| ▽ | 0x20 | 0005 | 0007 | 0006 | 0008 | xxxx |
| ⊙ | 0x20 | 0003 | 0006 | 0004 | 0007 | xxxx |
| ⊡ | 0x20 | 0003 | 0008 | 0004 | 0009 | xxxx |
| ▷ | 0x20 | 0005 | 0008 | 0006 | 0009 | xxxx |
| ◁ | 0x20 | 0001 | 0008 | 0002 | 0009 | xxxx |
| ▷▷ | 0x20 | 0007 | 0008 | 0008 | 0009 | xxxx |
| □ | 0x20 | 0007 | 0006 | 0008 | 0007 | 0015 |

Fig. 15(b)

| User Interface Element | User Interface Element Object Fields ||||||
|---|---|---|---|---|---|---|
| | Flags | X1 | Y1 | X2 | Y2 | Data |
| 1 | 0x20 | 0003 | 0001 | 0004 | 0002 | xxxx |
| 2 | 0x20 | 0005 | 0001 | 0006 | 0002 | 0032 |
| 3 | 0x20 | 0007 | 0001 | 0008 | 0002 | xxxx |
| 4 | 0x20 | 0003 | 0003 | 0004 | 0004 | xxxx |
| 5 | 0x20 | 0005 | 0003 | 0006 | 0004 | xxxx |
| 6 | 0x20 | 0007 | 0003 | 0008 | 0004 | xxxx |
| 7 | 0x20 | 0003 | 0004 | 0004 | 0005 | xxxx |
| 8 | 0x20 | 0005 | 0004 | 0006 | 0005 | xxxx |
| 9 | 0x20 | 0007 | 0004 | 0008 | 0005 | xxxx |
| 0 | 0x20 | 0003 | 0006 | 0004 | 0007 | xxxx |
| OK | 0x20 | 0001 | 0008 | 0002 | 000A | xxxx |
| C | 0x20 | 0003 | 0008 | 0004 | 000A | xxxx |
| CL | 0x20 | 0005 | 0008 | 0006 | 000A | xxxx |
| ◀ | 0x20 | 0007 | 0008 | 0008 | 000A | xxxx |
| ▷ | 0x20 | 0007 | 0006 | 0008 | 0007 | xxxx |
| ◁ | 0x20 | 0005 | 0006 | 0006 | 0007 | xxxx |
| △ | 0x20 | 0006 | 0005 | 0007 | 0006 | xxxx |
| ▽ | 0x20 | 0006 | 0007 | 0007 | 0008 | xxxx |

ACCESS CONTROL FOR A MICROPROCESSOR CARD

TECHNICAL FIELD OF THE INVENTION

The present invention relates generally to a control card or smart card for use with a reader device and, in particular, to access control for a microprocessor or central processing unit (CPU) smart card defining a custom user interface. The invention also relates to a computer program product including a computer readable medium having recorded thereon a computer program for implementing access control on a microprocessor card or CPU smart card defining a custom user interface.

BACKGROUND ART

Control cards, such as smart cards, as known in the relevant art are often used for security purposes such as user authentication. Most conventional control cards include some form of readable storage means such as a magnetic strip, an optical code (e.g. a bar code) or an on-board memory chip, for storing data (e.g. a personal identification number) associated with the card. Such control cards can be generically referred to as memory cards. However, control cards including a storage means in the form of an on-board memory chip are generally referred to as 'smart cards'. The data stored in the storage means is generally read by some form of terminal device, which includes a magnetic read head, for example.

One known method for authenticating a user and allowing the user access to amenities and/or services is by requesting that the user present a memory card at a point of access and then enter a personal identification number into an input device. The input device compares the entered personal identification number with data stored in the memory of the memory card to determine the validity of the entered personal identification number. Such a method suffers from the disadvantage that the input device is made aware of the configuration of the personal identification number and may be used to copy and/or reuse the personal identification number. Since users often utilise the same personal identification number to gain access to a variety of unrelated amenities and/or services, the security of these amenities and/or services can be compromised in one action through the use of an insecure input device. Thus, the input device used for reading a smart card must be secure so as not to allow a user's personal identification number to be exposed or otherwise used without the consent of the user.

Some smart cards include a microprocessor integrally formed within the smart card. These smart cards are generally referred to as microprocessor or central processing unit (CPU) cards and some of these CPU cards are configured to address the problem of non-secure input and terminal devices by incorporating an input device onto the smart card in the form of a touch sensitive keypad on at least one surface of the card.

There are several existing smart card systems, which utilise CPU smart cards including a keypad. One of these existing smart card systems utilises a self-contained smart card including a keypad, a display, a memory and means to enter and verify a personal identification number. In order to gain access to amenities and/or services, a user presents the CPU card at a point of entry and then enters a personal identification number using the built-in keypad. The personal identification number is verified by a verification means associated with the point of access and the user is allowed or denied access to the amenity and/or service depending on the result of the verification process.

Another of these existing smart card systems includes a self-contained smart card having a power source, a keypad, a display, a memory and a means to enter identification information. Still another existing smart card system utilises a self-contained CPU card including a multi-functional and programmable keypad and display, which are used to enter information. These other smart card systems work in a similar manner to the smart card system described above.

Still another existing CPU smart card system allows a personal identification number to be entered into a CPU card, which includes a touch sensitive keypad, when the card is inserted into a smart card reader. The reader includes an overlay which can be positioned over the surface of the smart card to provide user interface elements related to the keypad. The overlay is configured to allow a user to transfer pressure onto the surface of the CPU card, adjacent to one or more of the user interface elements, in order to select a function.

However, the above mentioned keypad CPU cards require specialised integrated circuit hardware in order to detect pressure on certain points which rules out the use of most conventional CPU smart cards with systems using these keypad CPU cards. Further, CPU cards including an integrally formed keypad generally require discrete user interface elements in discrete positions on the card which limits the function of such cards. Still further, the manufacture of such an integrated circuit card, and in particular the integrated circuit hardware associated with the card, is relatively difficult and involves a very high cost relative to most conventional smart cards. These limitations of keypad CPU cards generally render the cards unsuitable for wide spread usage.

One existing CPU card with a user interface printed on at least one surface of the card includes a data structure describing the interface, where the data structure is stored in a memory integrally formed within the CPU card. The reader device used with this existing CPU card, includes a transparent touch panel positioned above the CPU card so that user interface elements printed on a surface of the smart card are visible underneath the transparent touch panel. The reader device is configured to determine the position of a touch on the transparent panel and then read data structure information stored within a memory of the card to determine which user interface elements have been pressed. The reader device then sends a data string associated with the selected user interface elements to a remote application. However, this reader device suffers from similar disadvantages to those discussed above, in that data stored in the memory of the card is read by the reader and so is not kept confidential. Therefore, the card cannot be used with an untrusted reader.

Most conventional CPU cards are used, for example, in authentication, encryption and credit/banking transaction applications. However, the CPU card described above having a user interface printed on at least one surface thereof, is typically unable to be used in such applications, since the associated reader has a limited set of commands that can be sent to the card. Thus, a need clearly exists for a CPU card having a user interface printed thereon, which can be used in authentication, encryption and credit/banking transaction applications.

Secure smartcard systems that allow remote devices to communicate with a smart card over a secure connection are known. For example, one known smart card system utilises a method for establishing a secure connection between a card and a remote program. Access to certain smart card commands of this known system can be restricted. However, such restriction is typically at the discretion of the card operating system, or an off card entity, such as a remote server. For the user interface CPU card described above, neither the card operating system nor any intermediate part of the smart card system is necessarily aware of the access or other requirements for a specific application. Accordingly, enforcing access control on the above described user interface CPU card system is not appropriate and may even be impossible to implement when using third party operating systems. Thus, a need also exists for a smart card system which allows easy implementation of access control in relation to certain applications executing on the system.

SUMMARY OF THE INVENTION

It is an object of the present invention to substantially overcome, or at least ameliorate, one or more disadvantages of existing arrangements.

According to one aspect of the present invention there is provided a method of executing messages using a plurality of applications resident in a memory means of an electronic card, said electronic card being adapted for coupling to a reader device to facilitate reading of said memory means, said reading device being configured for communication with a remote apparatus having a further application executing thereon, said method comprising the steps of:

determining which of the one or more card resident applications are required to process one or more messages received from said further application; and depending on said determination:

executing said one or more messages using a first of said card resident applications if one or more predetermined criteria are met, or executing said one or more messages using a second of said card resident applications if one or more further criteria are met, wherein said one or more further criteria are determined via an array containing said one or more further criteria.

According to another aspect of the present invention there is provided an apparatus for executing messages using a plurality of applications resident in a memory means of an electronic card, said electronic card being adapted for coupling to a reader device to facilitate reading of said memory means, said reading device being configured for communication with a remote apparatus having a further application executing thereon, said apparatus comprising:

processor means for determining which of the one or more card resident applications are required to process one or more messages received from said further application, and depending on said determination:

executing said one or more messages using a first of said card resident applications if one or more predetermined criteria are met, or executing said one or more messages using a second of said card resident applications if one or more further criteria are met, wherein said one or more further criteria are determined via an array containing said one or more further criteria.

According to still another aspect of the present invention there is provided a program resident in an apparatus, said program being configured for executing messages using a plurality of applications resident in a memory means of an electronic card, said electronic card being adapted for coupling to a reader device to facilitate reading of said memory means, said reading device being configured for communication with a remote apparatus having a further application executing thereon, said program comprising:

code for determining which of the one or more card resident applications are required to process one or more messages received from said further application; and depending on said determination:

executing said one or more messages using a first of said card resident applications if one or more predetermined criteria are met, or executing said one or more messages using a second of said card resident applications if one or more further criteria are met, wherein said one or more further criteria are determined via an array containing said one or more further criteria.

According to still another aspect of the present invention there is provided a method of utilising an electronic card to access a service provided by an apparatus, said electronic card comprising a card portion having a memory means attached thereto, said memory means being adapted for coupling to a reader device to facilitate reading of said electronic card and having at least a data string retained therein, said data string being related to said electronic card, said method comprising the steps of:

verifying a user of said electronic card utilising said data string;

executing an application on said remote apparatus in response to said verification of said user, said application being related to said service;

issuing challenge data to said electronic card using said application;

responding to said challenge data with response data generated by said electronic card;

verifying said response data using said application; and allowing access to said service in response to said verification of said response data.

According to still another aspect of the present invention there is provided a system for utilising an electronic card to access a service provided by a remote apparatus, said electronic card comprising a card portion having one or more user interface elements formed on a surface thereof and at least a memory means attached thereto, said memory means being adapted for coupling to a reader device to facilitate reading of said electronic card and having at least a data string retained therein, said data string being related to said electronic card, said system comprising the steps of:

comparator means for comparing reading signals generated from a user selection of at least one of said user interface elements with said data string;

processor means for executing an application on said remote apparatus in response to said comparison, said application being related to said service;

challenge means issuing challenge data to said electronic card using said application;

response means for responding to said challenge data with response data generated by said electronic card;

verification means for verifying said response data using said application; and allowing access to said service in response to said verification.

Other aspects of the invention are also disclosed.

BRIEF DESCRIPTION OF THE DRAWINGS

One or more embodiments of the present invention will now be described with reference to the drawings, in which:

FIG. 15(b) shows user interface element objects associated with the smart card of FIG. 15(a);

DETAILED DESCRIPTION INCLUDING BEST MODE

Figure 1A:
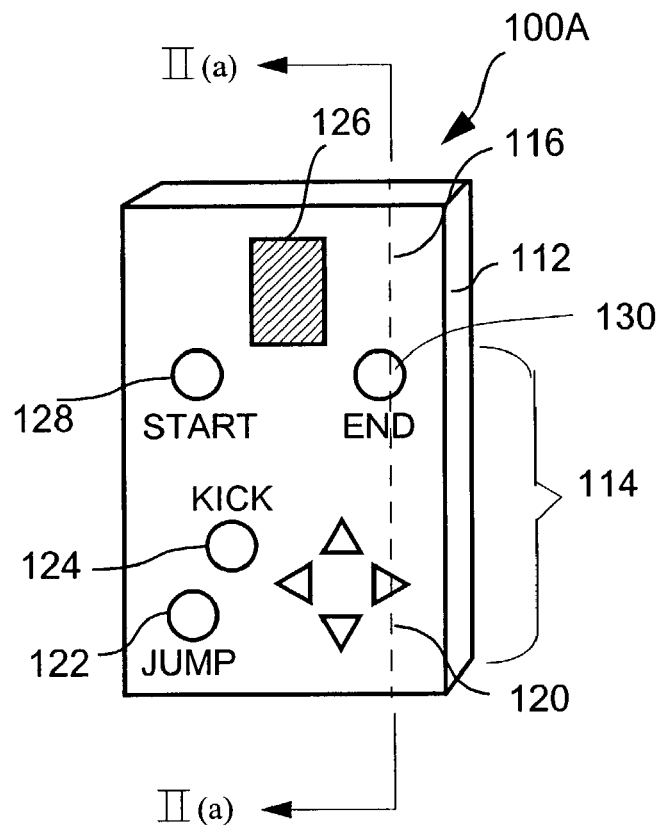
FIG. 1(a) is a perspective view of a smart card.

Where reference is made in any one or more of the accompanying drawings to sub-steps and/or features, which have the same reference numerals, those sub-steps and/or features have for the purposes of this description the same function(s) or operation(s), unless the contrary intention appears.

Excepting where explicitly distinguished, in the following description, the term "data string" means 'a sequence of bits (i.e. '1' or '0')' and can include American Standard Code for Information Interchange (ASCII) data, floating point data, and binary representations of integer values, for example.

The embodiments disclosed herein have been developed primarily for use with automatic tellers, remote control and network access systems, and will be described hereinafter with reference to these and other applications. The embodiments disclosed herein can be used to access services such as home shopping, home-banking, video-on-demand, interactive applications such as games and interactive trading cards, and information access such as city guides, television program guides and educational material. However, it will be appreciated that the invention is not limited to these fields of use.

For ease of explanation the following description has been divided into Sections 1.0 to 2.6, each section having associated subsections.

1.0 Smart Card Interface System Overview 1.1 Smart Cards

FIG. 1(a) shows a smart card 100A including a planar substrate 112 with various user interface elements 114 (i.e. predetermined areas, or iconic representations) printed or otherwise formed on an upper face 116 thereof, for example using an adhesive label. For the smart card 100A, the user interface elements 114 are in the form of a four way directional controller 120, a "jump button" 122, a "kick button" 124, a "start button" 128 and an "end button" 130 printed on a front face 116 thereof. Other forms of user interface elements, such as promotional or instructional material, can be printed alongside the user interface elements 114. For example, advertising material 126 can be printed on the front face 116 of the smart card 100A or on a reverse face (not shown) of the smart card 100A. In still other forms of the memory card 100A, the memory chip 219 can be replaced by a storage means such as a magnetic strip (not shown) formed on one surface of the memory card 100A.

Figure 2A:
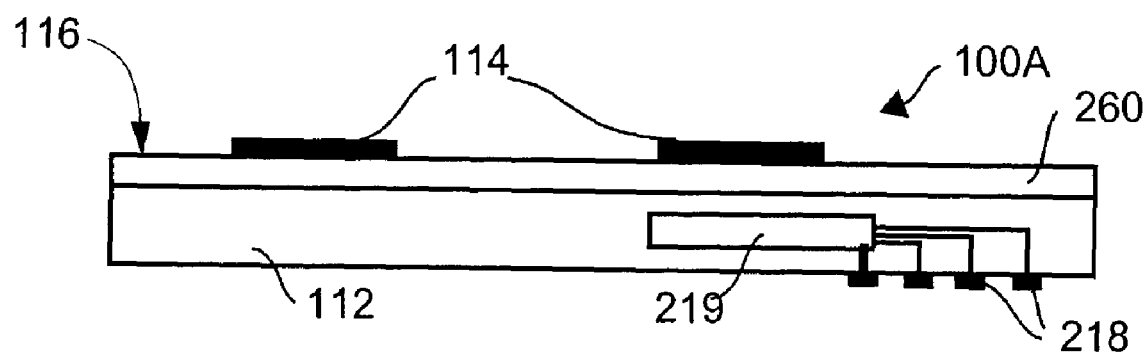
FIG. 2(a) is a longitudinal cross-sectional view taken along the line II(a)—II(a) of the card shown in FIG. 1(a)

As seen in FIG. 2(a), the front face 116 of the smart card 100A may be formed by an adhesive label 260 upon which is printed the user interface in the form of the user interface elements 114, in this case corresponding to the "End Button" and the Right arrow "button" of the directional controller 120. The label 260 is affixed to the planar substrate 112. A home user can print a suitable label for use with a particular smart card 101A by using a printer. Alternatively, the user interface elements 114 can be printed directly onto the planar substrate 112 or separate adhesive labels can be used for each of the user interface elements 114.

As also seen in FIG. 2(a), the smart card 100A includes storage means in the form of an on-board memory chip 219 for storing data associated with the user interface elements 114. The smart card 100A having a memory chip 219 as described above is generally referred to as a "memory card". Thus, the smart card 100A will hereinafter be referred to as the memory card 100A. The memory card 100A also includes electrical data contacts 218 connected to the memory chip 219 and via which reading of the memory chip 219 and writing to the memory chip 219 may be performed.

Alternatively, in other forms of the memory card 100A, the memory chip 219 can be replaced by storage means in the form of machine-readable indicia such as an optical code (e.g. a barcode) printed on a reverse face (not shown) of the memory card 100A.

Memory cards such as the memory card 100A can be utilised in applications where strong security of the smart card 100A and data stored in the chip 219 of the smart card 100A, is not required. The memory card 100A can also be used in applications where it is desired to maintain the cost of manufacturing the smart card 100A to a minimum. Such smart cards can be used for example, where the memory card 100A is given away to promote a service and/or to provide access to the service. The memory card 100A can also be used as a membership card, which provides access to a specific service.

Figure 1B:
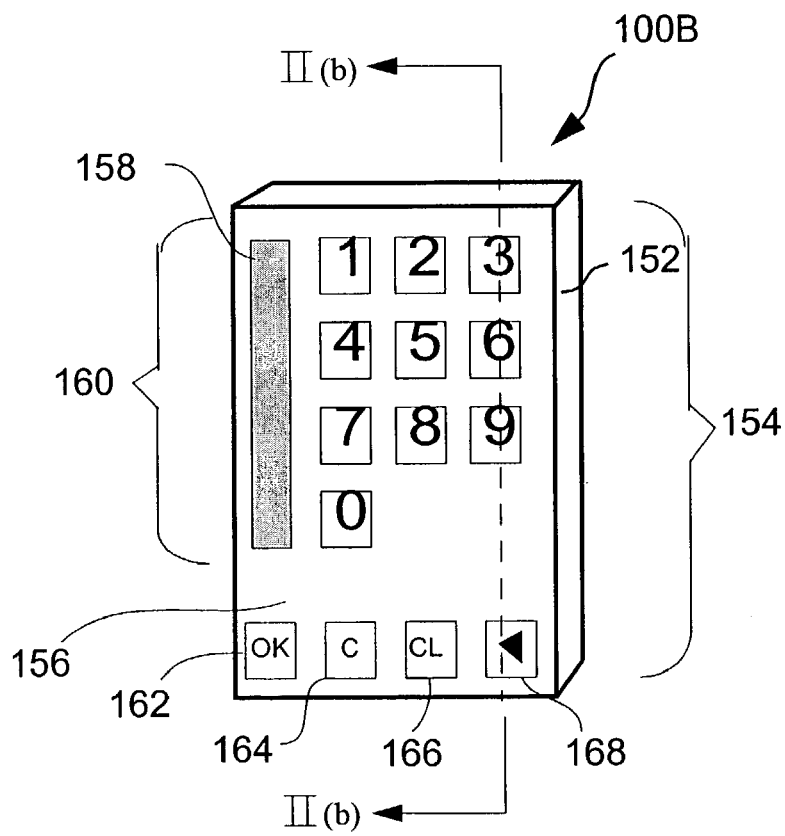
FIG. 1(b) is a perspective view of another smart card.

FIG. 1(b) shows another smart card 100B again including a planar substrate 152 with various user interface elements 154 printed on a front face 156 thereof. In the smart card 100B the user interface elements 154 are in the form of a numerical keypad 160, an "OK button" 162, a "cancel button" 164, a "clear button" 166 and a "backspace button" 168 printed on the front face 156 thereof. Again, other forms of user interface elements, such as promotional or instructional material, can be printed alongside the user interface elements 154 such as advertising material 158.

Figure 2B:
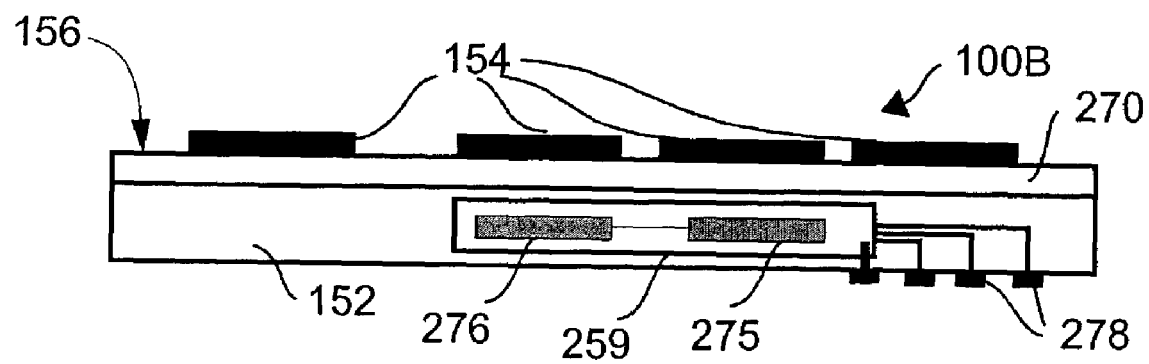
FIG. 2(b) is a longitudinal cross-sectional view taken along the line II(b)—II(b)

As seen in FIG. 2(b), the front face 156 of the smart card 100B is formed by an adhesive label 270 affixed to the planar substrate 152 in a similar manner to the memory card 100A. Again, a user interface in the form of user interface elements 154, in this case corresponding to the "number 3", "number 6" and "number 9" buttons of the numerical keypad 160 and the "backspace button" 168, is printed on the adhesive label 270.

As also seen in FIG. 2(b), the smart card 100B includes a microprocessor 259 having an integrally formed central processing unit (CPU) 275 and storage means 276. The storage means 276 generally includes volatile random access memory (RAM) (not shown) and non-volatile flash (ROM) memory (not shown), and can be used to store data associated with the user interface elements 154, application software code associated with the smart card 100B and/or information (e.g. a personal identification number) associated with the user and/or manufacturer of the smart card 100B. The smart card 100B will hereinafter be referred to as the CPU card 100B. The CPU card 100B also includes electrical data contacts 278 connected to the microprocessor 259 and which perform a similar role to the contacts 218 of FIG. 2(a). In particular, the electrical data contacts 278 can be used to send instructions to the microprocessor 259 and to receive data resulting from the execution of those instructions on the microprocessor 259.

CPU cards such as the CPU card 100B can be utilised in applications where enhanced user authentication and/or higher levels of security of the CPU card 100B and data stored in the storage means 276, is required.

It will be appreciated by a person skilled in the relevant art, that the user interfaces in the form of the user interface elements 114 and 154 can be interchanged for the smart cards 100A and 100B. Further, the user interfaces able to be printed by a user and/or manufacturer for the smart cards 100A and 100B can take many forms. Memory cards such as the memory card 100A and CPU cards such as the CPU card 100B, having a user interface formed on one surface of the card can be referred to as 'User Interface Cards. However, excepting where explicitly distinguished, in the following description, the memory card 100A and the CPU card 100B will be generically referred to as the smart card 100.

1.2 Smart Card Reader

Figure 3:
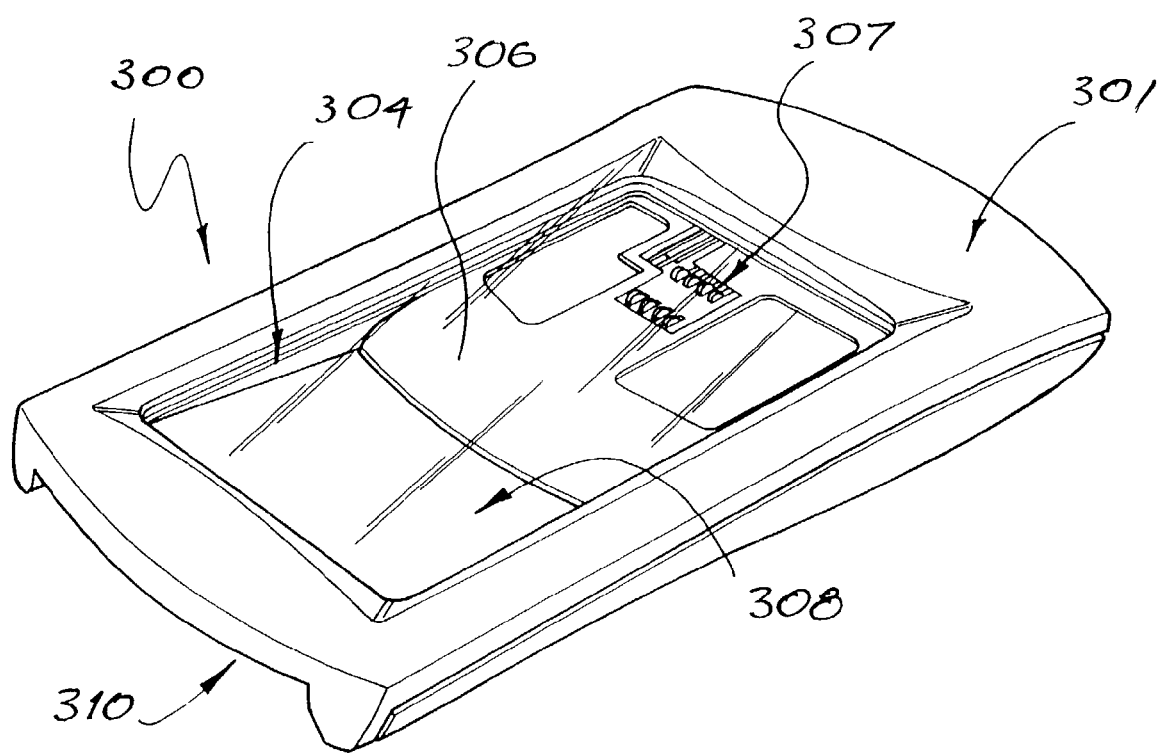
FIG. 3 is a perspective view of a reader device configured for use with the smart cards of FIGS. 1(a) and 1(b) of the card shown in FIG. 1(b)

FIG. 3 shows a smart card reader 300 configured for use with both the memory card 100A and the CPU card 100B. The configuration of the electrical data contacts 218 and 278 of the memory card 100A and the CPU card 100B, respectively, correspond to exposed contacts 307 of the smart card reader 300, as shown in FIG. 3. The reader 300 is formed of a housing 301 incorporating a receptacle 304 into which the smart card 100 may be inserted, a viewing area 306 and an access opening 310 configured to accept a smart card 100.

An upper boundary of the viewing area 306 is defined by sensor means in the form of a substantially transparent pressure sensitive membrane 308 or simply "touch panel" spaced above the exposed contacts 307 so as to form the receptacle 304. It will be appreciated by a person skilled in the relevant art that alternative technology can be used as the touch panel 308. For example, the touch panel 308 can be resistive or temperature sensitive.

Figure 4:
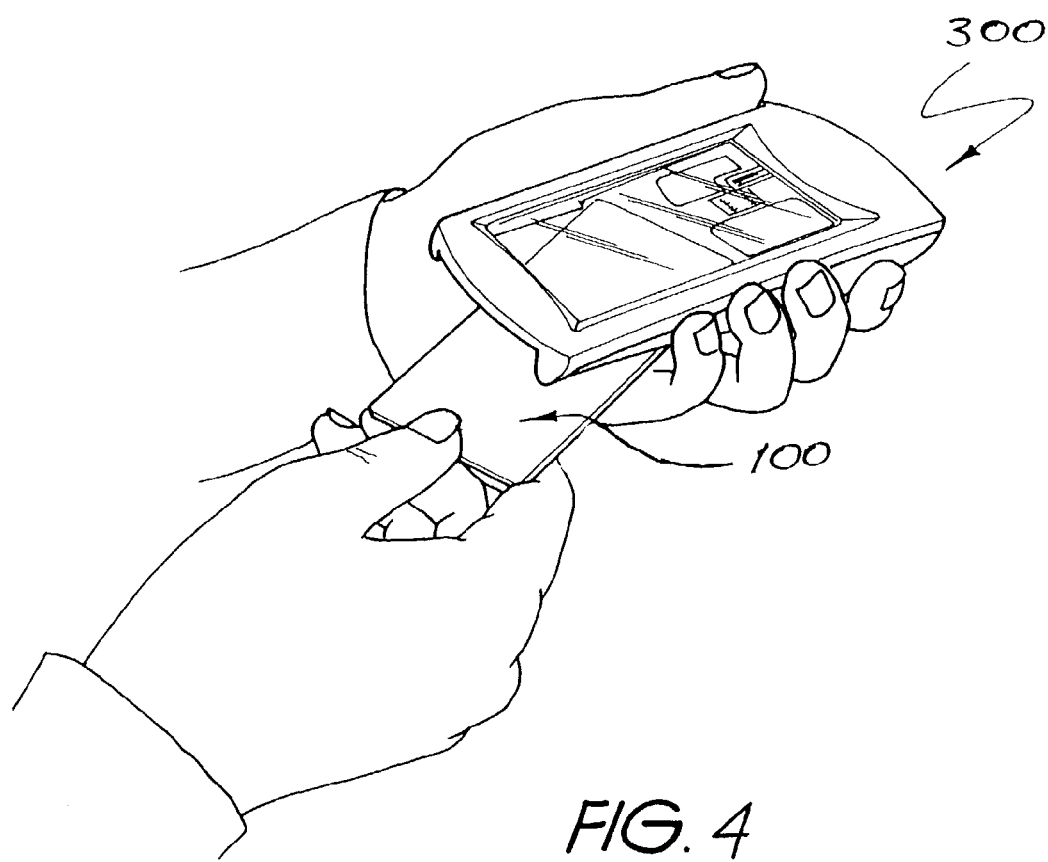
FIG. 4 shows a user inserting a smart card into the reader of FIG. 3.

In use, a smart card 100 is inserted by a user into the smart card receptacle 304, through the access opening 310, as shown in FIG. 4. When the smart card 100 is fully inserted into the reader 300, the touch panel 308 fully covers the upper face 116, 156 of the smart card 100. The viewing area 306 preferably has substantially the same dimensions as the upper face 116, 156 of the smart card 100 such that the upper face 116, 156 is, for all intents and purposes, fully visible within the viewing area 306 through the touch panel 308. In this position, the data contacts 218, 278 of the card 100 engage the exposed contacts 307 so that circuitry (not shown) within the reader 300 can communicate with the memory chip 219 or microprocessor 259 of the card 100.

Figure 5:
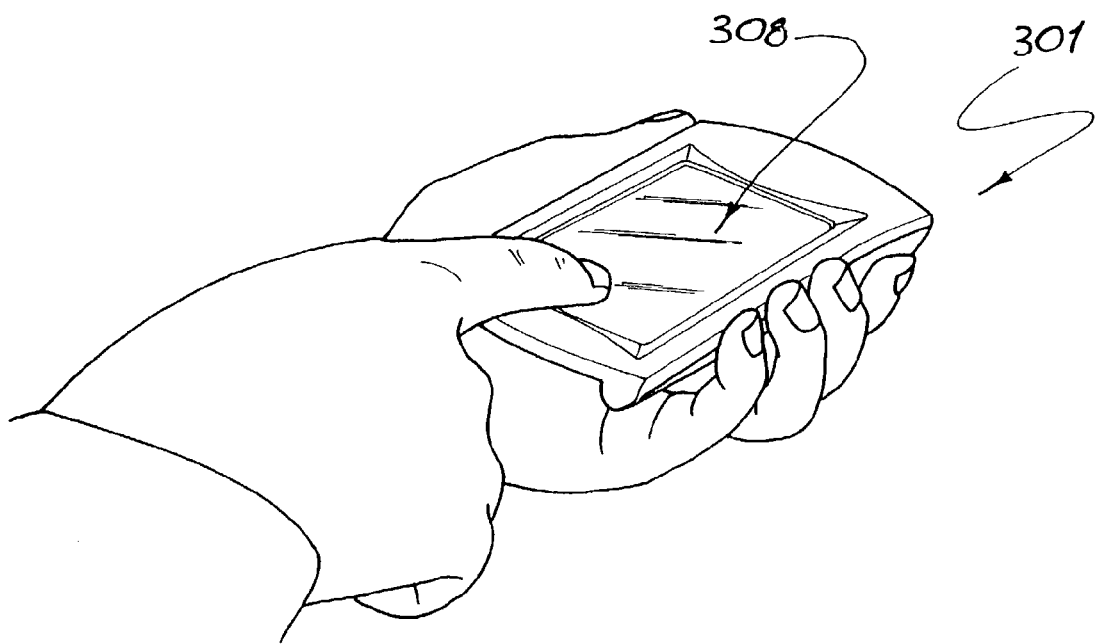
FIG. 5 shows a user operating the reader of FIG. 3 after the smart card has been fully inserted.

When the card 100 is fully inserted into the reader 300, a user can press areas of the touch panel 308, as shown in FIG. 5, overlying the user interface elements 114, 154. For the memory card 100A, the reader 300 deduces which of the user interface elements 114 the user has selected by sensing the pressure on the touch panel 308 and referring to the data stored in the memory chip 219. For example, if the user places pressure on the touch panel 308 adjacent the "kick button" 124, the reader 300 is configured to assess the position at which the pressure was applied, refer to the stored data, and determine that the "kick button" 124 was selected.

In contrast, for the CPU card 100B, the CPU 275 determines which of the user interface elements 154 the user has selected by processing coordinates received from the reader 300 upon the reader 300 sensing pressure on the touch panel 308, and then the CPU 275 referring to the data stored in the storage means 276 of the microprocessor 259. In this case, it is not necessary for the reader 300 to be able to read and to be made aware of the data stored in the storage means 276 of the microprocessor 259. The operation of the CPU card 100B in relation to the reader 300 will be explained in more detail in Sections 2.0 to 2.6 below.

Information resulting from a user selecting one of the user interface elements 114, 154 can be used to control an external device, for example, an associated automatic teller machine (of conventional construction and not shown). It will be appreciated from above that the user interface elements 114, 154 are not, in fact buttons. Rather, the user interface elements 114 are user selectable features which, by virtue of their corresponding association with the data stored in the memory chip 219 or storage means 276, and the function of the touch panel 308, operate to emulate buttons traditionally associated with remote control devices.

In one advantageous implementation, the reader 300 includes a transmitter (of conventional type and not shown), such as an infra-red (IR) transmitter or radio frequency (RF) transmitter, for transmitting information in relation to user interface elements 114, 154 selected by the user. In this case, upon selection of one of the user interface elements 114, 154, the reader 300 causes information related to the selection to be transmitted to a remote console (not shown in FIG. 5) where a corresponding infra-red or radio frequency remote module can detect and decode the information for use in controlling some function, such as a banking application executing on the automatic teller machine discussed above.

Any suitable transmission method can be used to communicate information from the reader 300 to a remote module, including direct hard wiring. Moreover, the remote module itself can incorporate a transmitter, and the reader 300 a receiver for communication in an opposite direction to that already described. The communication from the remote module to the reader 300 can include, for example, handshaking data, setup information, or any other form of information desired to be transferred from the remote module to the reader 300.

Figure 10:
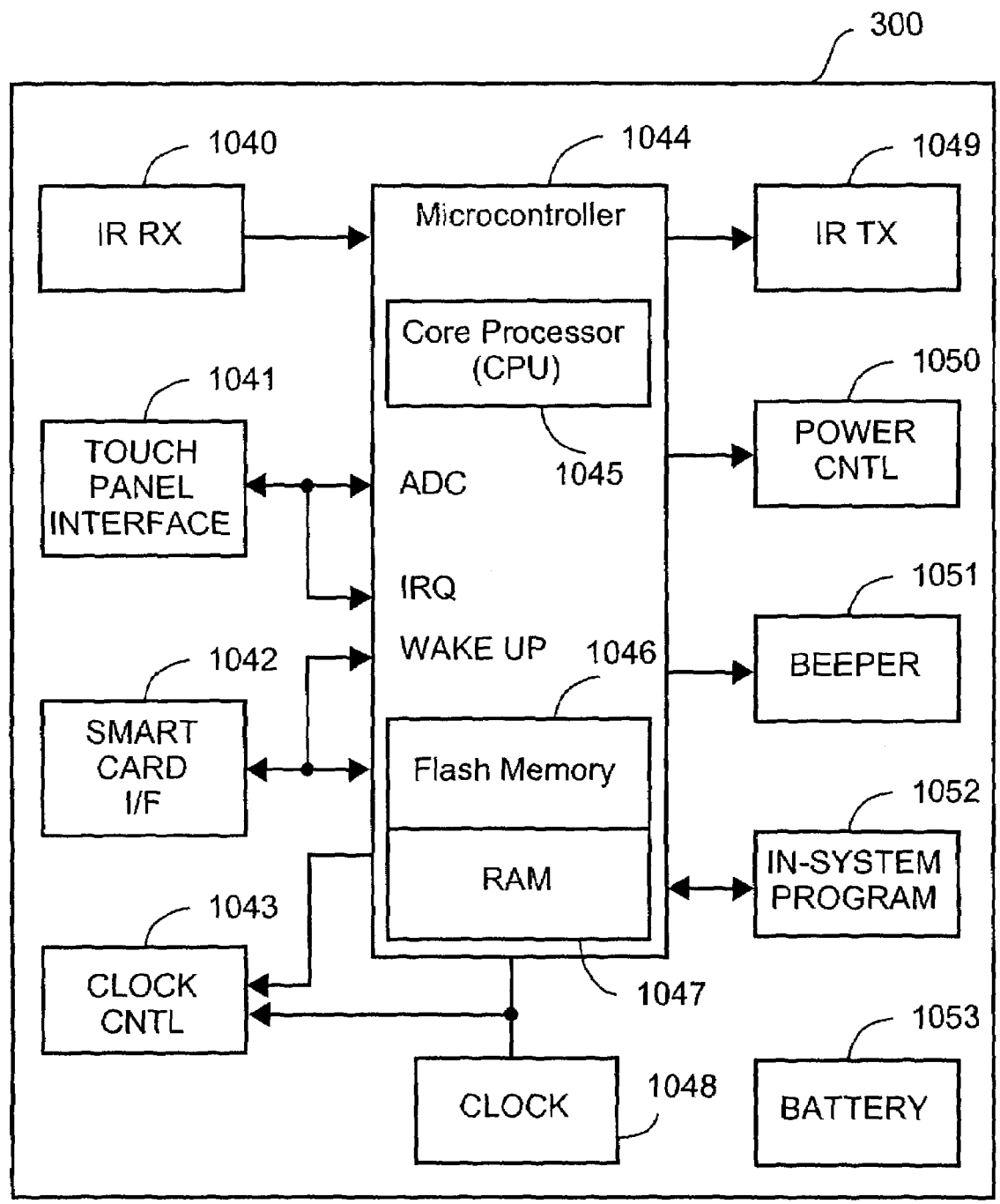
FIG. 10 is a schematic block diagram showing the internal configuration of the reader of FIG. 3.

FIG. 10 is a schematic block diagram showing the internal configuration of the reader 300 in more detail. The reader 300 includes a microcontroller 1044 for controlling the reader 300, for coordinating communications between the reader 300 and a remote module, and for storing mapping information and firmware, for example. The microcontroller 1044 includes random access memory (RAM) 1047 and flash (ROM) memory 1046. The microcontroller 1044 also includes a central processor unit (CPU) 1045. The microcontroller 1044 is connected to a clock source 1048 and a clock controller 1043 for coordinating the timing of events within the microcontroller 1044. The CPU 1045 is supplied with electrical power from a battery 1053, the operation of the former being controlled by a power controller 1050. Alternatively, in one implementation, the CPU 1045 can be supplied with power via a universal serial bus cable (not shown) connected to a reader associated with the power coming from a personal computer or similar device. The microcontroller 1044 is also connected to a beeper 1051 for giving audible feedback about card entry status.

Infra-red (IR) communications, as discussed above, can be implemented using two circuits connected to the microcontroller 1044, an infra-red transmitter (TX) 1049 for infra-red transmission and an infra-red remote module (RX) 1040 for infra-red reception. The touch panel 308 of the reader 300 communicates with the microcontroller 1044 via a touch panel interface 1041 and the electrical contacts 307.

An in-system-programming interface 1052 can also be connected to the microcontroller 1044, to enable programming of the microcontroller 1044 with firmware by way of the microprocessor flash memory 1046.

1.3 Hardware Architecture

Figure 6A:
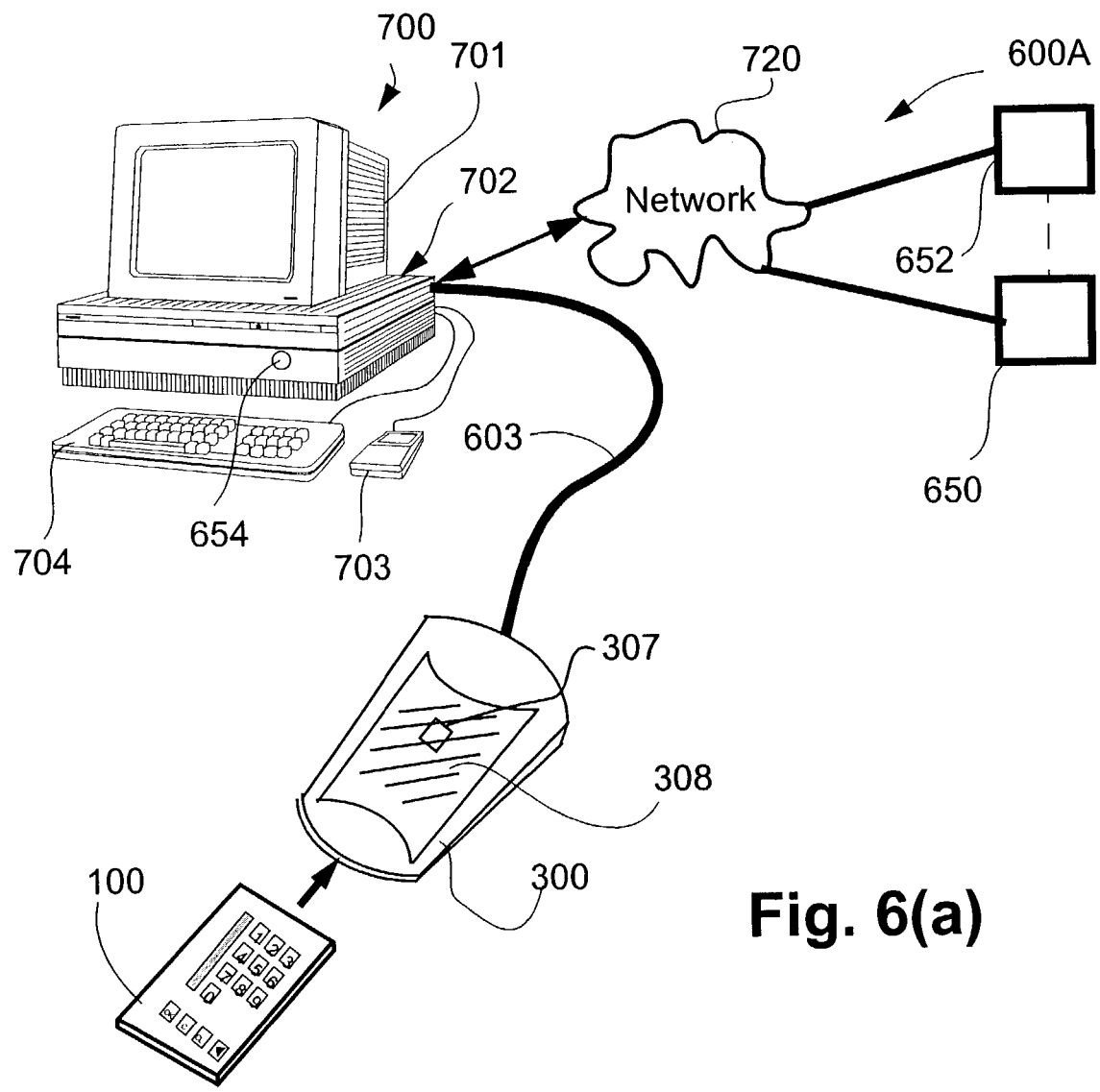
FIG. 6(a) shows a hardware architecture for a smart card interface system.

FIG. 6(a) shows a hardware architecture of a card interface system 600A. In the system 600A, the reader 300 is hard wired to a personal computer system 700 via a communications cable 603. Alternatively, instead of being hardwired, a radio frequency or infrared transceiver 654 formed in the personal computer system 700 can be used to communicate with the reader 300. The personal computer system 700 includes a display device 701, a computer module 702, a keyboard 704 and mouse 703, and will be explained in more detail below with reference to FIG. 7.

The system 600A includes the smart card 100 which is programmable and can be created or customised by a third party, who may be a party other than the manufacturer of the smart card 100 and/or the card reader 300. The third party can be the ultimate user of the smart card 100 itself, or may be an intermediary between the manufacturer and user. In the system 600A of FIG. 6(a), the smart card 100 can be programmed and customised for one touch operation to communicate with the computer 700 and obtain a service over a computer network 720, such as the Internet, coupled to the computer 700. The computer 700 operates to interpret signals sent via the communications cable 603 from the reader 300, according to a specific protocol, which will be described below. The computer 700 performs the selected function according to touched user interface elements 114, 154 and can be configured to communicate data over the network 720. In this manner, the computer 700 can permit access to applications and/or data stored on remote server computers 650, 652 and appropriate reproduction on the display device 701, by way of user manipulation of the reader 300 and card 100.

Figure 6B:
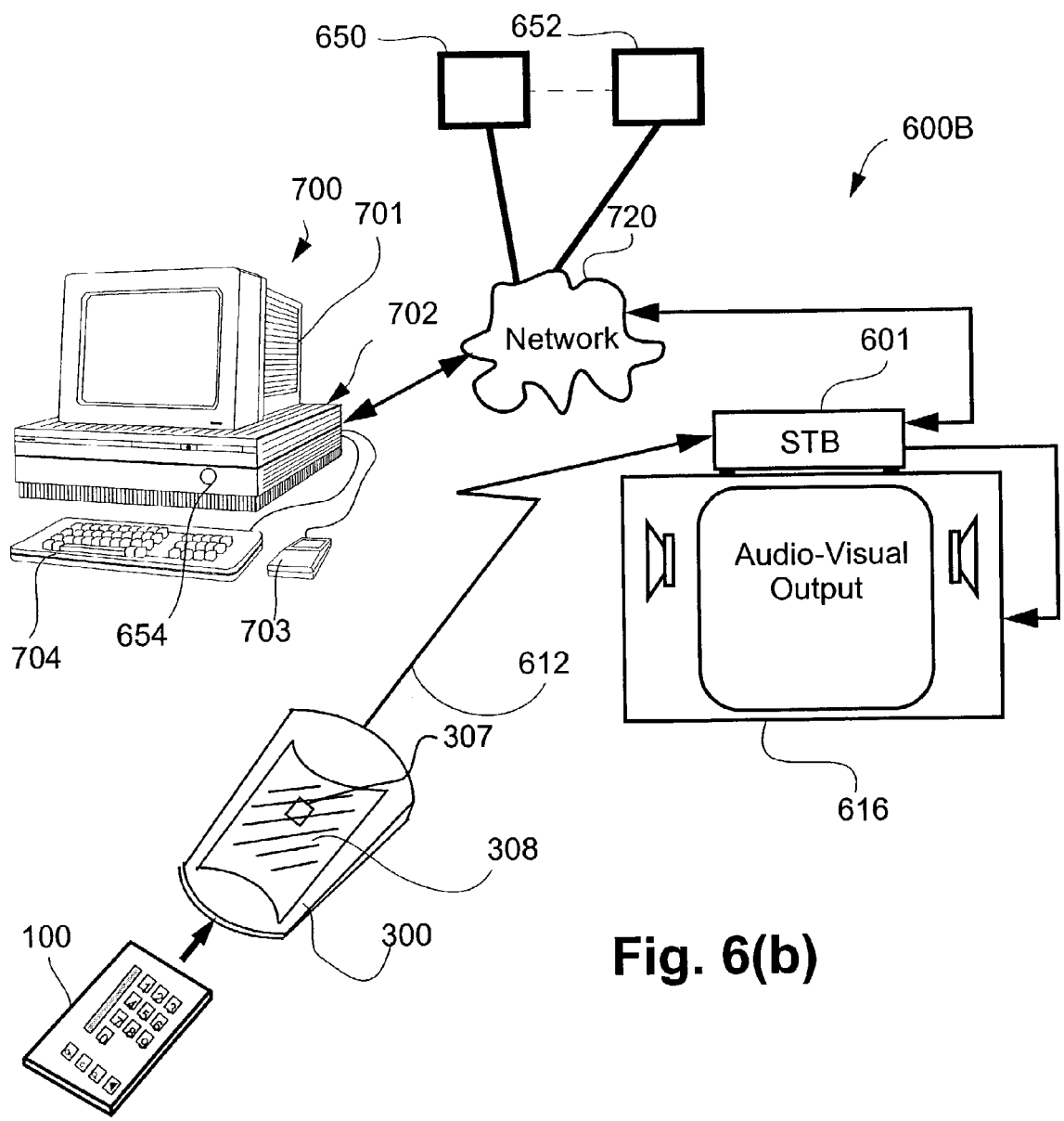
FIG. 6(b) shows another hardware architecture for a smart card interface system.

FIG. 6(b) shows a hardware architecture of a card interface system 600B. In the system 600B, the reader 300 can be programmed for obtaining a service locally at a set top box 601, that couples to an output interface, which in this example takes the form of an audio-visual output device 616, such as a digital television set. The set-top box 601 operates to interpret signals 612 received from the reader 300, which may be electrical, radio frequency, or infra-red (IR), and according to a specific protocol which will be described below. The set top box 601 can be configured to perform the selected function according to touched user interface elements 114, 154 and permit appropriate reproduction on the output device 616. Alternatively, the set top box 601 can be configured to convert the signals 612 to a form suitable for communication and cause appropriate transmission to the computer 700 via the network 720. The computer 700 can then perform the selected function according to the user interface elements 114, 154, and provide data to the set-top box 601 to permit appropriate reproduction on the output device 616. The set top box 601 will be explained in more detail below with reference to FIG. 8.

In one application of the system 600B, the smart card 100 can be programmed for obtaining a service either remotely or locally. For instance, the smart card 100 can be programmed to retrieve an application and/or data stored on remote server computers 650, 652, via the network 720, and to load the application or data on to the set top box 601. The latter smart card can be alternatively programmed to obtain a service from the loaded application on the set top box 601.

Excepting where explicitly distinguished, the systems 600A and 600B of FIG. 6(a) and 6(b) will be hereinafter generically referred to as the system 600.

Figure 7:
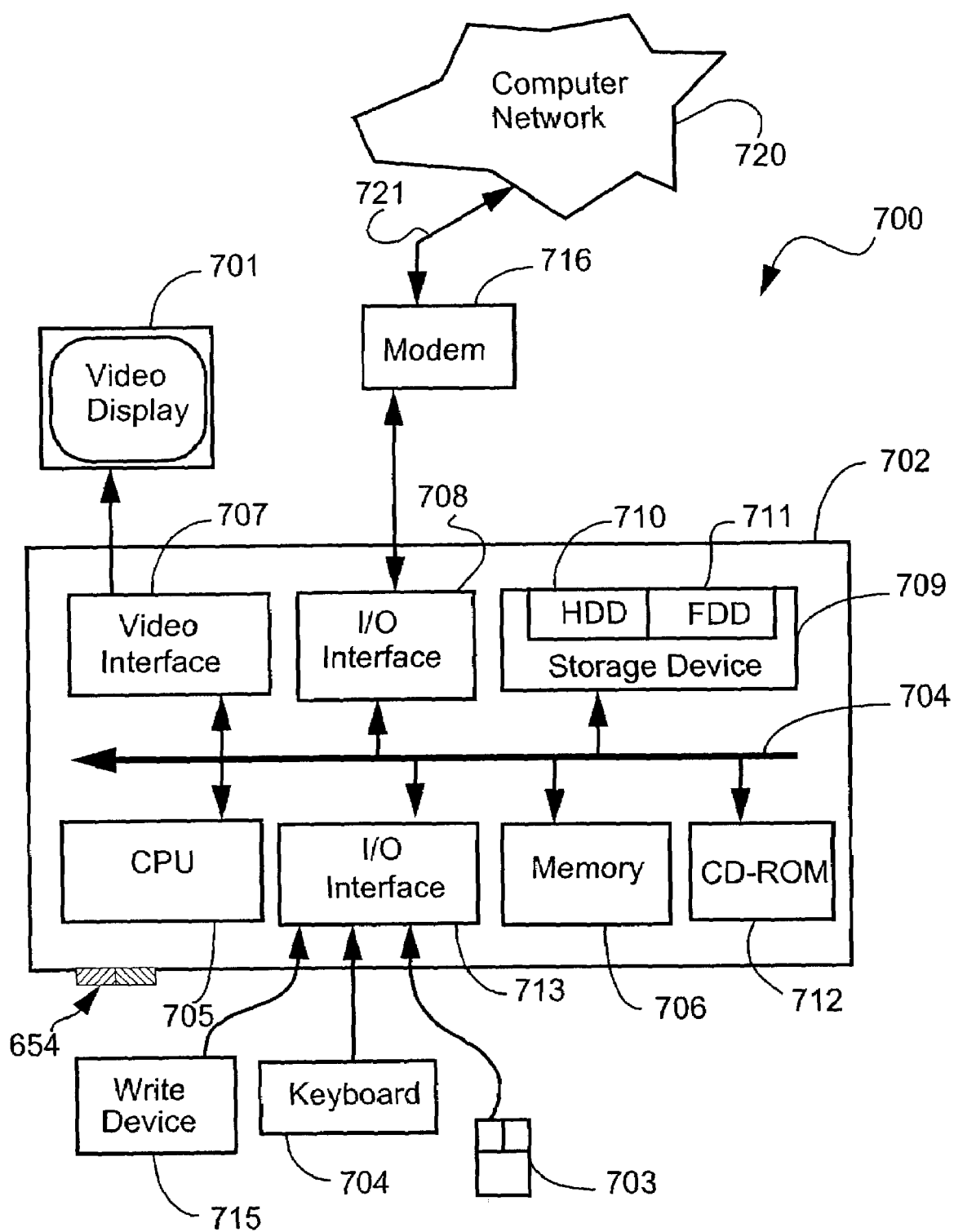
FIG. 7 is a schematic block diagram of the general-purpose computer of FIGS. 6(a) and 6(b) in more detail.

FIG. 7 shows the general-purpose computer system 700 of the system 600, which can be used to run the card interface system and to run software applications for programming the smart card 100. The computer system 700 includes the computer module 702, input devices such as the keyboard 704 and mouse 703, output devices including a printer (not shown) and the display device 701. A Modulator-Demodulator (Modem) transceiver device 716 is used by the computer module 702 for communicating to and from the communications network 720, for example connectable via a telephone line 721 or other functional medium. The modem 716 can be used to obtain access to the Internet, and other network systems, such as a Local Area Network (LAN) or a Wide Area Network (WAN).

The computer module 702 typically includes at least one central processing unit (CPU) 705, a memory unit 706, for example formed from semiconductor random access memory (RAM) and read only memory (ROM), input/output (I/O) interfaces including a video interface 707, and an I/O interface 713 for the keyboard 704 and mouse 703, a write device 715, and an interface 208 for the modem 216. The I/O interface 713 also includes the IR transceiver 654 connected to the I/O interface 713 for communicating directly with the reader 300. A storage device 709 is provided and typically includes a hard disk drive 710 and a floppy disk drive 711. A magnetic tape drive (not illustrated) is also able to be used. A CD-ROM drive 712 is typically provided as a non-volatile source of data. The components 705 to 713 of the computer module 702, typically communicate via an interconnected bus 704 and in a manner, which results in a conventional mode of operation of the computer system 702 known to those in the relevant art. Examples of computers on which the arrangement described herein can be practised include IBM-computers and compatibles, Sun Sparcstations or alike computer system evolved therefrom.

Typically, the software programs such as applications of the system 600 are resident on the hard disk drive 710 and read and controlled in their execution by the CPU 705. Intermediate storage of the software application programs and any data fetched from the network 720 may be accomplished using the semiconductor memory 706, possibly in concert with the hard disk drive 710. In some instances, the application programs can be supplied to the user encoded on a CD-ROM or floppy disk and read via the corresponding drive 712 or 711, or alternatively may be read by the user from the network 720 via the modem device 716. Still further, the software can also be loaded into the computer system 702 from other computer readable medium including magnetic tape, ROM or integrated circuits, a magneto-optical disk, a radio or infra-red transmission channel between the computer module 702 and another device, a computer readable card such as a smart card, a computer PCMCIA card, and the Internet and Intranets including email transmissions and information recorded on Websites and the like. The foregoing is merely exemplary of relevant computer readable media. Other computer readable media are able to be practised without departing from the scope of the invention defined by the appended claims.

Figure 8:
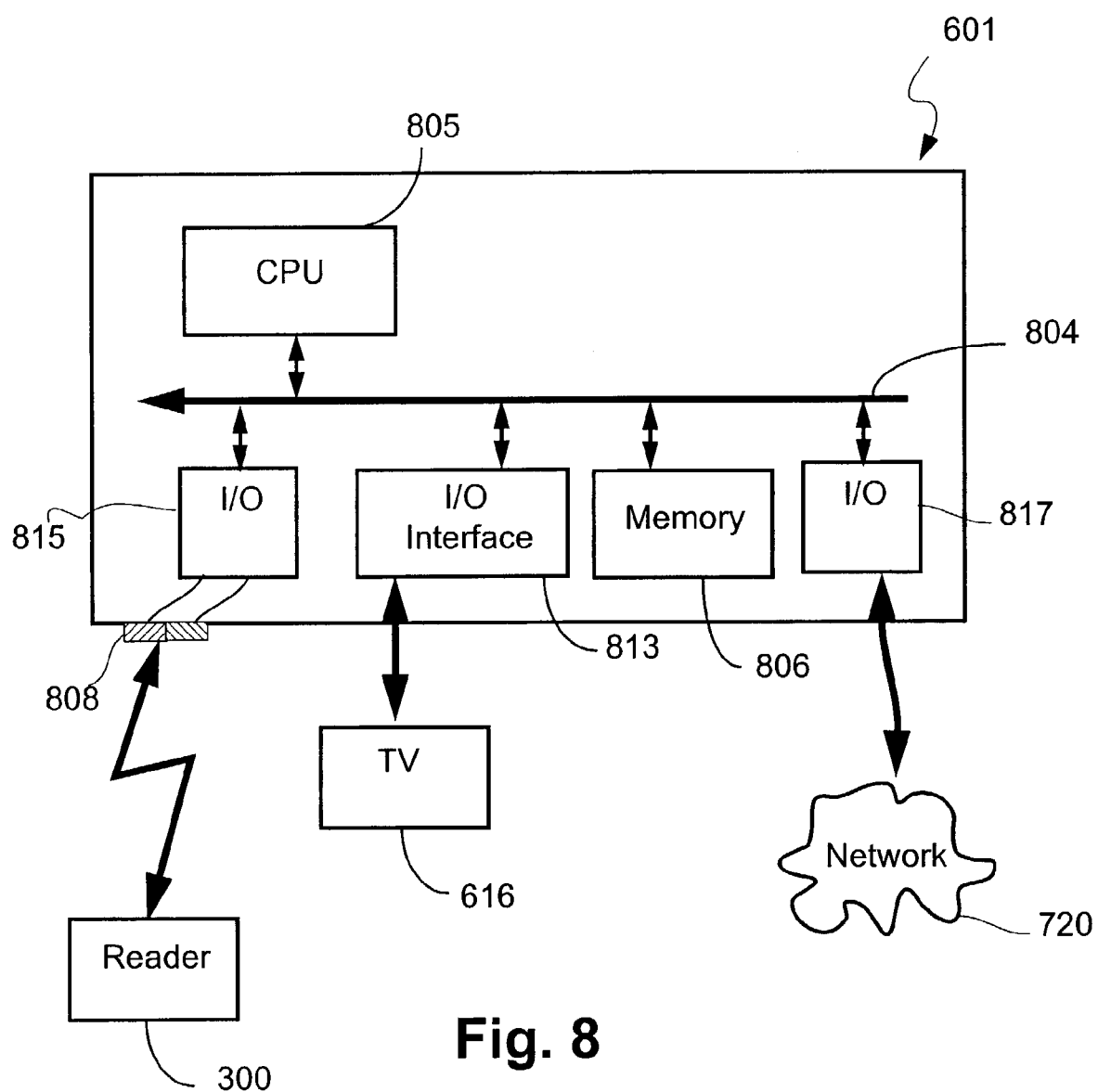
FIG. 8 is schematic block diagram showing the set top box of FIG. 6(b) in more detail.

FIG. 8 shows the set top box 601 of the system 600, which can be used to interpret the signals 612 received from the reader 300. The set top box 601 in some implementations essentially is a scaled version of the computer module 702. The set top box 601 typically includes at least one CPU unit 805, a memory unit 806, for example formed from semiconductor random access memory (RAM) and read only memory (ROM), and input/output (I/O) interfaces including at least an I/O interface 813 for the digital television 616, an I/O interface 815 having an IR transceiver 808 for receiving and transmitting the signals 612, and an interface 817 for coupling to the network 720. The components 805, 806, 813, 815 and 817 of the set top box 601, typically communicate via an interconnected bus 804 and in a manner which results in a conventional mode of operation. Intermediate storage of any data received from the reader 300 or network 720 may be accomplished using the semiconductor memory 806. Alternatively, the set top box can include a storage device (not shown) similar to the storage device 709.

1.4 Programming the Smart Card

As described above, the smart card 100 is programmable and can be created or customised by a third party. For example, with the system 600, the smart card 100 can be programmed and customised for one touch operation to communicate with the set-top box 601 and/or computer 700 and obtain a service over the network 720. The smart card 100 can be programmed by means of the write device 715 coupled to the I/O interface 713 of the computer module 702. The write device 715 has the capability of writing data to the memory chip 219 on the memory card 100A or the storage means 276 of the microprocessor 259 for the CPU card 100B. Preferably, data is not able to be written to the storage means 276 unless a value, calculated in accordance with a predetermined electronic key, is first presented to the microprocessor 259. Depending upon the specific implementation the write device 715 may also be configured to print graphics on to the front surface 116, 156 of the smart card 100 using image production software application programs. The write device 715 may also have a function for reading data from the smart card 100.

The write device can be configured such that the user can insert the smart card 100 into the write device 715 and then enter the required data. A software application can then write the data entered by the user to the memory of the smart card 100 via the write device 715. If the stored data is encoded for optical decoding such as in the case of a barcode memory card, the write device 715 can print the encoded data onto the memory card 100A.

For the CPU card 100B, the microprocessor 259 can be constructed so that once programmed in the manner described, the contents cannot thereafter be casually read.

1.5 Software Architecture Layout

Figure 9:
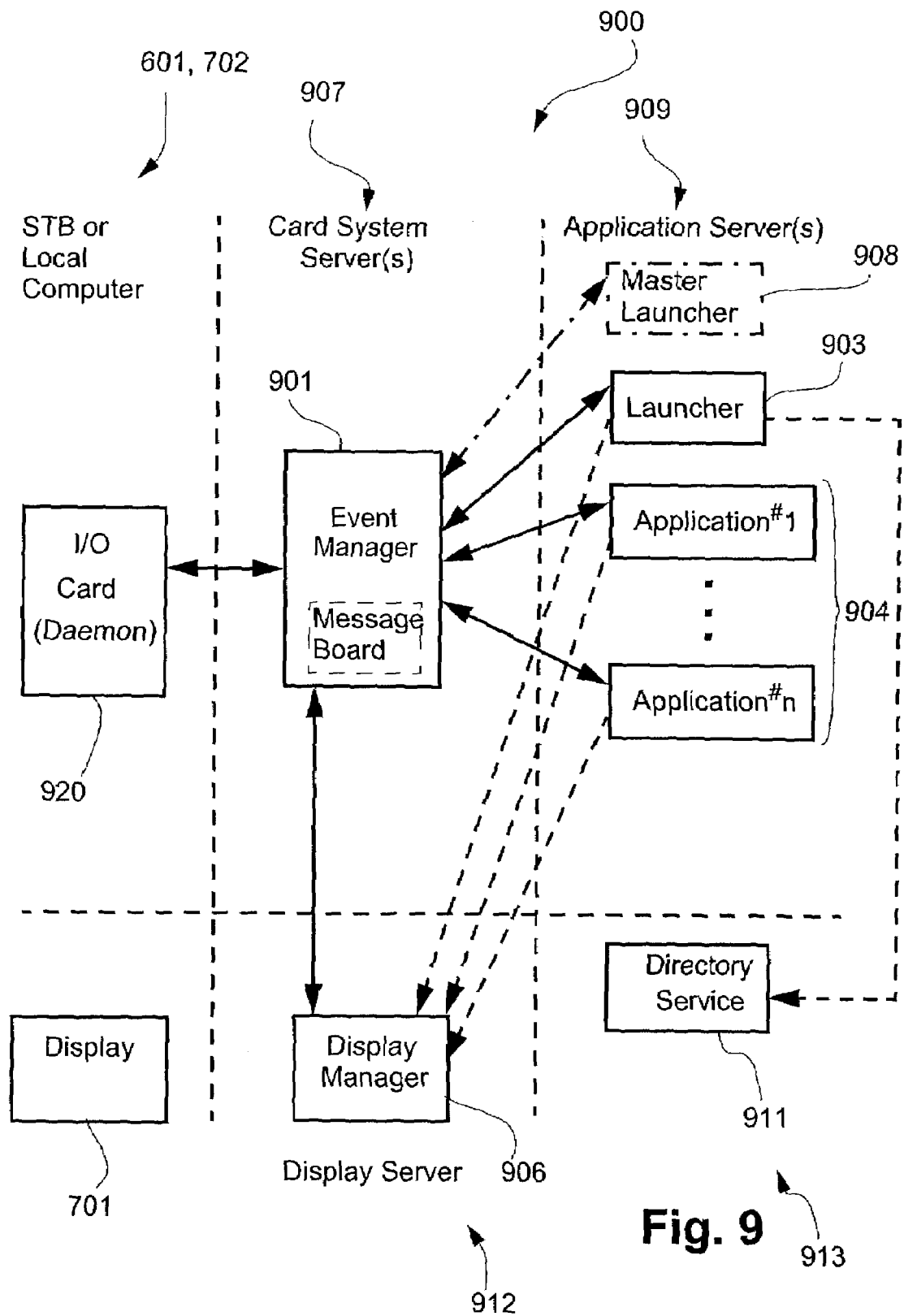
FIG. 9 is a schematic block diagram representation of a smart card interface system software architecture.

FIG. 9 shows a software architecture 900 for the hardware architecture depicted by the system 600. The architecture 900 can be divided into several distinct process components and one class of process. The distinct processes include an I/O interface 920, which may be colloquially called an "I/O daemon" 920, an event manager 901, a display manager 906, an (application) launcher 903 and a directory service 911. The class of process is formed by one or more applications 904. In the architecture 900 described herein, there exists one I/O daemon 920, one event manager 901, one display manager 906 and one launcher 903 for every smart card remote connection, usually formed by the set-top box 601. Where processes responsible for multiple remote connections are running on a single computer (e.g. the computers 700, 650 or 652) which provides support for a number of set-top boxes 601, a master launcher 908 (shown in FIG. 9 in phantom lines) can be used. The master launcher 908 communicates directly with the event manager 901 and starts a launcher 903 for every set-top box 601 which connects to master launcher 908. The architecture 900 also includes at least one directory service 911. The directory service 911, is queried by the launcher 903 to translate data into a Resource Locater (eg. URL) that indicates a name or location of a service or the location or name of an application 904 to be used for the service.

In this form, the architecture 900 can be physically separated into six distinct parts 601, 701, 907, 909, 912 and 913 as shown by the dashed lines in FIG. 9, each of which can be run on physically separate computing devices. Alternatively, the display 701 can be a device with little or no computing capacity. Communication between each of the parts of the system 900 can be executed using Transport Control Protocol/Internet Protocol (TCP/IP) streams. Alternatively, each of the parts 601, 701, 907, 909, 912 and 913 can be run on the same machine.

In the system 600A of FIG. 6(*a*), all of the process components 901, 903, 904, 906 and 920 can be run on the computer 700. The event manager 901, the launcher 903 and display manager 906 are preferably integrated into one executable program which is stored in the hard disk 709 of the computer 700 and can be read and controlled in its execution by the CPU 705. The directory service 911 may run on the same computer 700 or on a different computer (e.g. server 650) connected to the computer 700 via the network 720.

In the system 600B of FIG. 6(*b*), all of components 901, 903, 904, 906 and 920 can run from the set-top-box 601. In this instance, the components 901, 903, 904, 906 and 920 can be stored in the memory 806 of the set top box 601 and can be read and controlled in their execution by the CPU 805. The directory service 911 can run on one of the computers 650, 652 or 700 and can be stored in the hard disk drive 710 of the computer 700, for example, and be read and controlled in its execution by the CPU 705. Alternatively, the directory service 911 can be run on the set top box 601 or its function executed by the launcher 903.

In a further alternative arrangement, if the set-top-box 601 is not powerful enough to run the system 600 locally, only the I/O daemon 920 need run on the set-top-box 601 and the remainder of the architecture 900 (i.e. process components 901, 903, 904, 906 and 911) can be run remotely on the other servers (650, 652) which can be accessed via the network 720. In this instance, the I/O daemon 920 can be stored in the memory 806 of the set top box 601 and can be read and controlled in its execution by the CPU 805. Again, the functional parts of such a system can be divided as shown in FIG. 9. In this instance, the display 701 corresponds to an audio-visual output device (e.g. a television set).

The I/O daemon 920 is a process component that converts datagrams received from the reader 300 into a TCP/IP stream that can be sent to the event manager 901 and vice versa (e.g. when using a two-way protocol). The event manager 901 is configured to gather all events that are generated by the reader 300 and relayed by the I/O daemon 920. These events are then redistributed to the various process components 903, 904, 906 and 908 and running applications. The event manager 901 is also configured to check that an event has a valid header and correct data length. An "event", in this regard represents a single data transaction from the I/O daemon 920 or the launcher 903 or applications 904. The master launcher 908 can be used to start the launcher 903 corresponding to each of the event managers 901 if more than one event manager is running on the system 600. The launcher 903 is an application that starts other applications for a specific event manager 901. The launcher 903 starts and ends applications and can also start and end sessions. The launcher 903 also informs the event manager 901 when applications are starting and ending, and informs the applications 904 when they are gaining or losing focus, or when they need to exit. The display manager 906 selects which smart card application 904 is currently able to display output on the display device 701 (i.e. the "front" application).

The directory service 911 is configured to translate service identifiers that are stored on smart cards 100, into resource locators (e.g. a URL) that indicate the location of the services or the location of an application associated with a service. The directory service 911 is also configured to translate optional service data. The directory service 911 allows the launcher 903 associated with a particular card 100 to decide what to do with a resource locator, for example, download and run the associated application 904 or load the resource locator into a browser application.

The applications 904 associated with a particular smart card 100 can be started by the launcher 903 associated with that smart card 100 in response to a selection of one of the user interface elements 114, 154 of a corresponding smart card 100. Each application 904 can be a member of one or more application service groups. An application service group is comprised of a number of smart card applications 904 that act co-operatively, as opposed to merely simultaneously, to provide a particular set of functions. An application 904 can be specified to not be part of any service group in which case the application will never be run with other applications. An application can become part of a service group once the application is running and can remove itself from a service group when the application is the currently front application.

In a still further alternative arrangement, the process components 901 to 906 and 908 described above can be implemented in dedicated hardware (e.g. the set top box 601) as one or more integrated circuits performing the described functions or sub-functions. Such dedicated hardware may include graphic CPUs, digital signal CPUs, or one or more micro-CPUs and associated memories.

Typically, applications 904 are resident on the hard disk drive 710 and read and controlled in their execution by the CPU 705. Intermediate storage of programs and any data fetched from the network 720 can be accomplished using the semiconductor memory 706, possibly in concert with the hard disk drive 710. In some instances, the applications 904 will be supplied to the user encoded on a CD-ROM or floppy disk and read via the corresponding drive 711 or 712, or alternatively may be read from the network 720 via the modem device 716. Other mechanisms for loading the applications 904 into the computer system 700 from other computer readable medium include magnetic tape, a ROM or integrated circuit, a magneto-optical disk, a radio or infra-red transmission channel between the computer module 702 and another device, a computer readable card such as a smart card (not shown), a computer 'Personal Computer Memory Card International Association (PCMCIA) card' (not shown), and the Internet and/or Intranets including email transmissions and information recorded on Websites and the like. The foregoing is merely exemplary of relevant computer readable media. Other computer readable media are also possible including combinations of those described above.

1.6 Smart Card Data Format

The smart card 100 generally stores a data structure in memory 219, 276 that describes various card properties and any user interface elements 114, 154 printed on the smart card 100. The smart card 100 can also include global properties that specify attributes such as information about the smart card 100, vendor and a service. Further, user-interface objects, as will be explained in detail below, can specify data to be associated with the user interface elements 114, 154 printed on the surface of a corresponding smart card 100.

For the memory card 100A, data conforming to the format to be described can be copied directly into the memory chip 219 of the smart card 100. For the CPU card 100B, data conforming to the format to be described can be stored in the storage means 276 as a file being one file of a file system implemented on the CPU card 100B. Such a file system will be described in detail below. In either case, to ensure that the cost of the smart card 100 can be kept to a minimum, the amount of data stored on the smart card 100 is kept to a minimum. For example, where the smart card 100 is being used as a music sampler and associated on-line service, the memory 219, 276 of the smart card 100 does not contain the music itself. The smart card 100 only contains data associated with the user interface in the form of the user interface elements 114, 154 and certain identifiers, which will be described in detail below. If the smart card 100 has limited storage capacity (e.g. in the case where the smart card 100 utilises a barcode), the smart code 100 may only include a card identifier as will be explained in detail below.

The user-interface objects referred to above can represent mapping data, which relate the user interface elements 114, 154 imprinted directly on a surface of the smart card 100, to commands or addresses (eg: Uniform Resource Locators (URLs)). The mapping data includes (X,Y) coordinates that typically define the size and location of user interface elements 114, 154 on the smart card 100. The user-interface objects are preferably stored in the memory 219, 276 of the smart card 100. Alternatively, the user-interface objects can be stored not on the smart card 100 itself, but in the system 600. For example, the smart card 100 can store, via the memory 219, 276 a barcode or a magnetic strip, a unique identifier, which is unique to smart cards 100 having substantially similar user interface elements 114, 154 and layout. The unique identifier together with the coordinates determined from the touch panel 308, as a result of a user press, can be transmitted by the reader 100 to the computer 700 or to the set top box 601, of the system 600.

The system 600 can have the user-interface objects stored on the computer 700, set top box 601 or server 650, which may thus be arranged to perform the mapping from the determined coordinates to a corresponding command, address or data relevant to a service associated with the smart card 100 and a user selection of one of the user interface elements 114, 154, in order to provide a desired function represented by the selected user interface elements. In this instance, the data related to the user selected user interface elements 114, 154 as described above takes the form of coordinates determined by the microcontroller 1044 of the reader 300 as a result of a user applying pressure to a portion of the touch panel 308 which overlays the desired user interface elements 114, 154.

Data stored in the smart card 100 includes a card header followed by zero or more objects as described in the following sections.

1.6.1 Card Header

Figure 11:
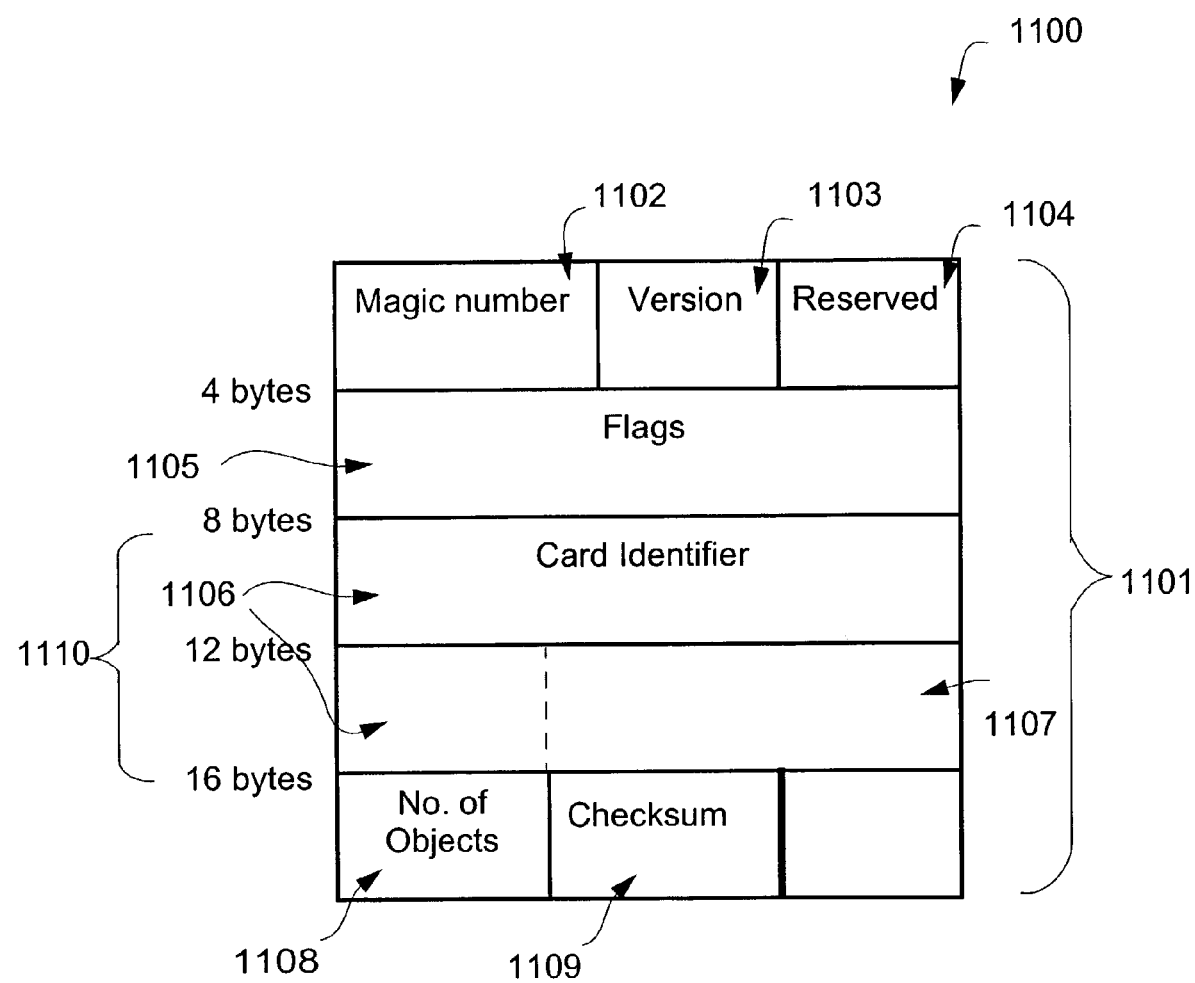
FIG. 11 shows the data structure of a card header as stored in the smart cards of FIG. 1(a) and FIG. 1(b)

FIG. 11 shows the data structure of a card header 1100 as stored in the smart card 100. The header 1100 includes a number of rows 1101, each of which represent four bytes of data. The data is preferably in 'big endian' format. The complete header is 19 bytes long and includes the following fields (described in more detail in Table 1 below):

(i) magic number field 1102, which includes a constant specifying a smart card as being a valid memory card 100A or CPU card 100B. For example, the magic number field 1102 can be used to check or verify that a propriety card belonging to a particular manufacture is being used;

(ii) versions field 1103, which includes each version increment that specifies a change in the smart card layout that cannot be read by a reader 300 which is compatible with lower versions of the layout;

(iii) reserved field 1104, this field is reserved for future use;

(iv) flags field 1105, which includes flags for a smart card (see Table 2 below);

(v) card identifier field 1110, which includes two fields—a service 1106 and a service specific field 1107. The service field 1106 identifies the service of a corresponding smart card 100 and the service specific field 1107 optionally contains a service-specific value;

(vi) a number of objects field 1108, which includes a number value representing how many objects follow the header 1100. This field can be set to zero; and (vii) a checksum field 1109, which includes a card checksum of all data on a corresponding smart card 100 excluding the checksum itself.

Table 1 below provides a description of the content of the various (number) fields described with reference to FIG. 11.

TABLE 1

| Field Number | Description (Card Header) |
| --- | --- |
| Magic Number | Two byte magic number. A constant that specifies this as being a valid card. Currently defined as the ASCII value for 'i' followed by the ASCII value for 'C'. |
| Version | One byte version number. Each version increment specifies a change in the card layout that can not be read by a reader that is compatible with lower versions of the layout. This document describes version 1(0x01) of the card format. |
| Reserved | This data is reserved for future use. Its value must be set to zero. |
| Flags | Four bytes of flags for this card. (See Table 2). All non-assigned bits must be zero. |
| Card Identifier | Eight byte card identifier. Card identifiers include two fields - service identifier and service-specific identifier. The service identifier is five bytes and identifies the service associated with the card. The service-specific identifier is three bytes of service specific value. |
| Number of Objects | One byte. The number of objects following this header. Can be zero. |
| Checksum | Card checksum, 2 bytes. The card checksum is sixteen bit, unsigned integer sum of all data bytes on the card excluding the checksum. |

The card identifier field 1110 comprises an eight-byte card identifier. The card identifier includes two portions (i.e. unit pieces of data), namely, a service identifier and a service-specific identifier. Preferably, the card identifier is arranged so that the service identifier occupies five bytes and the service-specific identifier occupies three bytes of the total card identifier value.

The service identifier contained in the field 1106 may be used to distinguish one service from another or distinguishes one vendor from another. That is, for example, a service can be associated with an application that provides the service to the user of a smart card 100 as distinct from a vendor who can provide multiple services to the user by providing multiple applications. The service identifier can be an identifier to identify the application to be used or application location (e.g. URL).

The card identifier can be used to configure generic smart cards for the system 600. Generic smart cards are smart cards 100 having a special service identifier that can be used to provide input to a current application already running. The special value for the service identifier, referred to as "the generic service identifier", is 0x0000000001, where '0x' represents hexadecimal notation (i.e. every two characters of the generic service identifier represent the value of a single byte). A generic smart card can be used to send data to a front application already running on the system 600. For example, a smart card 100 having a keypad user interface that can be used to send text input to an application which has focus or a smart card 100 with personal details that can also be used to submit the personal information stored on the smart card 100 to any application.

A smart card 100 identification authority can assign service identifiers to a vendor when the vendor registers a particular service.

The service-specific identifier contained in the field 1107, as described above, can be optionally used by the vendor of a particular service to provide predetermined functions associated with that particular service. The use of the service-specific identifier is substantially dependent upon an application 904 being executed on the system 600. For example, the service identifier together with the service-specific identifier can be used as a unique identifier for a card 100. This unique identifier can be used by an application 904 to gain or deny access to a specific feature associated with a particular service, to reproduce a specific-service identifier in a log file in order to confirm or verify that a particular smart card 100 having that value was used to access a service, and to provide a unique identifier that can be matched up with a corresponding value in a database in order to retrieve information about the user of the service (eg: name, address, credit card number etc).

Another example of a use for the service-specific identifier can include providing information about a mechanism or mode of distribution of the smart cards 100 (e.g. by mail, bus terminal kiosks, handed out on a train etc). Further, the service-specific identifier, can identify what data is to be loaded into the system 600 when a service is accessed.

The foregoing is not intended to be an exhaustive list of possible uses or applications of the service-specific identifier but a small sample of possible applications and there are many other applications of the service-specific identifier of field 1107.

1.6.2 Card Flags

The flags field 1105 of the header 1100 of FIG. 11 can include three flags.

For the memory card 100A and the CPU card 100B, the flags of the flags field 1105 are as follows:
 (i) Background beep;
 (ii) Move; and
 (iii) Don't Report Background Coordinates.

Table 2 below provides a description of each of the above flags (i) to (iii). The above flags (i) to (iii) affect the functions that the smart card 100 can perform in a reader 300, as is defined by the description of each flag.

TABLE 2

| Name | Description | Value (hex) |
| --- | --- | --- |
| Background Beep | Causes the reader to provide audio feedback whenever the background is touched. | 0x0000 0001 |
| Move | Causes the reader to send all move events from when the touch panel was pressed until the touch panel is released. | 0x0000 0002 |
| Don't Report Background Co-ordinates | Causes the reader to suppress reporting of the co-ordinates of all presses and releases of the touch panel, when they correspond to the background, reporting them instead as (0xFF, 0xFF). | 0x0000 0004 |

1.6.3 Objects

Figure 12:
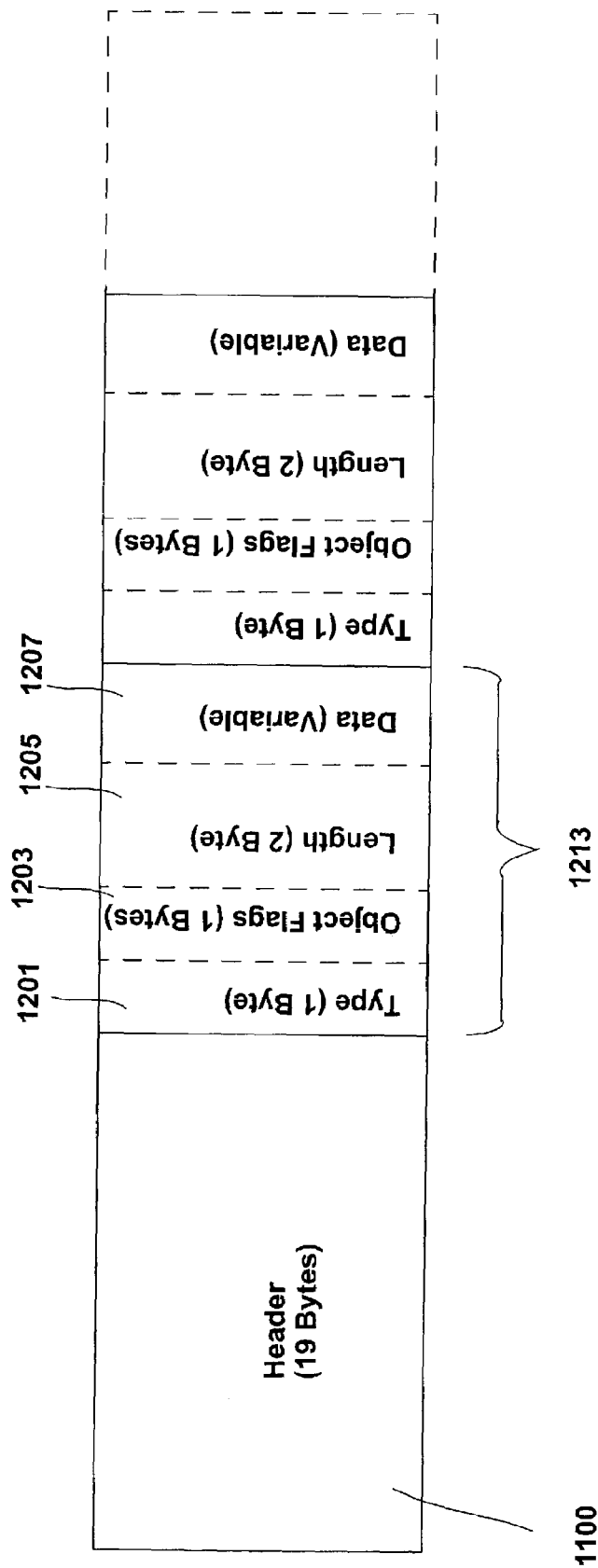
FIG. 12 shows one or more object structures following the card header of FIG. 11.

As shown in FIG. 12, immediately following the card header 1100 of FIG. 11 can be zero or more object structures 1213 defining the objects of a particular smart card 100 and forming part of the data stored on the smart card 100. Each object structure 1213 comprises four fields as follows:
 (i) a type field 1201;
 (ii) an object flags field 1203;
 (iii) a length field 1205; and
 (iv) a data field 1207.

The structure of the data field 1207 depends on the object type as will be described below.

Table 3 below shows a description of each of the fields 1201, 1203, 1205 and 1207 of the object structure 1213.

TABLE 3

| Name | Description (Object Structure) | Length |
| --- | --- | --- |
| Type | The type of object (see Table 5). | 1 byte |
| Object Flags | The general object flags that are associated with this object (see Table 4). Note: Additional flags specific to an object type are specified within the data field of the object. | 1 byte |

TABLE 3-continued

| Name | Description (Object Structure) | Length |
|---|---|---|
| Length | The length of the data following this object. This value can be zero. | 2 bytes |
| Data | The data associated with this object. The structure of this data is dependent on the type of object. | Variable |

The flags field 1203 of the object structure 1213, preferably includes an inactive flag. Table 4 below shows a description of the inactive flag.

TABLE 4

| Name | Description (Pre-Object Flag Values) | Value (hex) |
|---|---|---|
| Inactive | Indicates to the reader that the object is valid but is to be ignored regardless of it's type. | 0x01 |

For the smart card 100, there are preferably eight object types provided, as follows:
 (i) User Interface Element: Text;
 (ii) User Interface Element: Delegator;
 (iii) User Interface Element: Buffer
 (iv) Card Data;
 (v) Fixed Length Data;
 (vi) Reader Insert;
 (vii) No operation; and
 (viii) No operation (single byte).

Table 5 shows a description of each of the above object types (i) to (viii).

TABLE 5

| Name | Description) | Value (hex) |
|---|---|---|
| No operation (single byte) | A single byte object that doesn't have a standard object header. Used to fill spaces on the card that are too small for a normal object header. | 0x00 |
| No Operation | An object that is used to fill blocks of empty space on the card. | 0x01 |
| User Interface Element: Text | A user interface element with raw data. | (inline) 0x10 (file) 0x11 |
| User Interface Element: Buffer | A user interface element which initiates buffered input mode. (CPU card only). | (inline) 0x12 (file) 0x13 |
| User Interface Element: Delegator | A user interface element containing a command to be invoked on another card resident application (CPU card only). | (inline) 0x14 (file) 0x15 |
| Card Data | Contains data that relates specifically to this card. Card data would normally be read by the reader and sent as part of the INSERT message on card insertion. | 0x20 |
| Fixed length Data | An object that can be used to store fixed length blocks of data on the card. | 0x30 |
| Reader Insert | An object that can be used to give instructions to the reader when the card is inserted. | 0x40 |

1.6.3.1 User Interface Element Objects

Each of the user interface element objects of Table 5 define a rectangular area on a smart card 100 and some quantity of associated data that is used to generate an output when the user touches an area of the touch panel 308 over the corresponding rectangular area of the smart card 100. The origin for the coordinate mapping system is the top left of the smart card 100 in accordance with an International Organisation for Standardisation (ISO) standard smart card held in a portrait view with the chip contacts 218, 278 facing away from the viewer and towards the bottom of the smart card 100. For any reader 300 that does not use this card orientation, the values of corner points on the smart card 100 must be adjusted by the reader 300 for the memory card 100A or by the CPU 275 for the CPU card 100B, so as to report a correct "button" press.

The user interface element objects structure preferably has six fields as follows:
 (i) a flags field;
 (ii) an X1 field;
 (iii) an Y1 field;
 (iv) an X2 field;
 (v) a Y2 field; and
 (vi) a data field which typically includes data associated with the user interface element for example, a URL, a command, a character or name.

Table 6 shows a description of each of the above fields for the described user interface element object structure. A press on the touch panel 308 is defined to be inside an area defined by a particular user interface element corresponding to a user interface element object structure if:
 (i) the X value of the press location is greater than or equal to the X1 value of the associated user interface element object and is strictly less than the X2 value for that particular user interface element object; and
 (ii) the Y value for the press location is greater than or equal to the Y1 value of the particular user interface element object and strictly less than the Y2 value.

TABLE 6

| Field | Description (User Interface Object Structure) | Size |
|---|---|---|
| Flags | Flags specific to this user interface element on the card. | 1 byte |
| X1 | X value of the top-left hand corner co-ordinate of this object's rectangle. | 1 byte |
| Y1 | Y value of the top-left hand corner co-ordinate of this object's rectangle. | 1 byte |
| X2 | X value of the bottom-right hand corner co-ordinates of this object's rectangle. | 1 byte |
| Y2 | Y value of the bottom-right hand corner co-ordinate of this object's rectangle. | 1 byte |
| Data | Zero or more bytes of data associated with this object. In memory cards, the actual data is always stored within this field. For CPU cards, this field may contain a file identifier which points to a file where the data is actually stored. The size of this field is determined by the object data size minus the combined size of the above fields. | Variable |

Overlapping user interface elements are allowed. In this case, if a press is within the bounds of more than one user interface element then the object resulting from the press is determined by a Z order. The order of the user interface elements 114, 154 on the smart card 100 defines the Z ordering for all of the user interface elements on that particular smart card 100. The top user interface element is the first user interface element for a particular smart card 100. The bottom user interface element is the last user interface element for that particular smart card 100. This allows for non-rectangular areas to be defined. For example, to define an "L" shaped user interface element, a first user interface element object would be defined with zero bytes in the data field, and a second user interface element object would be defined to the left and below the first user interface element object but overlapping the first user interface element object. The second user interface element would contain the data that is to be associated with the "L" shaped user interface element.

The location of a press is reported in "fingels", which represent finger elements (analogous to "pixels" which represent picture elements). The height of a fingel is defined to be ½56th of the length of an International Organisation for Standardisation (ISO) memory smart card and the width is defined to be ⅛28th of the width of an International Standards Organisation memory smart card.

The behaviour associated with each user interface element 114, 154 may be modified using one or more flags. For both the memory card 100A and the CPU card 100B, each user interface element 154 preferably has seven associated flags as follows:
 (i) Beep;
 (ii) Move;
 (iii) Don't report coordinates;
 (iv) Auto repeat;
 (v) Do Not Send Data on Press;
 (vi) Do Not Send Data on Release; and
 (vii) Encrypt Out-going data.

Table 7 shows a description for each of the user interface element flags (i) to (vii).

TABLE 7

| Name | Description | Value |
|---|---|---|
| Beep | This flag causes the reader to beep when the user interface element is pressed. | 0x01 |
| Don't Report Co-ordinates | This flag instructs the reader to suppress reporting of the co-ordinates of the associated press or release, reporting them instead as (0xFF, 0xFF). | 0x04 |
| Auto-repeat | This element automatically repeats when the press is held on the element. | 0x08 |
| Don't Send Data on Press | This causes the associated user interface element not to send the data associated with this user interface element in the press event. The default is to send the data associated with the user interface element in the press event. | 0x10 |
| Don't Send Data on Release | This causes this user interface element not to send the data associated with this user interface element in the release event. The default is to send the data associated with the user interface element in the release event. | 0x20 |
| Encrypt Outgoing Data | This causes the data associated with the user interface element to be encrypted using a previously agreed upon session key. If no session key is present, no data is sent. (CPU cards only). | 0x40 |

Data associated with a user interface element 114, 154 on the smart card 100 can be referenced as 'Inline Data' which is stored directly in the data field of a user interface element. However, for the CPU card 100B, data associated with a user interface element can also be referenced as 'File Data'. File data is stored in a separate elementary file in the storage means 276 of the microprocessor 259 and the structure of data field associated with such an elementary file is shown in Table 8.

TABLE 8

| Name | Length | Description |
|---|---|---|
| File_id | 2 bytes | The 16-bit ISO identifier corresponding to the required file |
| Header | variable | A variable length header, which is prepended to the file contents in order to identify the user interface element. This may be empty. |

1.6.3.2 Card Data

The card data object is used to store data, which is specific to a particular card 100. The data layout for this object has no fixed form. The contents of the card data object are sent from the reader 300 as part of an INSERT message when the smart card 100 is inserted into the reader 300.

1.6.3.4 Fixed Length Data

The fixed length data object is used to define a fixed length block on the smart card 100 that can be written to by the computer 700, for example.

1.6.3.5 Reader Insert

The reader insert object is used to store instructions for the reader 300 when a particular smart card 100 is inserted. This can be used, for example, to instruct the reader 300 to use a specific configuration of infra-red commands to allow communication with a specific set top box (e.g. 601) or TV.

1.6.3.6 No Operation

The No Operation object is used to fill in unused sections between other objects on a particular smart card 100. Any data stored in the no operation object is ignored by the reader 300. Any unused space at the end of the smart card 100 does not need to be filled in with a no operation object.

1.6.3.7 No Operation (One Byte)

The No Operation (One Byte) object is used to fill gaps between objects that are too small for a full object structure. These objects are only one byte long in total.

1.7 Reader Protocol

The reader 300 uses a datagram protocol that supports both uni-directional and bi-directional communication between the reader 300 and the set top box 601 or computer 700, for example. The format used for messages from the reader 300 as a result of user interactions with the smart card 100 are of a different format than those that are sent to the reader 300.

1.7.1 Incoming Message Types

There are at least seven message event types that can be sent by the reader 300. These message events are as follows:
 (i) INSERT: When a smart card 100 is inserted into the reader 300, and the smart card 100 is validated, an INSERT event is generated by the reader 300 and an associated message is transmitted. This message announces the smart card 100 to a remote module (e.g. the set top box 601). The INSERT message preferably can include the particular card identifier and allow applications to be started or fetched immediately upon the smart card 100 insertion rather than waiting until the first interaction takes place. The INSERT message preferably includes the contents of the card data object from the smart card 100 inserted into the reader 300 if an object of this type is present on the smart card 100.
 (ii) REMOVE: When a smart card 100 is removed from the reader 300, a corresponding REMOVE event is generated and a REMOVE message is sent to the particular remote module associated with the reader 300. Like the INSERT message, the associated card identifier can be transmitted along with the message. As the card identifier cannot be read from the now removed smart card 100, the card identifier is stored in the memory 1047 of the reader 300. This is a useful optimisation as the card identifier is required for all other messages and reading the card identifier from the smart card 100 each time the card identifier is required can be too slow. INSERT and REMOVE messages are not relied upon by the system 600 to control processing.

The system 600 is configured to infer missing messages if a message is received and is not immediately expected. For example, if an application detects two INSERT messages in a row, then an application can assume that it has missed the REMOVE message associated with the smart card 100 of the first INSERT message, as typically two smart cards 100 are not inserted into the reader 300 at one time. The application can then take whatever action is required prior to processing the second INSERT message.

Another example of where a missing message can occur is where a hand-held, infrared connected reader 300 as shown in FIG. 6(*b*), as compared with a wired reader 300 as shown in FIG. 6(*a*), is being used. Often a user does not point the reader 300 directly at a remote module when inserting or removing cards. This problem can be corrected by the system 600 inferring the INSERT or REMOVE operations based on differing card identifiers in consecutive PRESS and RELEASE pairs.

(iii) BAD CARD: If an invalid smart card 100 is inserted, then the reader 300 is preferably configured to generate a BAD CARD event and to send a BAD CARD message. This message allows an associated remote module to take some action to alert the user to the invalid smart card 100.

(iv) PRESS: When a touch is detected by the reader 300, a PRESS event is generated and a PRESS message is sent to an associated remote module. The PRESS message can contain details of an associated memory card, the position of the press and the data associated with the user-interface element at that particular position. If there is no user interface element defined for that position (including if there is no user interface element defined on the smart card 100 at all) a PRESS message is sent containing details of the associated smart card 100 and the position of the press. If there is no card present in the reader 300 when a PRESS event is generated then a PRESS message is sent containing the special "NO_CARD" identifier (i.e. eight bytes of zero—0x00) and the position of the press.

(v) RELEASE: A RELEASE event complements the PRESS event and a RELEASE message can be sent in order to inform an application program of the system 600 that a PRESS has been lifted. Every PRESS event preferably has a corresponding RELEASE event. Readers can allow multiple presses to be registered or provide other events that may occur between PRESS and RELEASE messages.

(vi) MOVE: If, after processing a PRESS event, the touch position changes by a certain amount then the finger (or whatever is being used to touch the smart card 100) is assumed to be moving. MOVE EVENTS are generated and MOVE messages are sent until the touch is lifted. MOVE events auto-repeat by re-sending the last MOVE messages when the touch position remains stationary. The repeated sending finishes when the touch is lifted and a corresponding RELEASE message is sent. Unlike PRESS and RELEASE events there is no user-interface object involved with MOVE events.

(vii) LOW BATT: A LOW BATT event is generated and a LOW BATT message is sent when the battery 1053 in the reader 300 is getting low. This message is sent after user interactions to increase the chance that the message will be received by the rest of the system 600. The sending of the LOW BATT message does not prevent the reader 300 from entering a low power state.

As described above, the card identifier is included in every INSERT, REMOVE, PRESS, RELEASE and MOVE message sent from the reader 300 to the computer 100 or set-top box 601. As an alternative, the card identifier can be sent in connection with an INSERT message only. In this instance, upon insertion of a new smart card 100, the reader 300 generates a session identifier. The session identifier is configured to identify a current session of a card insertion. The session identifier, for example, can be a pseudo-random number represented with two bytes of data or the session identifier can be a number that is incremented each time a smart card 100 is inserted and reset to zero when a predetermined value is reached. In this case, the reader 300 sends an INSERT message to the computer 700 or the set-top box 601, which includes a card identifier as previously described above and a session identifier which is generated for each new smart card 100 insertion. All subsequent PRESS, RELEASE and MOVE messages need not include the card identifier but will include the session identifier and user interface element object data or press coordinates previously described.

When using a session identifier, the system 600 operates as described above with reference to FIGS. 6(*a*) and 6(*b*), except that the event manager 901, upon receiving an INSERT message from the reader 300, stores the session identifier as the current session identifier and a card identifier as the current card identifier. When the event manager 901 receives a PRESS, RELEASE or MOVE message, the event manager 901 checks that the session identifier is equal to the current session identifier. If so, the event manager 901 sets a card identifier used in all messages to the current card identifier. Otherwise, if the session identifier is not equal to the current session identifier, the event manager 901 informs the user, via the display manager 306, and the display device 101, that a message has been received without a corresponding INSERT message. The user, for example, is then requested to remove and reinsert the card 100.

1.7.2 Outgoing Message Types

There are at least two message types that can be sent to the reader 300 from a remote module such as the set top box 601, for example. In both cases, the reader 300 is expected to send a reply to the message. These message types are as follows:

(i) STATUS: detailed information regarding the status of the reader 300 can be requested by the event manager 901 by sending a STATUS message; and (ii) EXCHANGE application protocol data unit: this message sends part of an application protocol data unit to a CPU card (e.g. the card 100B). An entire application protocol data unit EXCHANGE request is preferably split up into multiple sequential messages. The length of these messages (including a header and footer) preferably does not exceed the buffer capacity of the reader 300., This buffer capacity can be determined using the STATUS message.

1.7.3 Data Formats

The data format of the reader 300 protocol used in the system 600 is a fixed size header followed by a variable length data field. The variable length data field can be zero bytes or more in length, followed by an eight bit check-sum and complement.

1.7.4 Incoming Message Header

The incoming message header is preferably of a fixed length and is prepended to (i.e. appended to, but in front of) all messages sent from the reader 300 to a set top box 601, for example. It is necessary to keep the incoming message header as small as possible due to any bandwidth restrictions that may be imposed. Table 9 below shows the format of the incoming message header that is sent from a reader 300 to a remote module such as the set top-box 601. The service and service-specific identifier are the same for a given smart card 100. A service specific identifier is preferably set by a vendor for use with a particular application. The reader identifier (ID) of Table 9 is also in the header of each message. The reader identifier can be used by an application 304 to distinguish different users, for example, in a multi-player game application.

TABLE 9

| Field | Description (Incoming Message Header Format) | Bytes |
|---|---|---|
| Preamble | Preamble to the message. Value is always 0xAA 0x55 (bit sequence 10101010 01010101). This is to make it easier for the event manager 901 to find the beginning of a message. | 2 |
| Version | The version of a user interface card infrared message protocol this messages uses. This version of the protocol is version 1(0x01 in the version field) | 1 |
| Type | Type of message. This is one of the values given in Table 10. | 1 |
| Reader ID | The 16 bit ID of the reader that sent the message. This number is a pseudo-random generated number that is changed when the battery is replaced in the reader. This is needed to distinguish readers when multiple readers are being used with applications. | 2 |
| Service | Service identifier as stored on the card. | 5 |
| Service-specific | Service-specific identifier as stored on the card. | 3 |

Table 10 shows a table listing the message event types that have been described above.

TABLE 10

| Name | Description (Message Type Codes) | Code |
|---|---|---|
| INSERT | A card has been inserted into the reader. | 'I' |
| REMOVE | The card has been removed from the reader. | 'E' |
| PRESS | The touch panel has been pressed. | 'P' |
| RELEASE | The press on the touch panel has been released. | 'R' |
| MOVE | The press position has moved but the press has not been released. | 'M' |
| BADCARD | A card has been inserted however it has not passed validation. | 'B' |
| LOW_BATT | The battery in the reader is getting flat. | 'L' |

1.7.3.1 Simple Messages

A number of message types are considered simple in that they consist solely of the incoming message header described above, followed by the message checksum byte and its complement. For example, a BADCARD message, a LOW_BATT message and a REMOVE message are considered to be simple messages. Table 11 shows the format of a simple message.

TABLE 11

| Field | Description (Simple Message Format) | Bytes |
|---|---|---|
| Header | Incoming message header as defined in Table 9. | 14 |
| Checksum | Message checksum. This is the sum of all the bytes in the message. | 1 |
| Checksum' | The 1's complement of the checksum. | 1 |

1.7.3.2 MOVE Messages

MOVE messages are formed of the incoming message header described above followed by two fields defining the coordinates of the touch position on the touch panel 308 of the reader 300. Table 12 shows the format of a MOVE message.

TABLE 12

| Field | Description (Move Message Format) | Bytes |
|---|---|---|
| Header | Incoming message header as defined in Table 9. | 14 |
| X | The X co-ordinate of the touch position. | 1 |
| Y | The Y co-ordinate of the touch position. | 1 |
| Checksum | Message checksum. This is the sum of all the bytes in the message. | 1 |
| Checksum' | The 1's complement of the checksum. | 1 |

1.7.3.3 PRESS and RELEASE Messages

Table 13, below, shows the format of PRESS and RELEASE messages. PRESS and RELEASE messages, like MOVE messages contain the incoming message header and touch coordinates. In addition, PRESS and RELEASE messages send data associated with a user-interface element 114, 154 if the touch position matches a user-interface element object defined on the smart card 100. This data is of variable length, the actual size being defined by a corresponding smart card 100. If the touched position does not match a user-interface element object defined on the smart card 100 (including if no user-interface elements are defined on the smart card 100), zero bytes of data associated with user interface elements are sent. If there is no smart card 100 in the reader 300 then the service identifiers are all set to zero (ie 0x00) and zero bytes of data associated with the user-interface elements are transmitted to the remote module (e.g. the set top box 601). The data associated with the user interface element normally corresponds to the data associated with the user interface element defined on the smart card 100 but may be modified or generated by processing on the smart card 100 or reader 300.

TABLE 13

| Field | Description (Press and Release Message Format) | Bytes |
|---|---|---|
| Header | Incoming message header as defined by Table 9. | 14 |
| X | The X co-ordinate of the touch position. | 1 |
| Y | The Y co-ordinate of the touch position. | 1 |
| Length | The number of bytes of data. Can be zero. | 2 |
| Data | The data associated with the user interface element. | Length |
| Checksum | Message checksum. This is the sum of all the bytes in the message. | 1 |
| Checksum' | The 1's complement of the checksum. | 1 |

1.7.4 Outgoing Message Header

The outgoing message header is preferably of a fixed length and is prepended to (i.e. appended to, but in front of) all messages sent to the reader 300 from a set top box 601, for example. The outgoing message header is preferably configured as small as possible due to any bandwidth restrictions that may be imposed. Table 11, below, shows the format of the outgoing message header that is sent to a reader 300 from a remote module such as the set top-box 601. The reader identifier (ID) of Table 14 is also in the outgoing header of each message, and matches the reader identifier of the reader 300 that a corresponding message is intended for.

TABLE 14

| Field | Description (Outgoing message header Format) | Bytes |
|---|---|---|
| Preamble | Preamble to the message. Value is always 0xAA 0x55 (bit sequence 10101010 01010101). This is to make it easier for the event manager 901 to find the beginning of a message. | 2 |
| Version | The version of the user interface card infrared message protocol this messages uses. This version of the protocol is version 1(0x01 in the version field) | 1 |
| Type | Type of message. This is one of the values given in Table 10. | 1 |
| Reader ID | The 16 bit id of the reader that is to receive the message | 2 |

Table 15, below, lists the message event types that have been described above. The codes for incoming replies (i.e., replies from a remote module such as the set top box 601) are equivalent to the codes for their corresponding outgoing requests (i.e., requests sent from the reader 300 to a remote module), but in lower case.

TABLE 15

| Name | Description | Code |
|---|---|---|
| Status | Information is requested about the current status of the reader. | 'S' ('s') |
| Exchange Application Protocol Data Unit | CPU card only: the reader is instructed to forward Application Protocol Data Unit data to the card and return the response when done. | 'A' ('a') |

Substantially all incoming messages follow the incoming message hearder format.

1.7.5 INSERT Messages

INSERT messages are formed of the message header (i.e., the incoming message header described above) and the contents of the card data object from an inserted smart card 100. Table 16 below shows the format of an INSERT message.

TABLE 16

| Field | Description (INSERT Message Format) | Bytes |
|---|---|---|
| Header | Message header as defined in Table 9. | 14 |
| Length | The number of bytes of data. Can be zero. | 2 |
| Data | The data from a Card Data object on the card. | Length |
| Checksum | Message checksum. This is the sum of all the bytes in a message. | 1 |
| Checksum' | The 1's complement of the checksum. | 1 |

Figure 13:
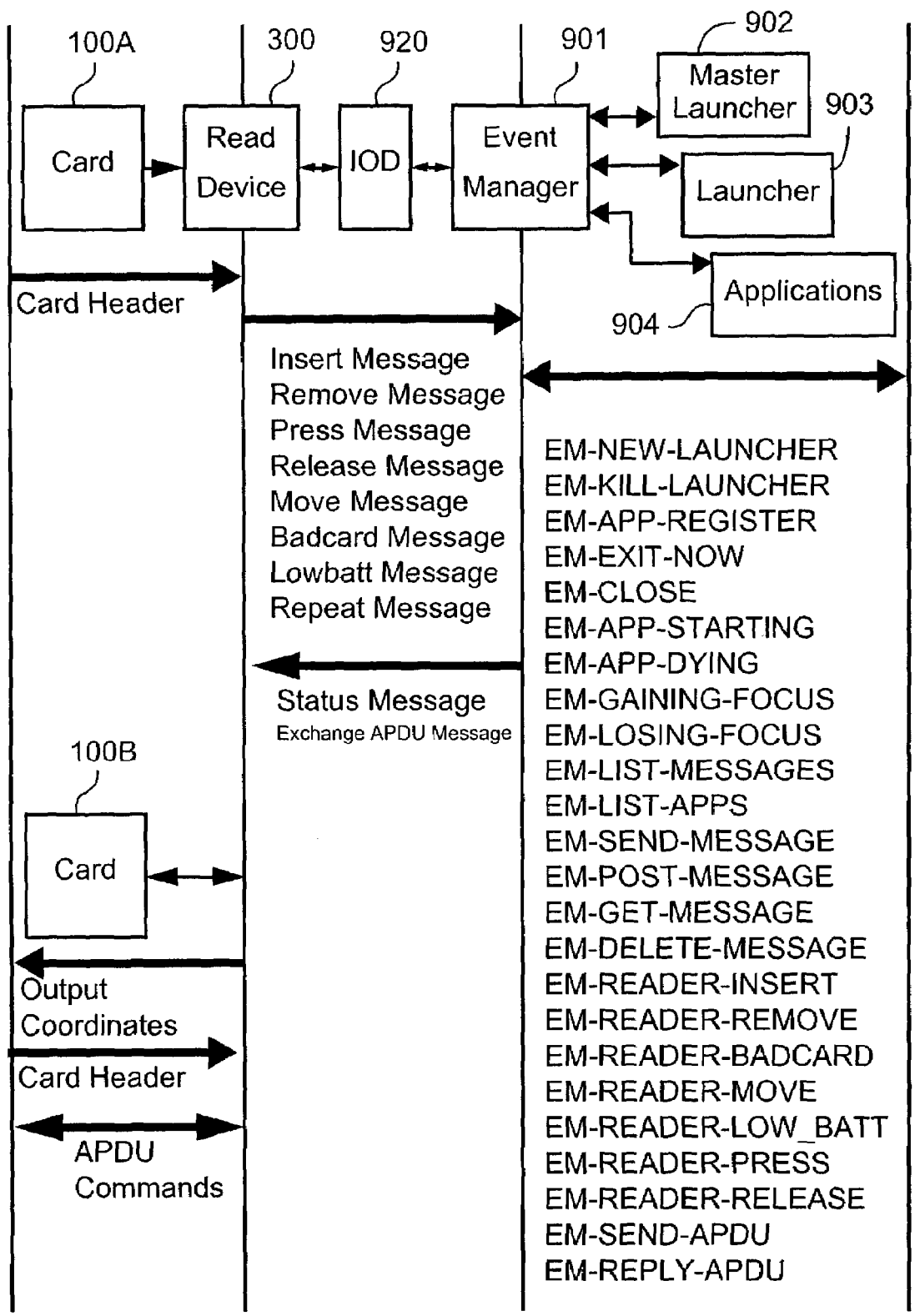
FIG. 13 is a data flow diagram showing the flow of messages within the system of FIGS. 6(a) and 6(b)
Figure 27:
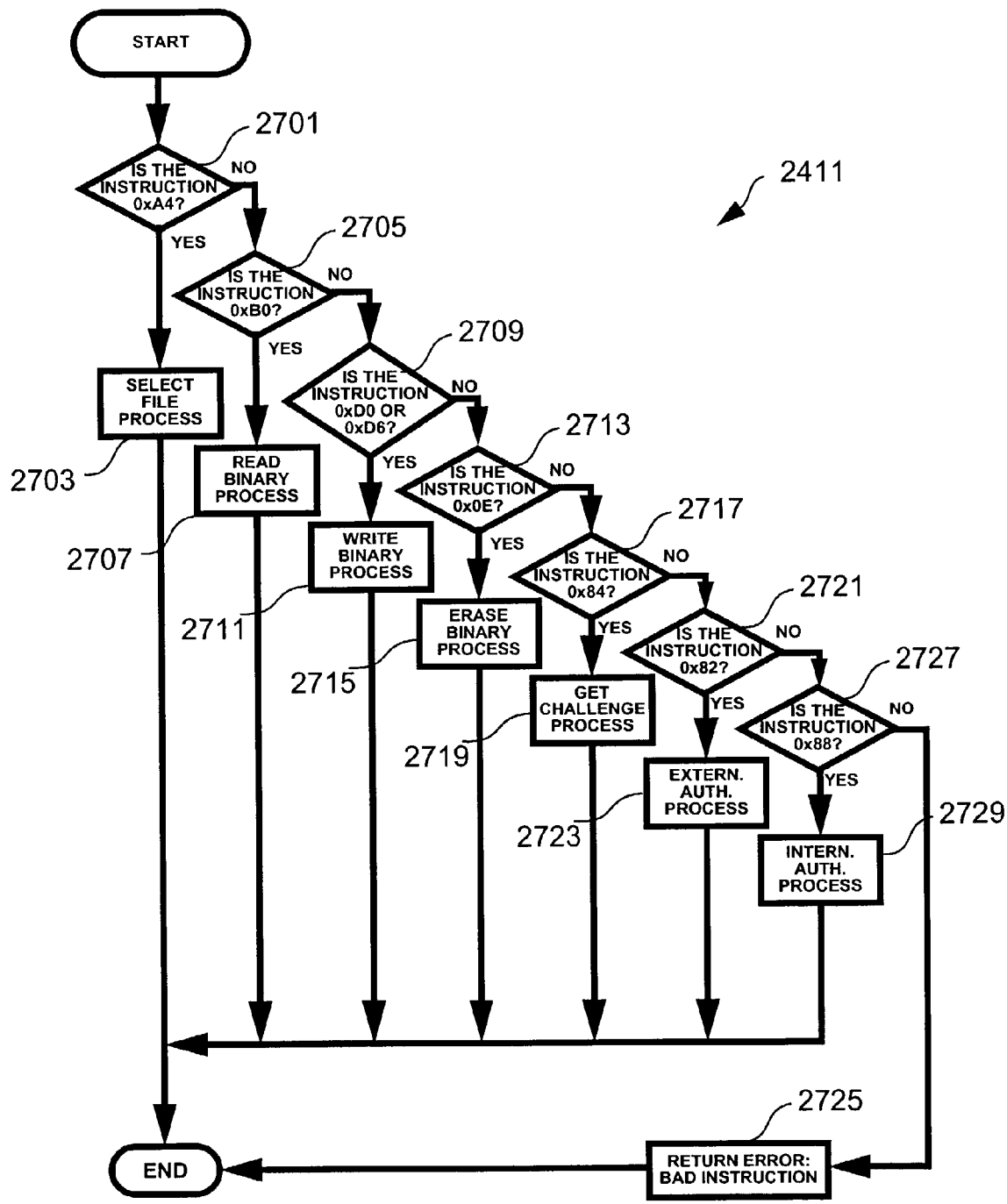
FIG. 27 is a flow diagram showing an International Standards Organisation (ISO) instruction process.

FIG. 13 is a data flow diagram showing the flow of the above-described messages within the system 600 for a smart card 100. As seen in FIG. 27, the card header 1100 and object structure 1213 are read by the CPU 1045 of the reader 300 which sends a corresponding INSERT, REMOVE, PRESS, RELEASE, MOVE, BADCARD or LOW BAT message to the event manager 901 via the I/O daemon 920. The event manager 901 can have up to twenty-one core messages, which are sent to and received from the master launcher 902, launcher 903 and applications 904.

1.7.6 STATUS Messages

STATUS request messages are formed of the message header described above and the contents of the card data object from an inserted smart card 100.

Information requested by a STATUS request message is indicated by a bit field within the message body. The bit field is preferably at least one byte long. The structure of a STATUS request message body is shown in Table 17, as follows:

TABLE 17

| Field | Description | Bytes |
|---|---|---|
| Count | The number of bytes in the following bitfield. | 1 |
| Bitfield | Encodes the parameters to be returned (see Table 10) | 1 or more |
| Checksum | Message checksum. This is the sum of all the bytes in the message. | 1 |
| Checksum | The 1's complement of the checksum | 1 |

A reply message body essentially contains a sequence of the structure shown in Table 18, as follows:

TABLE 18

| Field | Description | Bytes |
|---|---|---|
| Length | The length of the current data element | 2 |
| Data | Requested data | Length |

The sequence of elements of Table 18 contains requested data in order, from the first requested field (i.e., most significant '1' of the first byte) to the last requested field (i.e., least significant '1' of the last byte). A 2 byte length field precedes each data element.

The reply is followed by the message checksum and the 1's complement of the message checksum.

The first request parameter byte contains flags, as shown in Table 19, below:

TABLE 19

| Value | Name | Description |
|---|---|---|
| 0x80 | Firmware version | Requests the firmware version of the reader |
| 0x40 | Reader buffer | Requests the size of the reader's message input buffer |
| 0x20 | Initial sequence number | Requests the sequence number currently expected by the reader for other outgoing commands. |
| 0x10 | Card type | Requests the type of card (if present). 1 byte response:<br>0x00 = no card<br>0x08 = I2C (S = 8) memory card<br>0x09 = 3-wire bus (S = 9) memory card<br>0x0a = 2-wire bus (S = A) memory card<br>0x10 = T = 0 protocol CPU card<br>0x11 = T = 1 protocol CPU card<br>0xff = bad card |
| 0x80 | Card ATR (Answer-to-Reset) | Requests the answer-to-reset of the card. With some combinations of readers and cards, this field might be impossible to return. In this instance, no data is returned for this field. |
| 0x04 | Card Manufacturer data | Requests the manufacturer data associated with the currently inserted card. With some combinations of readers and cards, this field might be impossible to return. In this instance, no data is returned for this field. |

TABLE 19-continued

| Value | Name | Description |
|---|---|---|
| 0x02 | User Interface (UI) card image size | Requests the number of bytes contained within the User Interface Card image on the currently inserted card. If a card is not present or bad, or this information is otherwise not available, no data is returned. Otherwise, the length of the response is always 2 bytes, in big-endian (network) byte order. |
| 0x01 | User Interface Card header | Requests the entire header of the currently inserted card, if present. If a card is not present or bad, no data is returned. |

1.7.7 Exchange Application Protocol Data Unit Message

An application protocol data unit exchange request is preferably split up into multiple sequential messages. The length of such messages (including header and footer) preferably does not exceed the buffer capacity of the reader 300. This buffer capacity can be determined using the STATUS command.

The structure of the exchange request message body is shown in Table 20, as follows:

TABLE 20

| Field | Description | Bytes |
|---|---|---|
| Sequence number | The sequence number of this message | 1 |
| Card ID | Card ID as stored on the card. | Variable |
| Data length | The length of the following field | Variable |
| Application Protocol Data Unit data | Part of the application protocol data unit to be sent to the application. This field is coded according to the structure defined in sections 5.3 of "ISO/IEC 7816-4 Standards, Part 4: Electronic Signals and Transmission Protocol" [hereinafter referred to as the 'ISO 7816-4 standards']. | Data length |
| Checksum | Message Checksum. This is the sum of all the bytes in the message. | 1 |
| Checksum' | The 1's complement of the checksum | 1 |

The reply message body has the following structure as shown in Table 21, below:

TABLE 21

| Field | Description | Bytes |
|---|---|---|
| Status Code | 0 on successful completion. | 1 |
| Length | Card ID as stored on the card. | Variable |
| Response | The length of the following field | Length |
| Checksum | Part of the application protocol data unit to be sent to the application. This field is coded according to the structure defined in section 5.3 of ISO 7816-4. | 1 |
| Checksum' | Message Checksum. This is the sum of all the bytes in the message. | 1 |

If the status code field of the exchange request message body indicates that more command data is required, a subsequent message is expected containing the next block of command data.

Essentially, the exchange request message provides a mechanism whereby a remote application executing on a remote module such as the server 652, can directly issue commands to the card 100B. Alternatively, a remote application running on a computer 700 or set top box 601 can directly issue commands to the card 100B. Such a remote application can communicate with either the user interface card resident application (i.e., the application program executing on the CPU card 100B that provides the user interface functions of the CPU card 100B) or other applications stored on the card 100B, in order, for example, to perform financial transactions.

In order for a remote application to communicate with another card-resident application, a channel to the card-resident application is established through the user interface card resident application. Such a channel is established by the remote application sending a CREATE CHANNEL command and sending subsequent application protocol data units with an associated class byte set to indicate channel 1. The CREATE CHANNEL command will be described in detail below.

1.8 Example

The operation of the system 600 will now be further explained with reference to the following example. The system 600 is customisable by virtue of a user being able to utilise a number of different smart cards 100 to perform corresponding different operations. For example, with particular reference to the system 600B, FIG. 14(*a*) shows a memory card 100C which according to the user interface elements 1414 printed thereon is configured for the retrieval of on-line music associated with an Internet site entitled "Blues Guitar Masters". The on-line music can be accessed over the system 600B using the memory card 100C and then purchased using a CPU card 100D configured for use with an electronic banking application, as will be explained below with reference to FIGS. 15(*a*) and 15(*b*).

Alternatively, other functions may be performed on the system 600B, using different smart cards 100, such as home shopping, ordering home delivery fast food such a pizzas, and the like. In each instance, insertion of an appropriate smart card 100 into the reader 300 causes a corresponding computer application to commence operation, either within the set-top box 601 or the computer system 700, in order to service user commands entered via the reader 300 and to return appropriate information for audio-visual feedback to the user.

For the memory card 100C, on-line music is provided as data to the set-top box 601 which permits reproduction of audio and any related visual images on the output device 616 or the display 701 of the computer system 700. The user interface elements 1414 of the memory card 100C are in the form of a "play button" 1401, a "rewind button" 1403, a "fast forward button" 1405, a "stop button" 1407, a "select button" 1409, a "record button" 1411 and a two-way directional controller 1413, printed on a front face 1416 of the memory card 100C.

Figures 14A, 14B:
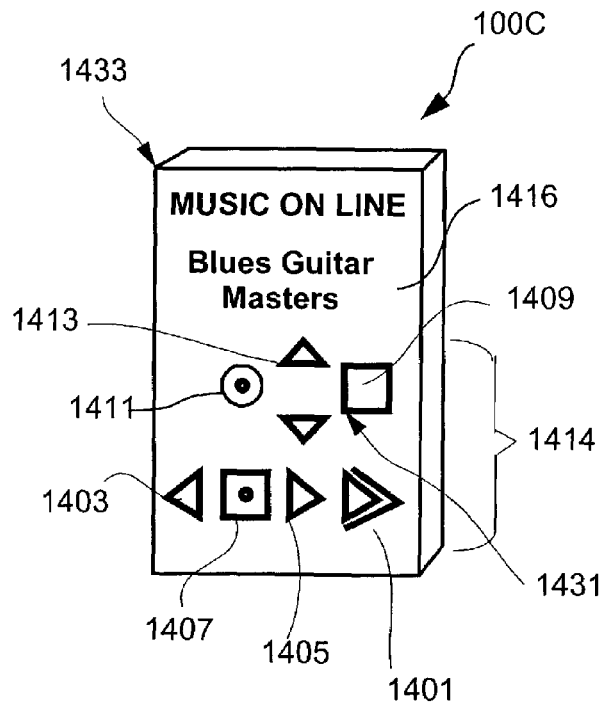
FIG. 14(a) is a perspective view of still another smart card.
FIG. 14(b) shows user interface element objects associated with the smart card of FIG. 14(a)

FIG. 14(*b*) is a table showing user interface element objects (e.g. 1431) associated with each of the user interface elements 1401 to 1417. The user interface element objects (e.g. 1431) are stored in a memory (not shown) formed within the memory card 100C similar to the memory 219 of the memory card 100A. As described above with reference to Table 6 and as shown in FIG. 14(*b*), each of the user interface element objects (e.g. 1431) has six fields being a flags field 1420, an X1 field 1421, a Y1 field 1422, an X2 field 1423, a Y2 field 1424 and a data field 1425, describing the position of and data associated with a corresponding user interface element. For example, the flags field 1420 for the select button 1409 is a one byte field set to a hexadecimal value of '0x020' (0x representing hexadecimal notation), indicating that data associated with the select button 1409 is not to be sent in a release event, as described above with reference to Table 7. The X1 field 1421 associated with the select button 1409 is a one byte field set to a value of '0007' indicating the coordinate value of the bottom left hand point 1431 of the user interface element 1409 with respect to the top left point 1433 of the memory card 100C, as described above with reference to Table 6. The data field 1425 is a variable size field which in the case of the select button 1409 is a value corresponding to an 'Enter' and/or 'Carriage Return' function.

The memory card 100C also includes a card data object as described above with reference to Table 5. The card data object contains data that relates specifically to a particular smart card 100 and is normally sent as part of an INSERT message, upon the smart card 100 being inserted into the reader 300. In the case of the memory card 100C, the card data object indicates a URL, 'www.bluesguitarmasters.com', corresponding to the address of the 'Blues Guitar Masters' Internet site. A person skilled in the relevant art would appreciate that the URL is stored in the memory of the memory card 100C in a digital format corresponding to the American Standard Code for Information Interchange (ASCII) values of the characters making up the URL. Alternatively, a card identifier can be stored in the memory of the memory card 100C and can be mapped to the URL by the directory service 911.

The memory card 100C also includes a card identifier, as described with reference to Table 1, stored in the memory of the memory card 100C. The card identifier includes a service identifier which in the case of the memory card 100C can be mapped to the URL, 'www.bluesguitarmasters.com', corresponding to the address of the 'Blues Guitar Masters' Internet site by the directory service 911. The card identifier also includes a service-specific identifier which in this case is a three-byte vendor identifier related to the vendor of the Blues Guitar Masters Internet site. The service-specific identifier can be assigned by the provider of the service (e.g. the vendor of the Blues Guitar Masters Internet site), and can be equal to any particular three-byte value. Each card 100 associated with the 'Blues Guitar Masters' Internet site, for example, can have a different service-specific identifier.

For the CPU card 100D, the user interface elements 1514 are in the form of a numerical keypad 1560, an "OK button" 1562, a "cancel button" 1564, a "clear button" 1566, a "backspace button" 1568, and a four way directional controller 1570 printed on the front face 1556 thereof.

Figure 15A:
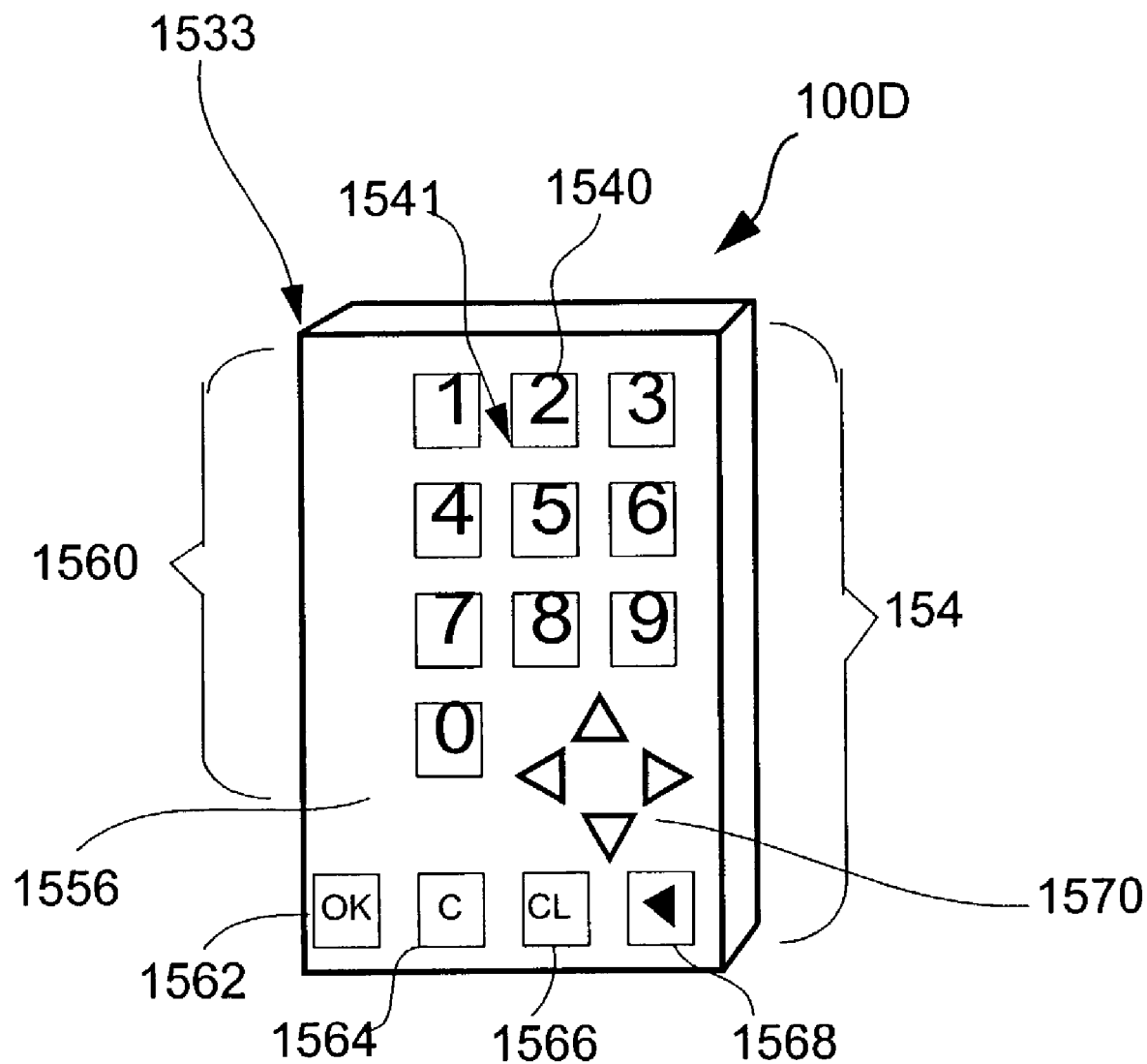
FIG. 15(a) is a perspective view of still another smart card.

Similar to the memory card 100C, each of the user interface elements 1514 of the CPU card 100D has at least one associated user interface element object (e.g. 1531) stored in a storage means (not shown) formed within the CPU card 100D similar to the storage means 276 of the CPU card 100B. Again, as described above with reference to Table 6 and as shown in FIG. 15(*b*), each of the user interface element objects (e.g. 1531) has six fields being a flags field 1520, an X1 field 1521, a Y1 field 1522, an X2 field 1523, a Y2 field 1524 and a data field 1525, describing the position of and data associated with a corresponding user interface element. For example, the X1 field 1521 associated with the "number 2 button" 1540 of the numerical keypad 1560, is a one byte field set to a value of "0005" indicating the coordinate value of the bottom left hand point 1541 of the user interface element 1540 with respect to the top left point 1533 of the CPU card 100D. The data field 1525 of the "number 2 button" 1540 is a variable size field which in the case of the CPU card 100D value corresponds to a hexadecimal representation corresponding to the ASCII value of the character '2'.

The CPU card 100D also includes a card data object, as described above with reference to Table 5. In the case of the CPU card 100D, the card data object indicates a URL (e.g. www.anz.com), corresponding to the address of an electronic banking Internet page. A person skilled in the relevant art would appreciate that the URL is stored in the storage means of the CPU card 100D in a digital format corresponding to the ASCII values of the characters making up the URL.

Similar to the memory card 100C, the CPU card 100D also includes a card identifier, as described with reference to a Table 1 stored in the storage means of the CPU card 100D. The card identifier includes a service identifier, which in the case of the CPU card 100D can be mapped to the URL corresponding to the electronic banking application (e.g. www.anz.com). The card identifier also includes a service-specific identifier, which in this case is a three-byte vendor identifier. The service-specific identifier can be related to the vendor of the electronic banking package (e.g. the Australia New Zealand Banking Group Limited). Again, each CPU card 100B associated with the electronic banking package, for example, can have a different service-specific identifier.

Figure 16:
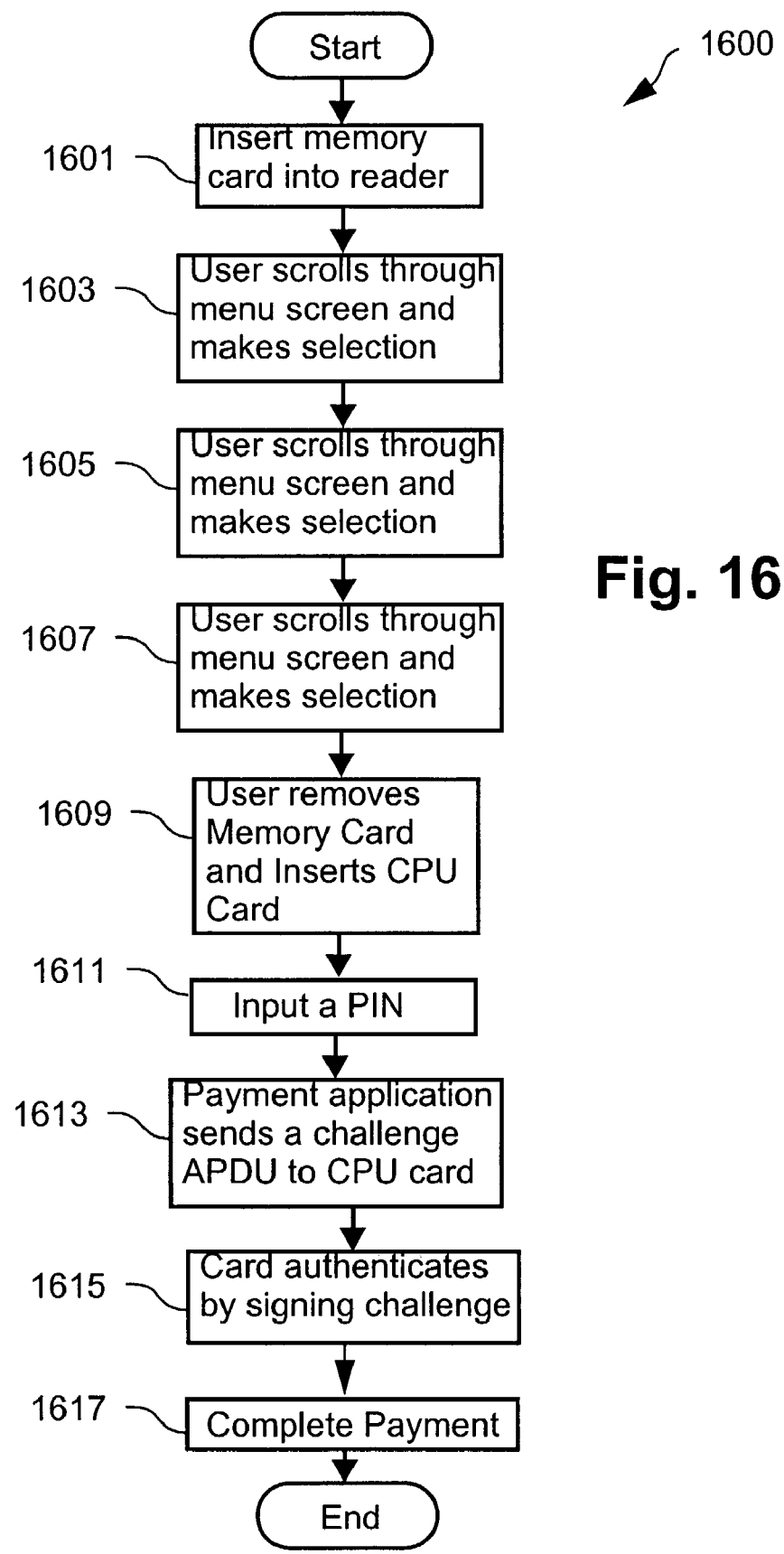
FIG. 16 is a flow diagram showing steps performed by a user in order to retrieve on-line music, over the smart card interface system of FIG. 6(b)
Figure 17A:
FIGS. 17(a) to 17(e) show a number of examples of display output available from the system of FIG. 6(b)
Figure 17B:
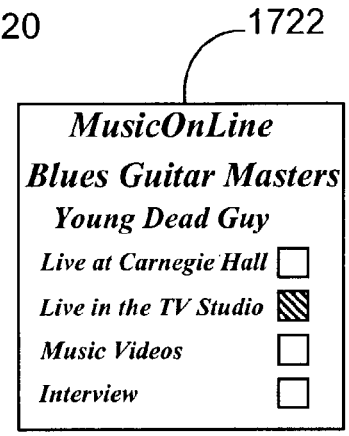
Figure 17C:
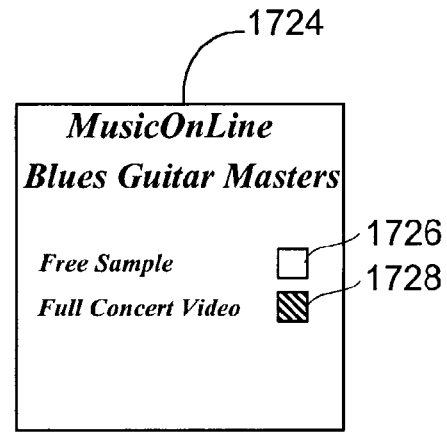
Figure 17D:
Figure 17E:
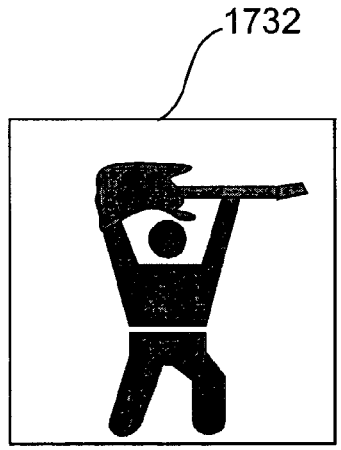

FIG. 16 is a flow diagram showing the steps 1600 performed by a user in order to retrieve on-line music associated with the Blues Guitar Masters Internet site, over the card interface system 600B. At the initial step 1601, the user inserts the memory card 100C into the reader 300. As will be explained in further detail later in this document, having inserted the memory card 100C into the reader 300, an application associated with the Blues Guitar Masters Internet page commences, for example on the server computer 650, and returns to the set-top box 601 for display on the output device 616 a first menu screen 1720, as seen in FIG. 17(*a*), relating to a function to be performed, in this case a selection of Blues Guitar Masters. Then at the next step 1603, using the reader 300 to select the two-way directional controller 1413, the user scrolls through the various offerings to make a desired selection, in this case for an artist called Young Dead Guy. In response to the user's selection, a further menu screen 1722, as seen in FIG. 17(*b*), is then displayed on the output device 616 advising the user of the possible selections that may be made. At the next step 1605, the user scrolls the menu screen 1722 by selecting the two-way directional controller 1413, and makes a further desired selection. In response to the user's selection at step 1605, a further menu screen 1724 is then displayed on the output device 616 as seen in FIG. 17(*c*) advising the user of the further possible selections that may be made.

In accordance with this example, the user can access a free sample video clip or a full concert music video corresponding to the selection at step 1605, depending on the 'Quality of Service' that the user wishes to access from the Blues Guitar Masters Internet site. For example, if the user only wishes to access a one-minute free sample of the video clip corresponding to the selection at step 1605, then the user can select the 'Free Sample' item 1726 on the menu screen 1724. Otherwise, the user can select the 'Full Concert Video' item 1728 which will require the user to pay some associated fee for service. At the next step 1607, the user selects the 'Full Concert Video' item 1728. In response to the user's selection at step 1607, a further screen 1730 is then displayed on the output device 616 as seen in FIG. 17(*d*) advising the user to insert a payment card (e.g. the CPU card 100D) into the reader 300. The screen 1730 also advises the user of the fee amount and of a 'Biller Code' associated with the vendor of the Blues Guitar Masters Internet site. At the next step 1609, the user removes the memory card 100C and inserts the CPU card 100D into the reader 300.

In accordance with the present example, at the next step 1611, the user presses one or more user interface elements 154 representing a personal identification number (PIN) by applying pressure to the touch panel 308 on or adjacent to each of the associated user interface elements 154. As will be explained in further detail later in this document, in response to the user entering the personal identification number, the CPU card 100D can buffer the personal identification number in an input buffer and compare the buffered personal identification number to a personal identification number stored in a storage means (not shown) of the CPU card 100D. If the CPU card 100D determines that the entered personal identification number is identical to the stored personal identification number then an application associated with the banking application Internet site commences, for example on the server computer 652, computer 700 or set top box 601 and returns to the set-top box 601 for display on the output device 616 a conventional banking application menu screen relating to a function to be performed, in this case a selection enabling the payment of the specified amount to the vendor identified by the displayed biller code. At the next step 1613, the banking application, having been notified that the user has typed in a valid personal identification number (without having been sent the personal identification number) sends an INTERNAL AUTHENTICATE application protocol data unit to the CPU card 100D. The INTERNAL AUTHENTICATE application protocol data unit contains an 8 byte random number as a challenge and will be explained in detail below. At the next step 1615, the CPU card 100D receives the INTERNAL AUTHENTICATE application protocol data unit, and signs it by applying a Secure Hash Algorithm (SHA-1) message digest function, as known in the relevant art, to the challenge and padding the digest. The SHA-1 message digest function is described in the "Federal Information Processing Standards Publication 180-1" published by the U.S. DEPARTMENT OF COMMERCE/National Institute of Standards and Technology, on Apr. 17, 1995. The SHA-1 message digest function also encrypts the challenge data according to the "Public Key Cryptography Standards (PKCS#1)" as described in "PXCS#1: RSA (Rivest, Shamir and Adlemen) Encryption Standard, version 1.5, November 1993, published by RSA Laboratories" standard for RSA encryption. The encryption is performed using a private key stored only on the CPU card 100D. The CPU card 100D sends the encrypted result back to the banking application, which verifies the signature using a public key associated with the card 100D. The public key is preferably already stored in a database associated with the particular bank, and is preferably referenced by the unique card ID of the CPU card 100B. If this authentication process has completed successfully, the banking application is satisfied that the card 100D is genuine (since only the card 100D has access to the private key). The banking application is also satisfied that the user is genuine since the card 100D will not have authenticated itself unless the user had identified themselves to the card 100D using a personal identification number (PIN).

At the next step 1617, the user utilises the user interface elements 1514 of the CPU card 100D to operate the banking application in order to complete payment for the full concert music video of the young dead guy. Once payment is completed, the Blues Guitar Masters application then retrieves the selection (i.e. the full concert music video of the Young Dead Guy), which is then streamed to the set-top box 616 for appropriate output as seen in FIG. 17(*e*). Since the music video is, in effect, a series of "live" images, as compared to the substantially static images of the menu screens 1720, 1722 1724 and 1730, the music video may advantageously be obtained and/or streamed from another location on the computer network 720 not associated with the generation of the menu screens 1720, 1722, 1724 and 1730.

Figure 18:
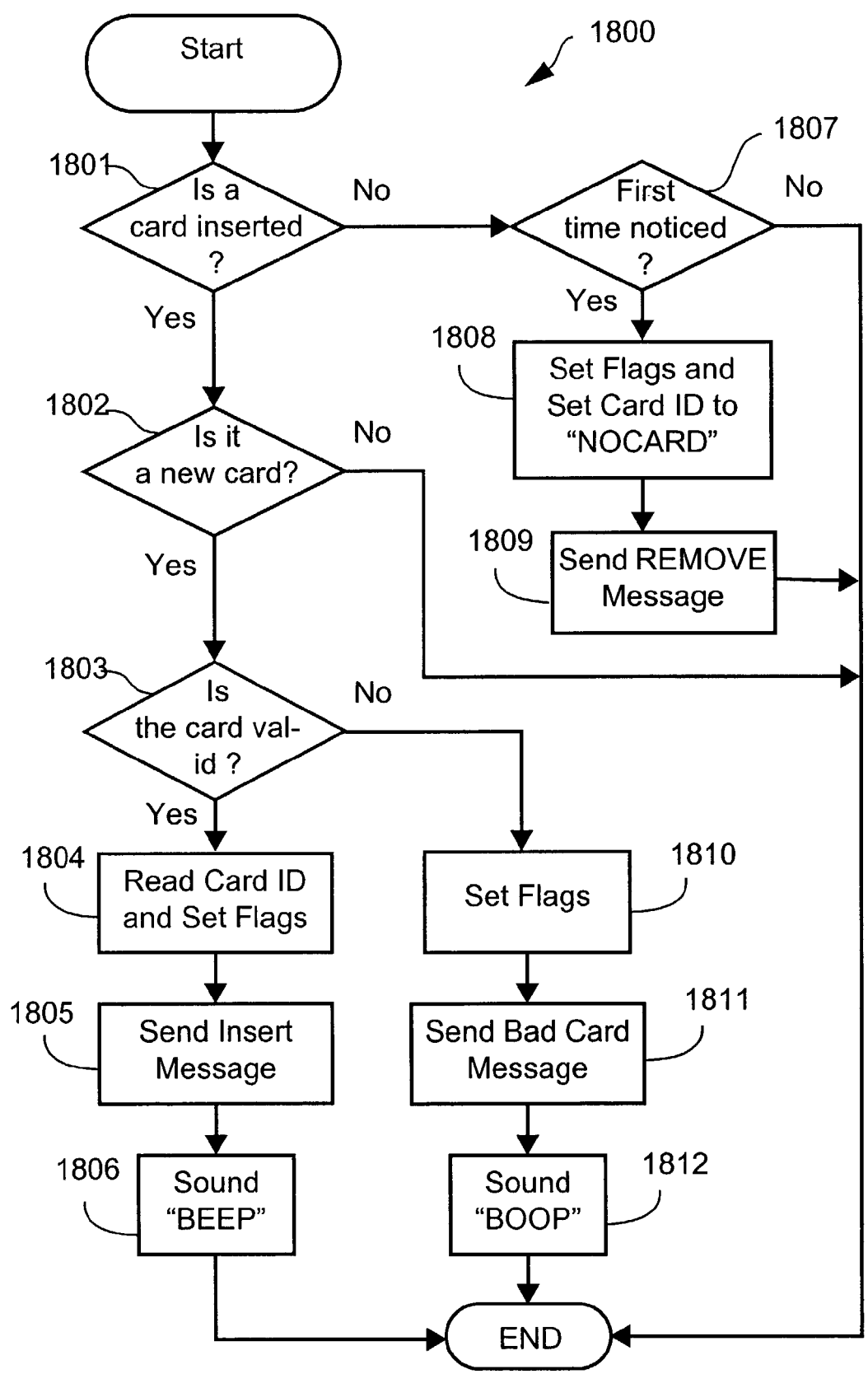
FIG. 18 is a flow diagram showing a method of checking the smart cards of FIGS. 14(a) and 15(a), performed during the user process of FIG. 16.

FIG. 18 is a flow diagram showing a method 1800 performed by the reader 300 for checking the memory card 100A upon the user inserting the memory card 100A into the reader 300 at step 1601 of the process 1600. The method 1800 is also performed by the reader 300 at step 1609 in order to check the CPU card 100D. The method 1800 checks for changes in the presence and validity of a smart card in the remote reader 300 and responds accordingly. The method 1800 is performed by the CPU 1045 and begins at step 1801 where if the memory card 100C is inserted into the reader 300, then the method 1800 proceeds to step 1802. At step 1802, if the inserted memory card 100A is a new card (i.e. in the previous state there was no smart card 100 in the reader 300), then the method 1800 proceeds to step 1803. Otherwise, the method 1800 concludes. At the next step 1803, "magic number" and "checksum" fields are read from a card header stored in the memory of the card 100A by the CPU 1045, and are checked for correctness. If the "magic number" and "checksum" are correct, then the method 1800 proceeds to step 1804. In the case of the CPU card 100B, the CPU 1045 only reads the magic number field as the reader 300 is not able to read the data stored on the CPU card 100B. The method 1800 continues at step 1804, where the card identifier is read from the card header and "Move events", "Don't Report Co-ordinates" and "Beep" flags are set by the CPU 1045. The card data associated with the memory card 100C is also read from the memory card 100C at this step 1804. At the next step 1805, an INSERT message, including the card data, is sent to set top box 601 by the CPU 1045, and the INSERT message is processed by the CPU 805. Then at step 1806, a "BEEP" is sounded and the method 1800 concludes.

If the "magic number" and "checksum" fields are not correct (ie: the memory card 100C is not valid) at step 1803, then the method 1800 proceeds to step 1810 where the don't beep, no move events and event co-ordinate flags are set. At the next step 1811, a BAD CARD message is sent to the set top box 601 by the CPU 1045, and the BAD CARD message is processed by the CPU 805 resulting in display of such a message on the output device 616. Then at step 1812, a "BOOP" is sounded and the method 1800 concludes.

If the memory card 100C is not inserted into the reader 300 at step 1801, then the method 1800 proceeds to step 1807. At step 1807, if this is the first operation of the reader 300 after the reset then the method 1800 concludes. Otherwise, the method 1800 proceeds to step 1808 where the "Beep", "No MoveEvents" and "No Event Co-ordinates" flags are set to default values by the CPU 1045 and the card identifier stored in memory of the memory card 100C is set to "NO_CARD". At the next step 1809, a REMOVE message is sent to the set top box 601 by the CPU 1045, and the REMOVE message is processed by the CPU 805. The method 1800 concludes after step 1809.

Figure 19:
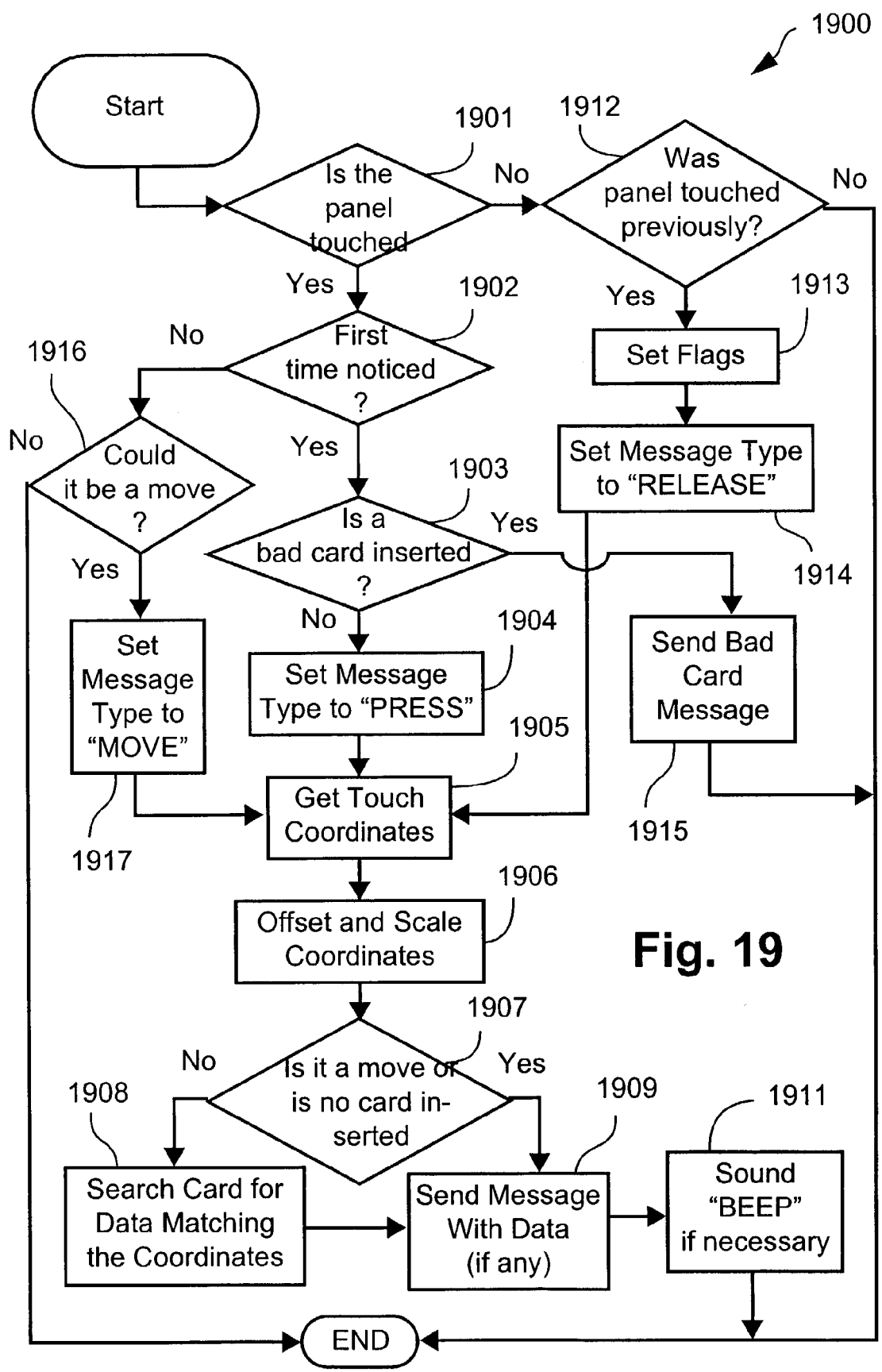
FIG. 19 is a flow diagram showing a method of scanning the touch panel of the reader of FIG. 3, performed during the user process of FIG. 16.

FIG. 19 is a flow diagram showing a method 1900 of scanning the touch panel 308 of the reader 300 of the system 600B incorporating the software architecture 900. The method 1900 is typically executed by the CPU 1045 at steps 1603, 1605 and 1607 of the process of FIG. 16 as the user scrolls the menu screens (e.g. 1720) by selecting the user interface elements 1514. The method 1900 checks for touch panel touches that equate with user interface element 1514 selections and responds accordingly. The method begins at step 1901 where if the touch panel 308 is being touched, then the method 1900 proceeds to step 1902. Otherwise, the method 1900 proceeds to step 1912, where if the touch panel 308 has been touched previously then the method 1900 proceeds to step 1913. Otherwise, the method 1900 concludes.

At step 1913, the "beep", "move events" and "no event co-ordinate" flags are set according to their corresponding values in the associated card header if a card is present. If a card is not present in the reader 300 then these flags are set to default values. Then at step 1914, the message type is set to RELEASE and the method 1900 proceeds to step 1905.

The method 1900 continues at step 802, where if this is the first time that a touch has been noticed since there was no touch, then the method 1900 proceeds to step 1903. At the next step 1903, the CPU 1045 determines if a bad card has been inserted into the reader 300 by checking the result of step 1803, then in the case that a bad card has been inserted into the reader 300, the method 1900 proceeds to step 1915. Then at step 1915, a BAD Card message is sent to the set top box 601, the BAD CARD message is stored in memory 806, and the method 1900 concludes. If it was determined at step 1903 that the memory card 100C was valid, by checking the result of step 703, or that no card was inserted into the reader 300, by the checking of step 1801, then the method 1900 proceeds to step 1904, where the type of message is set to PRESS in the message header of Table 9. At the next step 1905, the CPU 1045 determines the touch coordinates (i.e. X, Y coordinates of user press location) via the touch panel interface 1041. Then at the next step 1906, the offset and scale functions are applied to the coordinates by the CPU 1045. The offset and scale functions map the coordinate space of the touch panel 308 to the coordinate space of the card 100C. The method 1900 continues at the next step 1907, where if the CPU 1045 determines that the sent message was a MOVE and/or no card was inserted into the reader 300, by checking step 1801, then the method 1900 proceeds directly to step 1909. Otherwise, the method 1900 proceeds to step 1908 and the memory of the memory card 100C is searched by the CPU 1045 in order to find the first user interface element whose X1, Y1, X2, Y2 values form a range within which the touch coordinates fall and data associated with matched user interface element is read from the memory card 100A. At the step 1909, the message is sent along with any data to the set top box 601, and the CPU 805 processes the message. The method 1900 continues at the next step 1911, where a BEEP sound is sounded and the method 1900 concludes.

If this is not the first time that a touch has been noticed since there was no touch, at step 1902, then the method 1900 proceeds to step 1916. At step 1916, if the touch detected at step 1901 was a move, then the method 1900 proceeds to step 1917. Otherwise the method 1900 concludes. At step 1917, the message type is set to MOVE and the method 1900 proceeds to step 1905. For example, a MOVE message can be sent along with the X, Y coordinates of a touch position as defined by Tables. 12 and 15, a PRESS and RELEASE message can be sent along with X, Y coordinates of a touch position and data associated with a user interface object as defined by Tables. 12 and 16. If it was determined at step 1907 that the message was a MOVE, at step 1909, then the CPU 1045 sends a MOVE message to the set top box 601. The CPU 805 of the set top box 601 processes the X, Y coordinates as cursor information resulting in a cursor move that is displayed on the output device 616. In this case, the next RELEASE message can be interpreted as a command to select the displayed object at the cursor position (e.g. to select an icon 1716 of the menu screen 1724). Further, if NO Event Coordinates (see Table 2) have been set in the memory card 100C, then the reader 300 may send the data associated with a user interface object to the event manager 301 in the computer 700 or set top box 601 without sending the X, Y coordinates of the touch position.

The method 1900 can be similarly performed at steps 1611 and 1613 for the CPU card 100D. However, in the case of the CPU card 100D, the mapping of the offset and scale functions to the coordinate space of the touch panel 308 of the card 100D at step 1906 and the searching of the CPU card 100D at step 1908, is performed by the CPU (not shown) of the CPU card 100D. The operation of the CPU cards 100B and 100D in this regard will be described in more detail later in this document.

Figure 20:
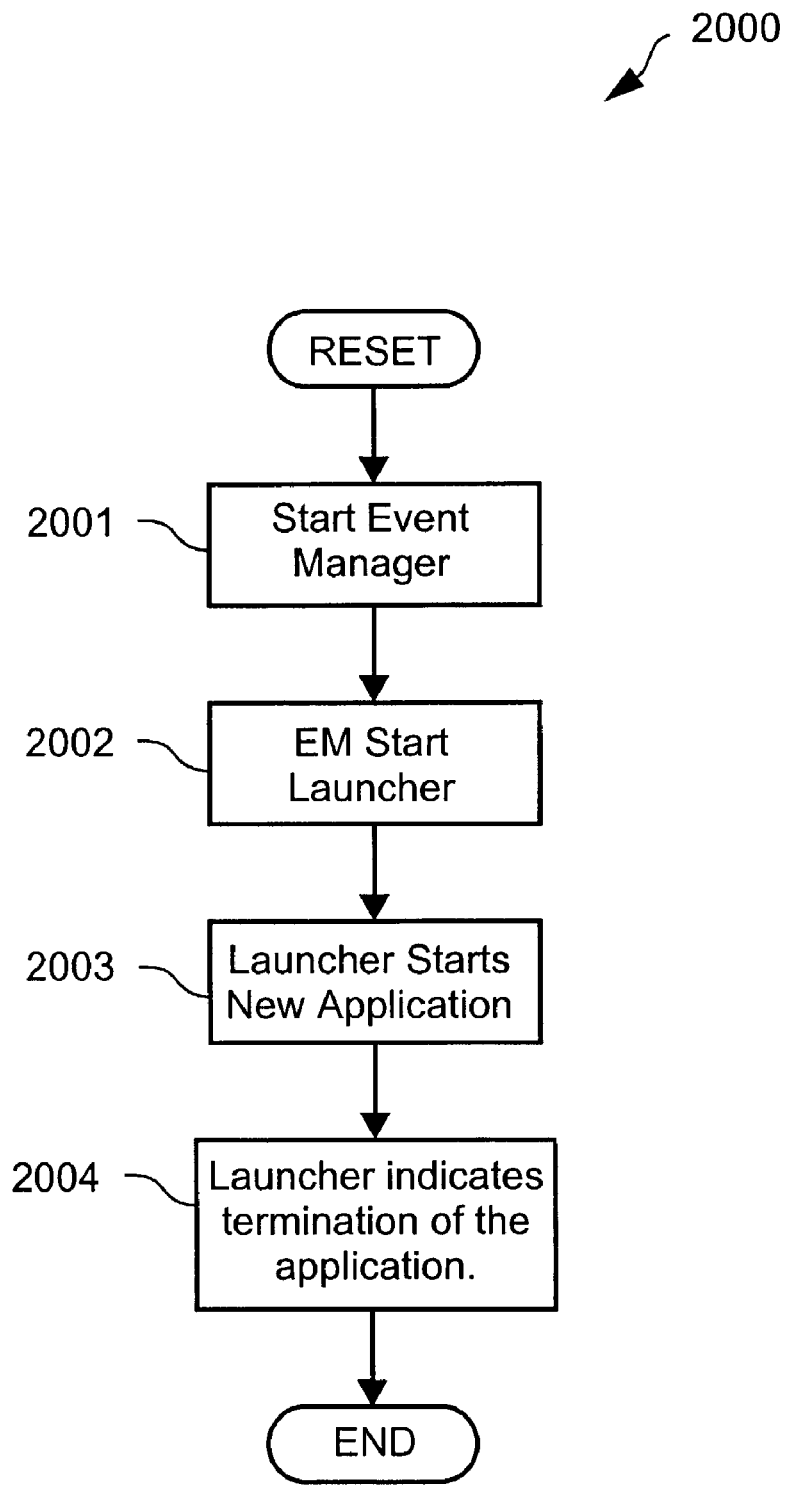
FIG. 20 is a flow diagram showing an overview of events of the system of FIG. 6(a) during the user process of FIG. 16.

FIG. 20 is a flow diagram showing a process 2000 of events performed by the system 600B incorporating the software architecture 900. The process 2000, is executed by the CPU 705, depending on the configuration of the system 600, upon the user inserting the memory card 100C into the reader 300 at step 1601. The process 2000 begins at step 2001 where a system initialisation process is performed to start the event manager 901. At step 2001 the I/O daemon 920 is typically also started along with the event manager 901.

At the next step 2002, the event manager 901 starts the launcher 903. Then at the step 2003, the event manager 901 passes a message to the launcher 903, enabling the launcher 903 to determine which application 904 to execute, and the launcher 903 then starts the corresponding application 904. In the case of the memory card 100C, the corresponding application 904 is an application associated with the Blues Guitar Masters Internet site. The process 2000 continues at the next step 2004, where once the currently running application 904 is no longer needed (e.g. whilst the Blues Guitar Masters application selection is being streamed to the set-top box 616 from another location on the computer network 720 not associated with the generation of the menu screens 1720, 1722, 1724 and 1730 or when the CPU card 100D is inserted into the reader 300 at step 1609), the launcher 903 provides an exit message to the running application (i.e. the application associated with the Blues Guitar Masters Internet site) in order to end the execution of the running application. All applications are terminated when the system 600B is powered down or switched off.

Figure 21:
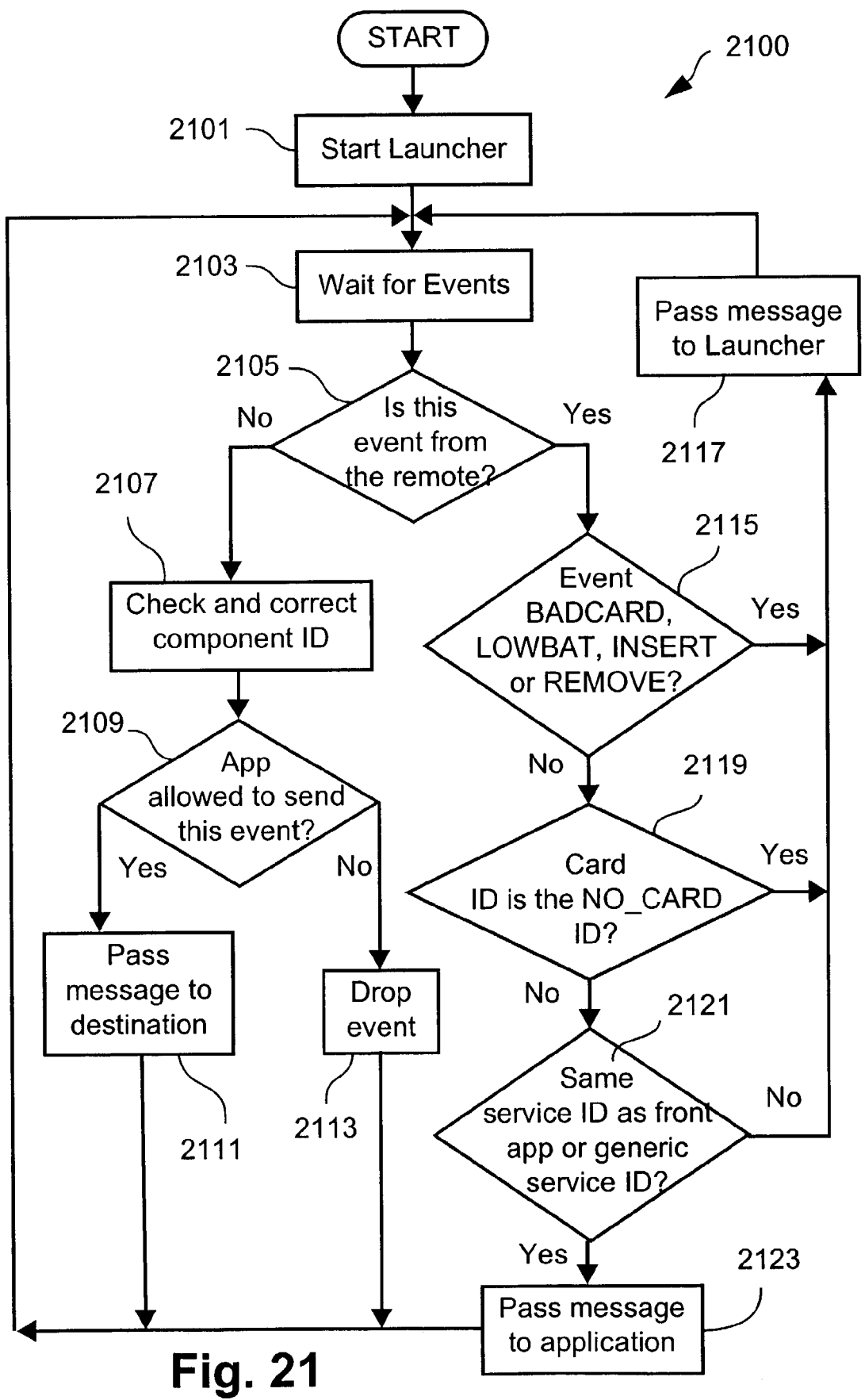
FIG. 21 is a flow diagram showing processes performed by the event manager during the process of FIG. 20.

FIG. 21 is a flow diagram showing a method 2100 of receiving an event performed by the event manager 901, at step 2001. The method 2100 can be executed by the CPU 705 for computer implementations. Alternatively, the method 2100 can be executed by the CPU 805 in set top box implementations. The method 2100 begins at step 2101, where the launcher 903 is started. At the next step 2103, the event manager 901 receives an event. If the event received at step 2103 is not from the reader 300 at the next step 2105, then the method 2100 proceeds to step 2107 where a component identifier (XID) associated with the received event is checked and corrected if necessary. The method 2100 continues at the next step 2109, where if the new application sending an event is allowed to send the event, then the method 2100 proceeds to step 2111. At step 2111, the event is sent to a destination process component and the method 2100 returns to step 2103. If the sending application is not allowed to send the event at step 2109, then the method 2100 proceeds to step 2113, where the event is dropped and the method 2100 returns to step 2103.

If the event is from the reader 300 at step 2105, then the method 2100 proceeds to step 2115. If the event is a BADCARD, LOWBAT, INSERT or REMOVE event at step 2115 then the method 2100 proceeds to step 2117. Otherwise the method 2100 proceeds to step 2119. At step 2117, the event is passed to the launcher 903 and the method 2100 returns to step 2103. If the card identifier is the NO_CARD identifier at step 2119, then the corresponding message is passed to the launcher 903 at step 2117. Otherwise the method 2100 proceeds to step 2121, where the service identifier portion of the card identifier is compared with the service identifier used in determining the current front application (i.e. the application to receive messages from the event manager). If the service identifier is not the same as that which has been used to determine the front application, then the method 2100 proceeds to step 2117 where this message is passed to the launcher 903. Otherwise, the method 2100 proceeds to step 2123, where the event is sent to the front application and the method 2100 returns to step 2103.

Figure 22:
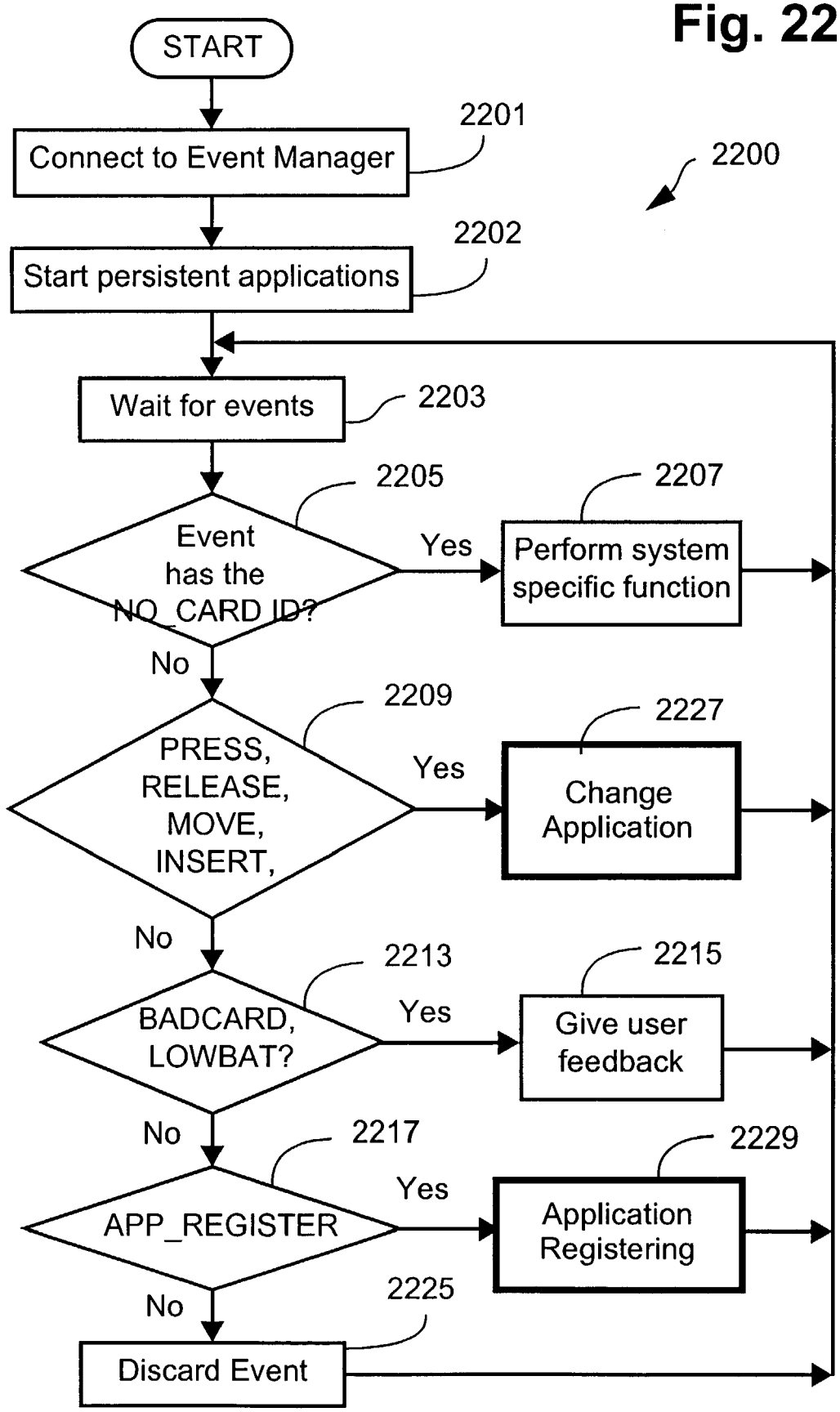
FIG. 22 is a flow diagram showing an overview of a method performed by the launcher during the process of FIG. 20.

FIG. 22 is a flow diagram, showing an overview of the method 2200 performed by the launcher 903 during steps 2002 to 2004 of the process 2000. The method 3700 can be executed by the CPU 705 for computer implementations. Alternatively, the method 2200 can be executed by the CPU 4305 in set top box implementations or by the CPU of a remote server. The method 2200 begins at the first step 2201, where the launcher 903 connects to the event manager 901, and then continues to a next step 2202 where persistent applications (i.e. applications such as browser controllers that will generally always be running while the system 600 is operating) are started. At the next step 2203, the launcher 903 waits for an event and when an event is received the launcher 903 proceeds to step 2205. If the event is the NO_CARD identifier at step 2205, then the process proceeds to step 2207. Otherwise the method 2200 proceeds to step 2209. At step 2207, the launcher 903 performs a predetermined system specific function (e.g. displays a message on the output device 616) in response to the NO_CARD identifier and the method 2200 returns to step 2203.

If the event at decision step 2205 is determined not to be a NO_CARD identifier, another decision step 2209 is entered to determine whether or not the event is a PRESS, RELEASE, REMOVE, MOVE or INSERT. If this decision step 2209 returns a "yes", that is, the event is one of the aforementioned events, then the method 2200 proceeds to step 2227. Otherwise the method 2200 proceeds to a further decision step 2213. At step 2227, the launcher 903 changes the application and the method 2200 returns to step 2203. A REMOVE event followed by an INSERT event would occur at step 1609 of the process 1600 when the user removes the memory card 100C from the reader 300 and inserts the CPU card 100D. The INSERT event results in the reader 300 sending an INSERT message containing the URL of the banking application to the CPU 805 of the set top box 601 which passes the URL to a server (e.g. the server computer 652) associated with the banking application.

If the event at step 2209 is not one of the PRESS, RELEASE, REMOVE, MOVE or INSERT events, then a decision step 2213 is entered. This decision step 2213 makes a determination on a BADCARD or LOW_BATT event. If the event is a BADCARD or LOW_BATT event at step 2213, then the method 2200 proceeds to step 2215, otherwise the method 2200 proceeds to step 2217. At step 2215, the launcher 903 gives the user feedback on the event that has occurred (e.g. displaying a "Low Battery" message on the output device 616 if the LOW_BATT event is determined or a "Incorrect Card" upon determination of a BADCARD event) and the method 2200 returns to step 2203. If the event at decision step 2213 is neither a BADCARD or LOW_BATT event, then step 2217 is entered.

If the event is an APP_REGISTER event at step 2217, then the method 2200 proceeds to step 2229, application registering. Otherwise the method 2200 proceeds to step 2225. At step 2229, the application is registered (i.e. the application informs the other components 901, 902 and 906 that it is now ready to receive messages) and the method 2200 returns to step 2203. At step 2225, the event is discarded and the method 2200 returns to step 2203.

2.0 CPU Card Operation

The operation of the CPU cards described above will be discussed below with reference to the CPU card 100B. However, a person skilled in the relevant art would appreciate that the following description applies equally to the CPU card 100D.

The CPU card 100B has several advantages over the memory card 100A and over other conventional memory card or user interface card platforms. Firstly, a personal identification number (PIN) and other data may be kept secure by ensuring that all coordinate translation from the reader 300, in regard to a user selecting one or more of the user interface elements 154, is executed by the CPU 259 of the CPU card 100B, thus providing some protection against discovery and copying of the data stored on the card 100B. In order to provide such security, the user interface element objects (see Table 5) are stored in the storage means 276 of the CPU card 100B. The CPU card 100B can protect the data stored in the storage means 276 by read/write protecting the storage means 276. Secondly, data returned by the CPU card 100B can be the result of a transformation executed by the CPU 275 and applied to a certain sequence of user interface elements 154 being selected. The CPU card 100B can itself store the sequence in the storage means 276 and release the necessary data only after the card 100B has detected that a valid sequence has been selected. For example, entry of a personal identification number by a user can be used to authenticate a user of the card 100B, prior to which other features provided by the CPU card 100B are locked out.

A third advantage of the CPU card 100B over the memory card 100A, and over other conventional memory cards and user interface card platforms, is that the CPU card 100B can offer secure connection between the CPU card 100B and a remote application executing on the computer system 600 or remote server computers 650, 652. The CPU card 100B can be configured with cryptographic functions together with a Public Key Infrastructure (PKI) to establish a secure communications channel between the CPU card 100B and a remote application, even when working with an unsecured reader 300.

Still another advantage of the CPU card 100B is that the CPU card 100B can be loaded with several different application programs, which can interact with one another. For example, card resident applications, such as secure online payment applications, can provide additional functionality to the standard user interface card application described below, allowing data generated by these applications to be associated with user interface elements.

2.1 Communications

The CPU card 100B preferably communicates with the reader 300 using the "T=0" protocol as defined in the "International Organisation for Standardisation (ISO)/International Electrotechnical Commission (IEC) 7816-3: 1997 Standards, Part 3: Electronic Signals and Transmission Protocol", [hereinafter referred to as the 'ISO 7816-3 standards']. However, any other suitable bi-directional protocol (e.g. T=1) can be used for communications between the CPU card 100B and the reader 300. As will be described in detail below, the reader 300 issues different commands to the CPU card 100B depending on a user interface element 154 selected by the user. All commands issued to the CPU card 100B by the reader 300 are in an 'Application Protocol Data Unit (APDU)' format as described in the "ISO/IEC 7816-4 Standards, Part 4: Electronic Signals and Transmission Protocol" (i.e., the 'ISO 7816-4 standards'). The format and fields of the commands issued to the CPU card 100B will be described in detail below.

2.2 Operating System

The CPU card 100B is configured to utilise any generic multi-application operating platform such as the 'Multos' operating system or 'JavaCard'. However, the CPU card 100B can also utilise a single application operating platform.

2.3 Operating Procedure

Figure 23:
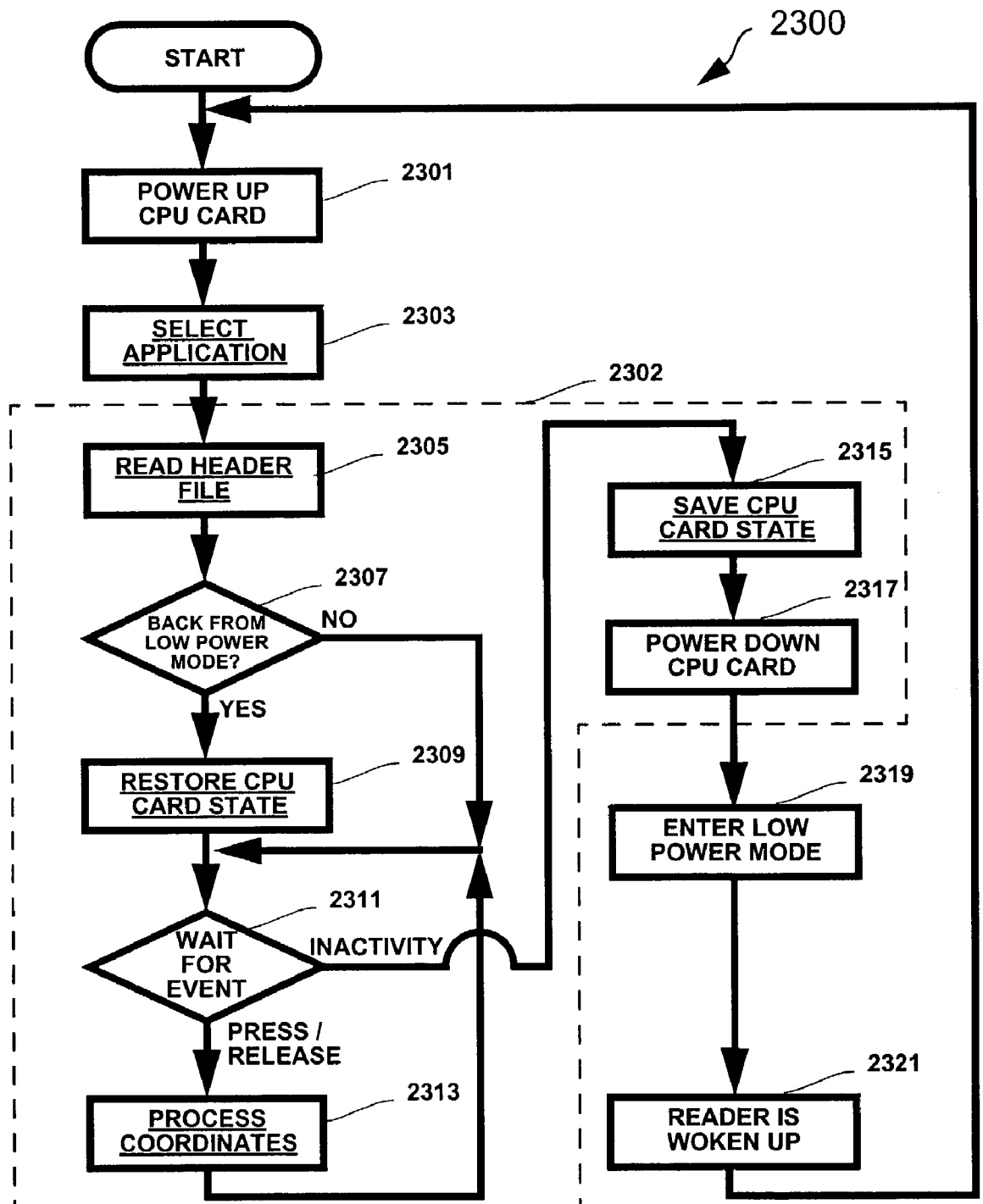
FIG. 23 is a flow diagram showing a method of operating the smart card of FIG. 1(b) using the reader of FIG. 3.

FIG. 23 is a flow diagram showing a method 2300 of operating the CPU card 100B using the reader 300. The method 2300 is implemented as software, such as an application program executing within the CPU 1045 of the reader 300 and being stored in the memory 1046. In particular, the steps of the method 2300 are effected by instructions in the software that are carried out by the CPU 1045. The underlined text in the flow diagram of FIG. 23 indicate steps of the method 2300 which require a command (typically invoked by the reader 300) to be issued to software stored in the storage means 276 of the CPU card 100B and being executed by the CPU 275. For example, at step 2313 the CPU 1045 of the reader 300 sends an (X, Y) position coordinate pair associated with a user interface element 154 selection to the CPU 275 of the CPU card 100B for processing, using a PROCESS COORD command, as will be explained in more detail below. As described above, commands are configured as application protocol data units (APDU) having a format as described in the ISO 7816-4 standard. However, any other suitable existing or custom protocol can be used.

The software executing on the CPU card 100B may be divided into two separate parts being an operating system and an application program. The operating system (hereinafter referred to as the 'Card Operating System') is configured to manage the interface between an 'application' program and the reader 300, where the card operating system forms the platform for the execution of applications on the CPU card 100B. The application program provides user interface functions of the CPU card 100B. The dashed line 2302 in FIG. 23 indicates steps (i.e. steps 2305 to 2317) in which the application program is active. The application program will be hereinafter referred to as the 'User Interface Card Resident Application'.

As described above, user interface element objects as described herein, represent mapping data, which relate the user interface elements 154 directly imprinted on a surface of the CPU smart card 100B, to commands or addresses (eg: Uniform Resource Locators (URLs)). Mapping data includes (X,Y) coordinate pairs which typically define the size and location of user interface elements 154 on the CPU card 100B, as described above for the memory card 100A.

The user interface element objects are stored in the storage means 276 of the CPU card 100B and are not able to be accessed by the reader 300.

The method 2300 begins at step 2301 where the CPU card 100B is powered up. The CPU card 100B can be powered up automatically upon being inserted into the reader 300 by a user or after a user touches the touch panel 308. At the next step 2303, the user interface card resident application, stored in the storage means 276, is selected by the operating system executing within the CPU 275 upon the operating system receiving a command from the CPU 1045 of the reader 300. According to the ISO 7816-4 standard, CPU card application programs are selected by a SELECT FILE command. The format of the SELECT FILE command sent by the CPU 1045 of the reader 300 to the CPU card 100B is shown in Table 22 below.

TABLE 22

| Field | Value |
| --- | --- |
| CLA (Class) | 0x00 |
| INS (Instruction) | 0xA4 |
| P1 (Parameter 1) | 0x04 |
| P2 (Parameter 2) | 0x0C |
| Lc (Command Data Length) | Length of user interface card resident application identifier |
| Data (Command Data) | User interface card resident application identifier |
| Le (Response Data Length) | 0 |

The SELECT FILE command can result in further commands sent by the reader 300 being re-directed to the user interface card resident application rather than the operating system. The SELECT FILE command will fail if the user interface card resident application does not exist in the storage means 276 on the CPU card 100B or cannot be selected for another reason. The process performed by the CPU card 100B in response to the SELECT FILE command will be explained in further detail below with reference to FIG. 42. A 'user interface card resident application identifier', referred to in Table 15, is an identifier associated with the user interface card resident application. The user interface card resident application identifier is configured in accordance to the guidelines set out in "International Organisation for Standardisation (ISO)/International Electrotechnical Commission (IEC) 7816-5: 1994 Standards, Part 5: Numbering System and Registration Procedure for Application Identifiers" [hereinafter referred to as the 'ISO 7816-5 standards']. The user interface card resident application identifier consists of a registered application provider identifier (RID) assigned by a standards authority, and a proprietary application provider extension (PIX) assigned by the application provider.

The method 2300 continues at the next step 2305 where the CPU 1045 of the reader 300 reads a card header 1100 associated with the card 100B. The card header 1100 was described above with reference to FIG. 11 and is stored in the storage means 276 of the CPU card 100B. Step 705 is implemented using a READ BINARY command, according to the ISO 7816-4 standard, sent by the CPU 1045. If the user interface card resident application is implemented in accordance with an ISO 7816-4 standard file system, as will be explained below, then the card header 1100 is contained in an elementary file (EF) having an identifier 0x0000. Such an elementary file is implicitly selected when the user interface card resident application is selected at step 2303.

The format of the READ BINARY command invoked by the reader 300 is shown in Table 23 below.

TABLE 23

| Field | Value |
|---|---|
| CLA | 0x00 |
| INS | 0xB0 |
| P1 | 0x00 |
| P2 | 0x00 |
| Lc | 0 |
| Data | Empty |
| Le | 0x13 |

As explained above, the card header 1100 is 19 bytes long and if any error or warning identifiers are encountered at step 2305, then the reader 300 will assume that the card header 1100 cannot be read properly and register a bad card. The process performed by the CPU card 100B in response to the READ BINARY command will be explained in further detail below with reference to FIG. 43. At the next step 2307, if the reader 300 is in low-power mode, then the method 2300 proceeds to step 2311. Otherwise, at the next step 2309, the state of the smart card 100B is restored as will be explained in detail below. Step 2309 is implemented using a RESTORE STATE command sent to the CPU 275 by the CPU 1045 of the reader 300 and which is configured as an application protocol data unit having a format as shown in Table 24 below.

TABLE 24

| Field | Value |
|---|---|
| CLA | 0x00 |
| INS | 0x12 |
| P1 | 0x00 (other values are reserved for future use) |
| P2 | 0x00 (other values are reversed for future use) |
| Lc | Length of state code |
| Data | State code |
| Le | 0 |

After receiving the RESTORE STATE command with the parameters shown in Table 24 from the CPU 1045 of the reader 300, the user interface card resident application executing within the CPU 275 checks that a present state code provided by the user interface resident card application is identical to a previous state code generated during a previous SAVE STATE command stored in non-volatile memory of the storage means 276 of the CPU card 100B and in the memory 1046 of the reader 300. The previous state code is provided to the user interface card resident application in the 'Data' field of the RESTORE STATE command. The SAVE STATE command will be explained in further detail later in this document. If the present state code is not identical to the previous state code generated during a previous SAVE STATE command then previous state information stored in non-volatile memory of the storage means 276 is erased. Warning and error conditions shown in Table 25 below can also occur. However, if the present state code is identical to the previous state code received from the reader 300, then current volatile state information is replaced with the state information stored in the non-volatile memory of the storage means 276. The process performed by the CPU card 100B in response to the RESTORE STATE command will be explained in further detail below with reference to FIG. 41.

TABLE 25

| Value | Meaning |
|---|---|
| 0x6300 | Invalid code presented - state erased |
| 0x6B00 | Incorrect parameters P1–P2 |

At step 2311, the CPU 1045 waits for an event such as the selection of a user interface element 154 in the form of a press or release. Upon selection of a user interface element 154 by the user, the method 2300 proceeds to step 2313 where the CPU 1045 of the reader 300 sends an (X, Y) position coordinate pair associated with the selection to the CPU 275 of the CPU card 100B for processing. Step 2313 is implemented using a PROCESS COORD command configured as an application protocol data unit sent to the CPU card 100B by the CPU 1045 of the reader 300 and having a format shown in Table 26 below.

TABLE 26

| Field | Value |
|---|---|
| CLA | 0x90 |
| INS | 0x00 (PRESS) or 0x02 (RELEASE) |
| P1 | X co-ordinate |
| P2 | Y co-ordinate |
| Lc | 0 |
| Data | Empty |
| Le | Maximum length of data to receive |

As will be explained in further detail later in this document, the user interface card resident application processes the coordinate data by comparing the (X, Y) position coordinate pair to the data stored in the storage means 276 of the microprocessor 259. The reader 300 typically sets the maximum length of data to receive (Le) field to a maximum possible value, 0x00 (which is used to encode x100). Data associated with a user interface element object, which is stored in the storage means 276 of the microprocessor 259 and which is associated with the (X, Y) position coordinate pair sent from the reader 300, is returned by the user interface card resident application in response to the PROCESS COORD command. The format of the data returned by the user interface card resident application in response to the PROCESS COORD command is shown in Table 27 below. The process performed by the CPU card 100B in response to the PROCESS COORD command will be explained in further detail below with reference to FIG. 28.

TABLE 27

| Name | Length | Description |
|---|---|---|
| flags | 1 byte | Flags specific to a matched User Interface Element |
| data | 0 or more bytes | Data associated with the matched User Interface Element |

Certain user interface element objects may be designated to be active only on a press or a release event corresponding to a user selection, and separate instruction codes can be used to allow the reader 300 to distinguish one from the other. If the (X, Y) position coordinate pair supplied by the reader 300 is in the range [(0,0), (127, 255)] but no data is found to match the position coordinate data, then the "flags" field, as shown in table 20, is constructed from global button flags specified in the card header 1100. Further, the data field is returned empty and one of the error identifiers shown in Table 28 below may also be returned by the user interface card resident application.

TABLE 28

| Value | Meaning |
|---|---|
| 0x6985 | Data must be encrypted, but no session key available, or session key invalid |
| 0x6A82 | There is no user interface card image loaded (File not found) |
| 0x6A86 | The co-ordinates provided are outside the allowable range (Incorrect P1–P2) |

If the CPU 1045 has not received any events for a predetermined period (e.g. one minute), at step 2311, then the method 2300 proceeds to step 2315 where the user interface card resident application executing within the CPU 275 saves current state information in non-volatile memory of the storage means 276. Step 2315 is implemented using a SAVE STATE command sent from the reader 300 and which is configured as an application protocol data unit having a format shown in Table 29 below.

TABLE 29

| Field | Value |
|---|---|
| CLA | 0x90 |
| INS | 0x10 |
| P1 | 0x00 |
| P2 | 0x00 |
| Lc | 0 |
| Data | Empty |
| Le | Maximum length of random data to be generated |

After receiving the SAVE STATE command with correct parameters the user interface card resident application executing within the CPU 275 saves all volatile state information to non-volatile memory of the storage means 276 and then generates a random state code of a specified length. The user interface card resident application also returns the state code to the reader 300. The state code is saved in the memory 1046 of the reader 300 in order to use the RESTORE STATE command described above. The process performed by the CPU card 100B in response to the SAVE STATE command will be explained in further detail below with reference to FIG. 40. One of the error identifiers shown in Table 30 below may also be returned to reader 300 by the user interface application upon receiving the SAVE STATE command.

TABLE 30

| Value | Meaning |
|---|---|
| 0x6300 | State saved, but no random number returned |
| 0x6B00 | Incorrect parameters P1–P2 |
| 0x6CXX | Incorrect Le specified. XX specifies recommended length. |

The error identifier 0x6CXX shown in Table 30 is returned to the reader 300 by the user interface card resident application executing within the CPU 275 when the CPU card 100B is unwilling to accept the requested state code length because it is too short. The user interface card resident application can also provide a value corresponding to the shortest appropriate length along with the error condition. Alternatively, if the requested length is longer than the CPU card 100B can handle, then the user interface card resident application generates the longest code that the CPU card 100B is configured for and returns a value corresponding to the longest code. A typical length for the state code is between eight and sixteen bytes. However, the state code can be of any length up to two hundred and fifty six bytes.

The method 2300 continues at the next step 2317, where the CPU card 100B is powered down by the operating system executing in the CPU 275. Then after a predetermined period, the CPU 1045 of the reader 300 assigns the reader 100B to low power mode at the next step 2319. At the next step 2321, the reader 300 is woken up and the method 2300 then returns to step 2301. The reader 300 can be woken up automatically by the CPU 1045, for example, upon a CPU card 100B being inserted into the reader 300 as shown in FIG. 4 and/or by a user touching the touch panel 308.

2.3.1 CPU Card Operating Modes

The user interface card resident application executing within the CPU 275 of the CPU card 100B operates in one of two different operating modes (i.e. Standard Input Mode and Buffered Input Mode), which affect the response of the user interface card resident application to a touch on the touch panel 308.

2.3.1.1 Standard Input Mode

Standard input mode is the default mode. In standard input mode, the CPU 275 of the CPU card 100B returns the data field associated with a given user interface element 154 if a match is found in the storage means 276, in response to a PROCESS COORD command sent from the reader 300. Conversely, if a match is not found, the CPU 275 returns default data. The returned information may be inline data (i.e. stored within the definition of the particular user interface element), file data (i.e. stored within a file in a file system implemented on the CPU card 100B), data indicating a transition to buffered input mode or data returned by a delegated application, as will be explained in more detail below.

2.3.1.2 Buffered Input Mode

When the user interface card resident application is in buffered input mode, the PROCESS COORD command does not result in the return of any data to the reader 300 in response to the selection of a user interface element 154. Instead, a default flags field is returned by the CPU 275 to the CPU 1045 of the reader 300 in response to the selection of a user interface element 154. Certain user interface elements are designated as input user interface elements, which, when pressed, cause an associated object identifier to be stored in a temporary input buffer.

Additionally, four special user interface elements may be defined. One of these user interface elements 154 is the "OK button" 162, which serves to commit the temporary input buffer and perform some action on the buffered data. The other special user interface elements are the "cancel button" 254, the "backspace button" 258 and the "clear button" 256, which represent "Cancel", "Backspace" and "Clear" roles, respectively. A user interface element 154 configured as a "Cancel" button, when selected, clears an input buffer of the CPU card 100B and returns the user interface card resident application to standard mode, in exactly the same state as the user interface card resident application was in when buffered input mode was activated. A user interface element configured as a "Backspace" button, when selected, clears a reference to a last entered user interface element from an active buffer of the CPU card 100B. If the buffer is empty, no action is taken. Finally, a user interface element 154 configured as a "Clear" button, when selected, removes references to all user interface elements 154 contained within the input buffer of the CPU card 100B. If the buffer is already empty, no action is taken.

The properties of a particular buffered input session are associated with a buffer descriptor, which is read from data stored on the CPU card 100B as will be described later in this document. The buffer descriptor has the structure shown in Table 31 below:

TABLE 31

| Name | Length | Description |
| --- | --- | --- |
| Flags | 1 byte | Various parameters about the buffer descriptor. See Table 32. |
| Action | 1 byte | A code, indicating the action to be performed after the OK button is pressed. See Table 26. |
| Butlen | 1 byte | The maximum number of bytes that can be stored in the buffer. |
| 1_buttons | 1 byte | The length of the subsequent "buttons" field. Must be equal to 4 or more bytes, in order to accommodate the special user interface element definitions. |
| Buttons | 1_buttons | An array storing the identifiers of the user interface elements that can be used as buffer elements. See Table 34. |
| 1_data | 1 byte | The length of the subsequent "data" field. Its value depends on the specified action. |
| Data | 1_data | Other data specific to the requested action. |
| Output | Variable | If the buffered input mode is invoked by pressing a user interface element on the card, this data is sent to the reader as data when that user interface element is pressed. This field may be empty. |

Figure 49A:
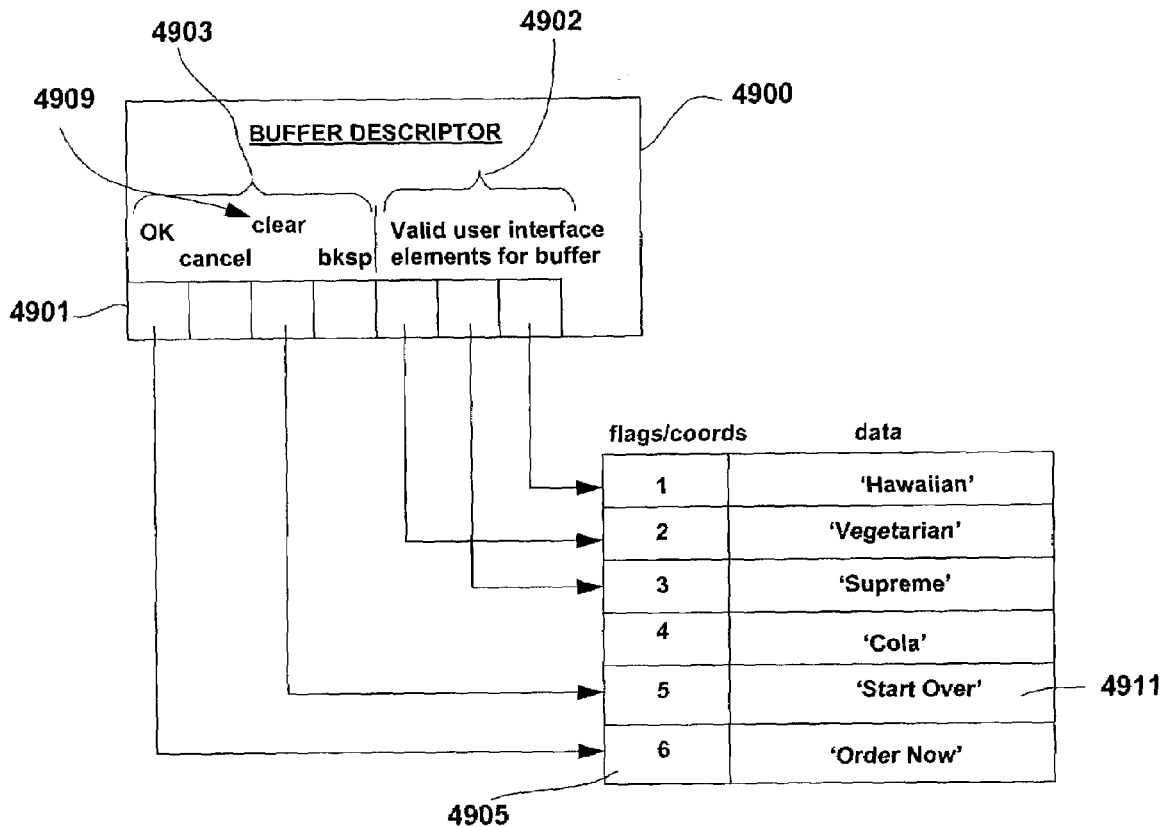
FIG. 49(a) shows an example buffer descriptor.
Figure 49B:
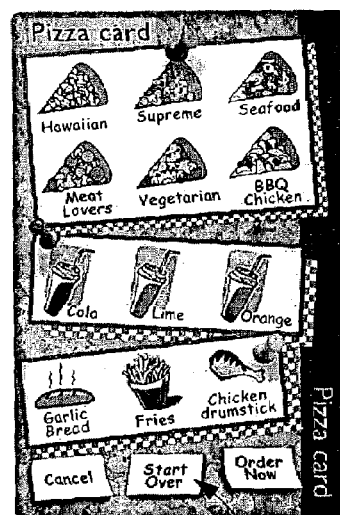
FIG. 49(b) is a perspective view of another smart card.

FIG. 49(*a*) shows an example buffer descriptor 4900 which has the configuration described in Table 31. The buffer descriptor 4900 includes an array 4901, referred to as the 'Buttons' array, which is used to store identifiers associated with user interface elements 154 that can be used as buffer user interface elements. The array 4901 of FIG. 49(*a*) includes three identifiers 4902 corresponding to user interface elements designated as input user interface elements. The array 4901 also includes the four special user interface elements 4903 (i.e. OK, Cancel, Clear, Bksp) described above. Each of the identifiers stored in the buffer descriptor 4900 can have associated mapping data 4905, as shown in FIG. 49(*a*). The buffer descriptor 4900 can be utilised to configure the function of the user interface elements of a CPU card. For example, FIG. 49(*b*) shows a CPU card 100F, which has been configured for a pizza ordering application. The CPU card 100F comprises a user interface element 4907, which includes the text 'Start Over'. The Start Over user interface element 4907 has been configured as a 'Clear' button (having the function described above) by storing an associated identifier, '5', in the clear identifier position of the array 4901. The identifier '5' indicates the position of a corresponding user interface element object 4911 in the mapping data 4905.

The flags for the flags field of the buffer descriptor structure of Table 24 are described in Table 32 below:

TABLE 32

| Name | Value | Description |
| --- | --- | --- |
| Circular | 0x01 | In a circular buffer, a character that overflows the buffer replaces the oldest character. If this flag is not set, overflowing characters are ignored. |
| expand data | 0x02 | Normally, buffer data is stored and processed as the Object identifiers corresponding to the user interface elements that were pressed. If this flag is set, the buffer data is expanded to the contents of the user interface elements that were pressed before being processed. |

The actions described in Table 33 below are defined for the action field of the structure of Table 31:

TABLE 33

| Name | Value | Description |
| --- | --- | --- |
| Output | 0x00 | An output buffer. |
| Passcode | 0x10 | A passcode buffer. |

The "buttons" field has the format shown in Table 34 below:

TABLE 34

| Name | Length | Description |
| --- | --- | --- |
| Ok_id | 1 byte | The identifier of the "OK button". |
| Cancel_id | 1 byte | The identifier of the "Cancel button". |
| Bksp_id | 1 byte | The identifier of the "Backspace button". |
| Clear_id | 1 byte | The identifier of the "Clear button". |
| Input_id | Variable | An array storing the identifiers of the user interface elements that can be used as input elements. |

The "ok_id" field shown in Table 34 stores a valid object identifier. The other three special user interface elements do not need to be specified and can be set to a default identifier (e.g. defined by the value 0).

Figure 48:
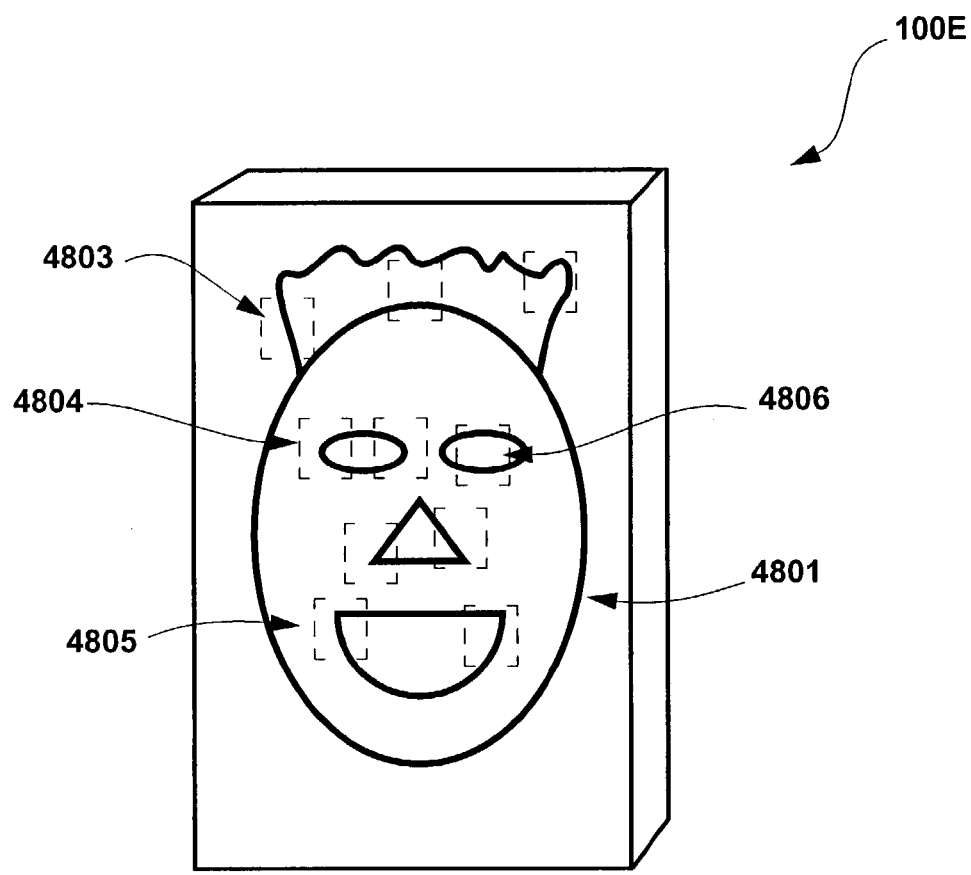
FIG. 48 shows a smart card depicting an image of a human face.

The user interface card resident application executing within the CPU 275 of the CPU card 100B can be configured to begin in buffered input mode when the application is initialised. This is enabled by setting up an appropriate buffer descriptor in a file with a certain identifier (i.e. 0x0002), as an "initial" buffer descriptor (as described above in Table 28). A typical use of this feature is to disable all of the features of the CPU card 100B until a pass-code (e.g. a personal identification number) is entered. As an example, the pass-code can be in the form of a series of user interface element objects associated with user interface elements 154 associated with an image (e.g. a human face) formed on a surface of a CPU card. For example, FIG. 48 shows a CPU card 100E depicting an image 4801 of a face. In this example, the card 100E includes ten regions (e.g. 4803), shown in phantom lines which define user interface elements arbitrarily positioned on the surface of the user interface card 100E. However, in this case the user interface elements defined by the regions (e.g. 4803) are not visible to a user of the card 100E. The user's pass-code can be made up, for example, of the regions 4804, 4805 and 4806 adjacent the left-eye, the left-side of the mouth and the right-eye, respectively, of the image 4801, and the user can enter the pass code by selecting these regions 4804, 4805 and 4806 in sequence.

2.3.1.3 Output Buffers

When a buffer descriptor is configured to have an action field of "output", as shown in Table 26, an associated buffer is referred to as the output buffer. When a user interface element (e.g. user interface element 162) configured as an "OK button" (i.e. having the function described above in section 2.3.1.2) is selected, a response is created by appending buffered data to what is stored in the "data" field of the buffer descriptor associated with the user interface element 162 and stored in the storage means 276. If the "expand data" flag is set, the buffered object identifiers are replaced with the data associated with the user interface element that the object identifiers represent.

When a user interface element (e.g. the user interface element 164) configured as a "Cancel button" (i.e. having the function described above in section 2.3.1.2) is selected, only the header 1100 is returned. The user interface card resident application can be configured to enter standard input mode after the user interface elements configured as "OK" (e.g. 162) and configured as "Cancel" (e.g. 164) are selected.

2.3.1.4 Pass-Code Buffers

When a buffer descriptor is configured to have an action field of "passcode", as shown in Table 33, the associated buffer is a Pass-code buffer. The "data" field of the buffer descriptor as shown in Table 31 stores the identifier of a file containing the required pass-code for a particular CPU card 100B. When the user interface element 162 configured as an "OK" button is selected, a string stored in a temporary input buffer in the storage means 276 is compared against a string stored in the pass-code file corresponding to the identifier. A standard message can be configured to indicate whether or not a correct pass-code was entered by a user. The CPU card 100B exits buffered input mode only if a pass-code match occurs.

For security, a cancel function should not be defined in a pass-code buffer descriptor. The pass-code buffer descriptor is preferably specified as an initial buffer.

2.4 Additional Software Interfaces 2.4.1 International Organisation for Standardisation (ISO) File System An International Organisation for Standardisation (ISO) file system can be implemented on the CPU card 100B to provide users of the CPU card 100B with access to certain information stored in the storage means 276 of the CPU card 100B. Such a file system preferably has a flat directory structure containing transparent elementary files (EF) referenced by 16-bit identifiers in accordance with ISO 7816-4 standards. However, a person skilled in the relevant art would realise that any suitable file system and corresponding directory structure can be used on the CPU card 100B.

Table 35 below lists elementary files and associated identifiers, which can be configured on the CPU card 100B.

TABLE 35

| File ID | File Name | File Description |
|---|---|---|
| 0x0000 | User interface card header | The header portion of the user interface card |
| 0x0001 | User interface card data | The data portion of the user interface card |
| 0x0002 | Initial buffer descriptor | A buffer descriptor indicating that the card should be initially in buffered input mode |
| 0x0012 | Card private key | The private key corresponding to the public key stored in a certificate associated with the card. This key is stored in the form dp, dq, p, q, u, the values used in the chinese remainder theorem algorithm for modular exponentiation. |
| 0x0013 | Card Certificate | A certificate which can be used to authenticate the card |
| 0x0014 | Card Application Access Control List | Entries in this file contain information about which card-resident applications other than the user interface card resident applicatio and commands that can be invoked remotely. |
| 0x0101 | SL1 key | A cryptographic key used to authenticate access to security level 1 |
| 0x0102 | SL2 key | A key used to authenticate access to security level 2 |
| 0x0103 | SL3 key | A key used to authenticate access to security level 3 |

A 'User Interface Card Header' file having identifier (0x0000), as shown in Table 35, is implicitly selected when the user interface card resident application executing on the CPU card 100B is activated (e.g. at step 2303 of the method 2300). The data in the User Interface Card Header file would typically conform to the format 1100 as shown in FIG. 11.

The data associated with a single file is stored in one contiguous area of non-volatile memory in the storage means 276 of the CPU card 100B. Each file is assigned a maximum length, and the data region associated with that file is preferably configured to provide enough space to store a longest possible file.

A file directory can be used to store certain information about each file present in the file system where the file directory consists of a list of entries beginning at address 0x10 of a static data area in the storage means 276. A two-byte word at address 0x00 can be used to represent the total number of files currently present in the directory. The region between 0x02 and 0x10 of the static data area is configured as an array of pointers to the directory entries for files 0x0000 through 0x0006, providing for quicker access to these particular files. Each directory entry is 25 bytes long, and consists of the following fields as shown in Table 36 below:

TABLE 36

| Name | Length | Description |
|---|---|---|
| ID | 2 bytes | The file's two-byte ISO 7816 identifier |
| Flags | 2 bytes | Flags associated with the file |
| Offset | 2 bytes | The offset of the first byte of the file from the bottom of the static data area |
| Read level | 1 byte | The minimum security level allowed to read the file |
| Write level | 1 byte | The minimum security level allowed to write the file |
| Length | 2 bytes | The current length of the file |
| Maxlen | 2 bytes | The maximum possible length of the file |
| Reserved For Future Use | 4 bytes | Currently unused - reserved for future use |

The flags associated with the file are a combination of zero or more of the following values shown in Table 37:

TABLE 37

| Value | Name | Description |
|---|---|---|
| 0x80 | erasable | Parts of the file may be erased if write permission satisfied |
| 0x40 | hide length | Do not report the length of the file when selected, unless read permissions are already satisfied |

The elementary files of the ISO file system can be accessed through the following commands.

2.4.1.1 File Control Information

When selecting a file stored in the storage means 276 of the card 100B, the user can receive a structure containing file control information. This structure preferably complies with Table 2 of the ISO 7816-4 standard, which includes the following:

(i) File length—this can be suppressed by the CPU 275 if a security level of the CPU card 100B is lower than a corresponding read level for the file, as will be explained in further detail later in this document;

(ii) File descriptor byte—as outlined in Table 3 of the ISO 7816-4 standard;

(iii) File identifier; and (iv) File security attributes—can be configured as a two byte number where a first byte can describe a read security level of a file and a second byte can describe a write level for the file.

2.4.1.2 Select File

The CPU card 100B can be configured such that a user can select a file stored in the storage means 276 for viewing or editing. The file can be associated with one of the user interface elements 154 (e.g. the user interface element 162). In this case, upon selecting the associated user interface element 162, the CPU 1045 of the reader 300 sends a SELECT FILE command to the user interface card resident application executing within the CPU 275. The SELECT FILE command is configured as an application protocol data unit and has a format as shown in Table 38 below. The SELECT FILE command is a subset of the specification for such a command as outlined in the ISO 7816-4 standards.

TABLE 38

| Field | Value |
| --- | --- |
| CLA | 0x00 |
| INS | 0xA4 |
| P1 | 0x00 (select MF, DF, or EF) |
|  | 0x02 (select EF under current DF) |
|  | Both 0x00 and 0x02 produce equivalent results |
| P2 | 0x00 (select first or only occurrence, return File Control Information (FCI) |
|  | 0x0C (select first or only occurrence, return no data) |
| Lc | 2 |
| Data | two-byte file identifier |
| Le | maximum length of FCI buffer (or 0, if no FCI requested) |

If the two-byte file identifier as shown in Table 38 points to a valid file, then that file becomes an active file. File control information (FCI) is returned to the reader 300 by the user interface card resident application if the P2 parameter is set to '0x00'. The error and warning identifiers as seen in Table 39 below can also be returned by the user interface card resident application upon the user interface card resident application receiving a SELECT FILE command.

TABLE 39

| Value | Meaning |
| --- | --- |
| 0x6283 | File exists, but empty |
| 0x6A81 | Incorrect parameters P1–P2 |
| 0x6A82 | File not found |
| 0x6A87 | Lc incorrect |

2.4.1.3 Read Binary

Up to two hundred and fifty six bytes can be read from a selected elementary file stored in the storage means 276 upon the reader 300 sending a READ BINARY command to the user interface card resident application executing within the CPU 275. If the end of a file is reached or exceeded then all available bytes of the file are read and a warning code is returned to the reader 300 by the user interface card resident application. The READ BINARY command is configured as an application protocol data unit and has a format as shown in Table 40 below.

TABLE 40

| Field | Value |
| --- | --- |
| CLA | 0x00 |
| INS | 0xB0 |
| P1 | MSB of offset, must be < 0x80 since short |

TABLE 40-continued

| Field | Value |
| --- | --- |
|  | EF addressing not allowed |
| P2 | LSB of offset |
| Lc | 0 |
| Data | Empty |
| Le | Number of bytes to be read |

The error and warning identifiers as seen in Table 41 below can also be returned to the CPU 1045 of the reader 300 by the user interface card resident application upon the user interface card resident application receiving a READ BINARY command.

TABLE 41

| Value | Meaning |
| --- | --- |
| 0x6282 | End of file reached |
| 0x6982 | File's read permissions are not satisfied by current security level |
| 0x6A81 | Incorrect parameters (P1 >= 0x80) |
| 0x6B00 | offset beyond end of file |

2.4.1.4 Write Binary and Update Binary

WRITE BINARY and UPDATE BINARY commands are used to write one or more bytes to an elementary file stored in the storage means 276 of the CPU card 100B. The WRITE BINARY and UPDATE BINARY commands are configured as application protocol data units having a format as shown in Table 42 below.

TABLE 42

| Field | Value |
| --- | --- |
| CLA | 0x00 |
| INS | 0xD0 (WRITE) or 0xD6 (UPDATE) |
| P1 | MSB of offset, must be < 0x80 since short EF addressing not allowed |
| P2 | LSB of offset |
| Lc | Number of bytes to write |
| Data | Bytes to write |
| Le | 0 |

Up to two hundred and fifty-five bytes of data can be written to a selected elementary file stored in the storage means 276 using the WRITE BINARY and UPDATE BINARY commands. When writing to file offsets where data is already present, that data is replaced with the new data specified in the WRITE BINARY and UPDATE BINARY commands. If the end of a file is exceeded, the length of the file is extended to accommodate the entire data string being written by the WRITE BINARY and UPDATE BINARY commands, unless the maximum length specified in the properties of the file being written to is exceeded.

The error and warning identifiers as seen in Table 43 below can be returned to the CPU 1045 of the reader 300 by the user interface card resident application upon the user interface card resident application receiving a WRITE BINARY and UPDATE BINARY command.

TABLE 43

| Value | Meaning |
| --- | --- |
| 0x6381 | Maximum length exceeded - full length not written |
| 0x6982 | File's write permissions are not satisfied by current security level |

TABLE 43-continued

| Value | Meaning |
|---|---|
| 0x6A81 | Incorrect parameters (P1 >= 0x80) |
| 0x6B00 | Offset beyond end of file |

2.4.1.5 Erase Binary

An ERASE BINARY command can be sent to the user interface card resident application by the reader 300 to truncate a file stored in the storage means 276 of the CPU card 100B, according to an offset indicated by the parameters of the ERASE BINARY command.

The format of the ERASE BINARY command is shown in Table 44 below:

TABLE 44

| Field | Value |
|---|---|
| CLA | 0x00 |
| INS | 0x0E |
| P1 | MSB of offset, must be < 0x80 since short EF addressing not allowed |
| P2 | LSB of offset |
| Lc | 0 |
| Data | Empty |
| Le | 0 |

The ERASE BINARY command truncates a file from the offset indicated by the parameters P1 and P2. Further, the following error and warning identifiers can be returned by the user interface card resident application upon receiving an ERASE BINARY command, as shown in Table 45 below:

TABLE 45

| Value | Meaning |
|---|---|
| 0x6981 | File is not erasable |
| 0x6982 | File's write permissions are not satisfied by current security level |
| 0x6A81 | Incorrect parameters (P1 >= 0x80) |
| 0x6B00 | Offset beyond end of file |

2.4.2 Security Architecture

At any given time, the user interface card resident application is executing at a certain security level on the microprocessor 259 of the CPU card 100B. Four security levels are described herein. However, up to thirty-two security levels can be implemented on the CPU card 100B. The user interface card resident application executing within the CPU 275 is configured to begin at security level zero, as defined in Table 46 below:

TABLE 46

| SL | User Type | Description |
|---|---|---|
| 0 | Default | Restricted access, normal operation within the reader. |
| 1 | Application | Used by the remote application to establish a session key through a trusted set-top box or reader. |
| 2 | Owner | Used by the user of the CPU card to customise data such as personal details, passcode etc within a file. |
| 3 | Issuer | Used by the card's issuer for administrative purposes. |

To increase the security level of the CPU card 100B the user follows the authentication process as will be described below with reference to FIGS. 46 and 47. In accordance with the described authentication process, the CPU 275 of the card 100B provides random challenge data in response to a GET CHALLENGE command. The challenge data is provided by the CPU 275 and the SHA-1 digest of the challenge data is encrypted by an authenticating agent (e.g. a bank), and returned to the CPU 275 with an EXTERNAL AUTHENTICATE command as will be described below with reference to section 2.4.2.2.

The user interface card resident application decrypts the encrypted data according to a key provided by a user and compares the result with the digest of the original challenge. If the decrypted challenge matches this digest then a user is authenticated and the CPU card 100B is set to a required security level as requested by the user. Otherwise, the CPU 275 denies permission to increase the security level of the CPU card 100B.

Generally, no authentication is required to decrease the security level of the CPU card 100B.

Each file of a file system implemented on the CPU card 100B is associated with a read security level, and a write security level. The READ BINARY, WRITE BINARY, UPDATE BINARY and ERASE BINARY commands sent to the CPU card 100B from the reader 300 will only succeed if the current security level of the CPU card 100B is greater than or equal to the appropriate security level associated with the selected file.

The security attributes of a file are encoded in file control information (FCI) as a two-byte field marked by a tag '86', which is associated with a particular file. The first byte represents the read security level, while the second byte represents the write security level associated with the file. The following commands are sent to the CPU 275 of the CPU card 100B by the CPU 1045 of the reader 300 during the process of changing the security level of the CPU card 100B.

The PROCESS COORD command can be utilised to effectively override the security level of a file. A file that is referenced in a user interface element object specified by the P1 and P2 co-ordinates of an PROCESS COORD command can be accessed without the card 100B being set to the required security level, if a user interface element 154 corresponding with the file (i.e. the user interface element object) is pressed or released. The file can only be accessed in this manner through the mechanisms provided by the PROCESS COORD command. However, this enables the issuer of the card 100B to provide limited access to the contents of a file while still protecting the file from general use.

2.4.2.1 Get Challenge

The format of the GET CHALLENGE command follows a subset of a similar command specification in the ISO 7816-4 standard, as shown in Table 47.

TABLE 47

| Field | Value |
|---|---|
| CLA | 0x00 |
| INS | 0x84 |
| P1 | 0x00 |
| P2 | 0x00 |
| Lc | 0 |
| Data | Empty |
| Le | Variable (must be positive multiple of 8) |

A number of bytes (i.e., determined by the Le field) of challenge data are returned by the CPU 275 of the CPU card 100B in response to the GET CHALLENGE command. Further, the error and warning identifiers as shown in Table 48 can also be returned by the CPU 275 in response to the GET CHALLENGE command.

TABLE 48

| Value | Meaning |
|---|---|
| 0x6A81 | Incorrect parameters |

2.4.2.2 External Authenticate

If the security level requested by a user is greater than the security level that the CPU card 100B is currently set to, then an EXTERNAL AUTHENTICATE command having a format shown in Table 49 below, is sent to the CPU 275. The EXTERNAL AUTHENTICATE command attempts to decrypt the security level data stored in the storage means 276 using a key associated with the requested security level. If the EXTERNAL AUTHENTICATE command is successful, then the security level of the CPU card 100B is changed in accordance with the request made by the user. Conversely, if the requested security level is less than or equal to the security level that the CPU card 100B is currently set to then the security level is changed without attempting to authenticate the user. A nominal number of attempts (e.g. three) can be allowed before a fresh challenge is requested by the CPU 1045.

TABLE 49

| Field | Value |
|---|---|
| CLA | 0x00 |
| INS | 0x82 |
| P1 | 0x00 |
| P2 | 0x80 & S, where S is a 5-bit number representing the requested SL |
| Lc | Length of key to encrypt challenge |
| Data | Encrypted challenge |
| Le | 0 |

The error and warning identifiers shown in Table 50 can also result from an EXTERNAL AUTHENTICATE command being sent to the CPU card 100B.

TABLE 50

| Value | Meaning |
|---|---|
| 0x63CX | Authentication failed: X more attempts are allowed before a new challenge must be issued |
| 0x6700 | Lc inconsistent with parameters (must be equal to 64 if authentication required) |
| 0x6985 | No challenge data available: GET CHALLENGE command must first be issued |
| 0x6A81 | Invalid parameters P1–P2 |
| 0x6A88 | Key file for referenced security level not available |

2.4.2.3 Example

In one example of the security architecture described herein, the CPU card 100B can contain some information about its user. The information can be associated with one or more user interface elements. For example, one user interface element object can store the user's home address, while another user interface element object stores the user's credit card number. If the issuer of the CPU card 100B wishes to make the data associated with both user interface element objects easy to modify at a later date without having to change the mapping data associated with the user interface element objects, both pieces of user information can be stored in separate files in the memory 276 of the card 100B, and references to these files can stored in a mapping data file associated with the user interface element objects.

If the user's place of residence were to change, the user can be allowed to change the address by giving the associated file a write security level of 2, so that the user must authenticate themselves before being able to change the information. However, if the user desires to change the credit card number stored on the card 100B, the issuer might require that the user bring the card 100B to a central authority, for example, together with the new credit card, at which point the issuer can update the credit card number on the CPU card 100B. Such a file can be created with a write security level of 3, denying the user the opportunity to modify the file, but allowing the issuer to do so.

2.4.3 Card Authentication

Certain applications might require the user interface card resident application to authenticate itself to another program. For this purpose, the user interface card resident application can store a certificate signed by a trusted certification authority. The certificate is stored within a file with an identifier of 0x0013, and must contain the following objects (i) to (iv):

(i) Certificate name (tag 0x5F20): this should be either the card identifier stored in the image header file, or another identifier which can be derived by the directory server 911 from the card identifier using a mapping function; and (ii) Public key (tag 0x5F49) (i.e., the certificate's public key): Table 51 below shows the structure of the public key component:

TABLE 51

| Element | Length |
|---|---|
| Modulus Length | 2 bytes |
| Exponent Length | 2 bytes |
| Modulus | Modulus length |
| Exponent | Exponent Length |

(iii) Issuer name (tag 0x42): a name which can be used to identify the certificate's issuer.

(iv) (Optional) Expiry date (tag 0x59): in Binary Coded Decimal, MMYY format.

The objects (i) to (iv) are followed by the issuer's signature, which is created by computing the SHA-1 digest of the certificate material and encrypting the digest with the issuer's private key. The issuer's signature has a tag of 0x5F37. The card certificate is introduced with a tag of 0x7F21.

The private key corresponding to the certificate's public key is stored in a separate file in the card 100B with an identifier of 0x0012, which should be made unreadable. The length of this separate file is preferably equal to 2.5 times the length of the key's modulus. The data stored in the file consists of the parameters used in the modular exponentiation algorithm using the Chinese remainder theorem. The structure of the file containing the private key is shown in Table 52 as follows:

TABLE 52

| Name | Length | Description |
|---|---|---|
| Dp | L/2 bytes | The secret exponent modulo (p-1) |
| Dq | L/2 bytes | The secret exponent modulo (q-1) |
| P | L/2 bytes | The smaller of the prime numbers used to generate the key. |

TABLE 52-continued

| Name | Length | Description |
|---|---|---|
| Q | L/2 bytes | The larger of the prime numbers used to generate the key. |
| U | L/2 bytes | The inverse of q modulo p |

The card certificate can be retrieved from the storage means 276 of the card 100B using a READ BINARY command. Once the certificate has been retrieved, the certificate can be verified by issuing an INTERNAL AUTHENTICATE command, which issues a challenge for the card 100B to sign using the private key. The INTERNAL AUTHENTICATE command, will now be described.

2.4.3.1 Internal Authenticate

The format of the INTERNAL AUTHENTICATE command follows a subset of the specification in ISO 7816-4, as shown in Table 53:

TABLE 53

| Field | Value |
|---|---|
| CLA | 0x00 |
| INS | 0x88 |
| P1 | 0x00 |
| P2 | 0x00 |
| Lc | Number of bytes in challenge |
| Data | Challenge |
| Le | Number of bytes to be read |

As described above, the challenge provided to the card 100B is preferably a random number being at least 8 bytes long.

The user interface card resident application uses the private key corresponding to the public key stored in the card certificate to encrypt a string consisting of the SHA-1 digest of the challenge, preceded by a header indicating the nature of the digest. The corresponding plain-text data is constructed according to the procedure defined in PKCS#1 referenced above, and will take the form:

00 01 FF . . . 00 30 21 30 09 06 05 2b 0e 03 02 1a 05 00 04 14||H where H represents the 20 byte SHA-1 digest, and as many FF bytes are inserted as are required to make the message length equal the modulus length of the above-mentioned public key.

Table 54, below, shows the error and warning conditions which are possible:

TABLE 54

| Value | Meaning |
|---|---|
| 0x6985 | Conditions of use not satisfied. If the card is PIN protected, a valid PIN must have been entered before the card will authenticate itself. |
| 0x6A86 | Invalid parameters P1–P2. P1 must be set to 0 in this implementation. |
| 0x6A88 | Referenced data not found. There is only one secret used by this command in this implementation, and any attempt to reference a different secret in the P2 byte will result in this error. |

2.4.4 End-to-End Encryption

The user interface card resident application of the card 100B provides a mechanism for ensuring confidentiality and authenticity of data by means of a secure session. Such a secure session can be established between the card 100B and any other entity (e.g. the server 652). Typically, this other entity is an authorised server (e.g. the server 652), which requires access to sensitive data stored on the card 100B. Alternatively, the other entity can be an application executing on a computer 700 or set top box 601.

Each data object in a user interface card image has an "encrypt data" flag in its object flags byte. Any data object with this flag set can only leave the card 100B after having been encrypted.

Prior to the card 100B encrypting data, a secure session is set up by an off-card entity [hereinafter referred to as 'a server 652']. The server 652 must send two pieces of information to the user interface card resident application of the card 100B as follows:

(i) a 32-byte number: this number should ideally be randomly generated using a cryptographically secure random number generator; and (ii) an issuer-signed server certificate, similar in format to that described in Section 2.4.3 above.

The server certificate is subsequently verified by the user interface card resident application. If this verification is successful, the user interface card resident application is satisfied that the server 652 is authorised by the issuer of the card 100B to accept data.

The user interface card resident application then proceeds to generate a master secret, which consists of a block of 48 bytes of random data, followed by a 32-byte number provided by the server.

A further block of data, representing a key block, is generated by the following algorithm:

Block=SHA 1("A" ||master secret)||
  SHA-1("BB" ||master secret)||
  SHA-1("CCC" ||master secret)

Starting from the beginning of the key block of data, the following secrets are then extracted:

(i) Client Message Authentication Code (MAC) key (8 bytes)

(ii) Server Message Authentication Code (MAC) key (8 bytes)

(iii) Client session key (16 bytes)

(iv) Server session key (16 bytes)

(v) Initial Value (8 bytes)

The remaining 4 bytes of the key block of data are discarded. The initial value is duplicated in order to provide one for the user interface card resident application and one for the server. Further, 8-byte sequence numbers for both the user interface card resident application and the server 652 are initialised to 0.

All security keys are adjusted to have odd parity to satisfy the requirements of the "Data Encryption Standard (DES)" algorithm as known to those in the relevant art.

Using the public key provided in the certificate of the server 652, the user interface card resident application encrypts the part of the master secret generated by itself, and sends the encrypted part to the server 652. The server 652 can then calculate the session secrets using the same method as described above.

Figure 54:
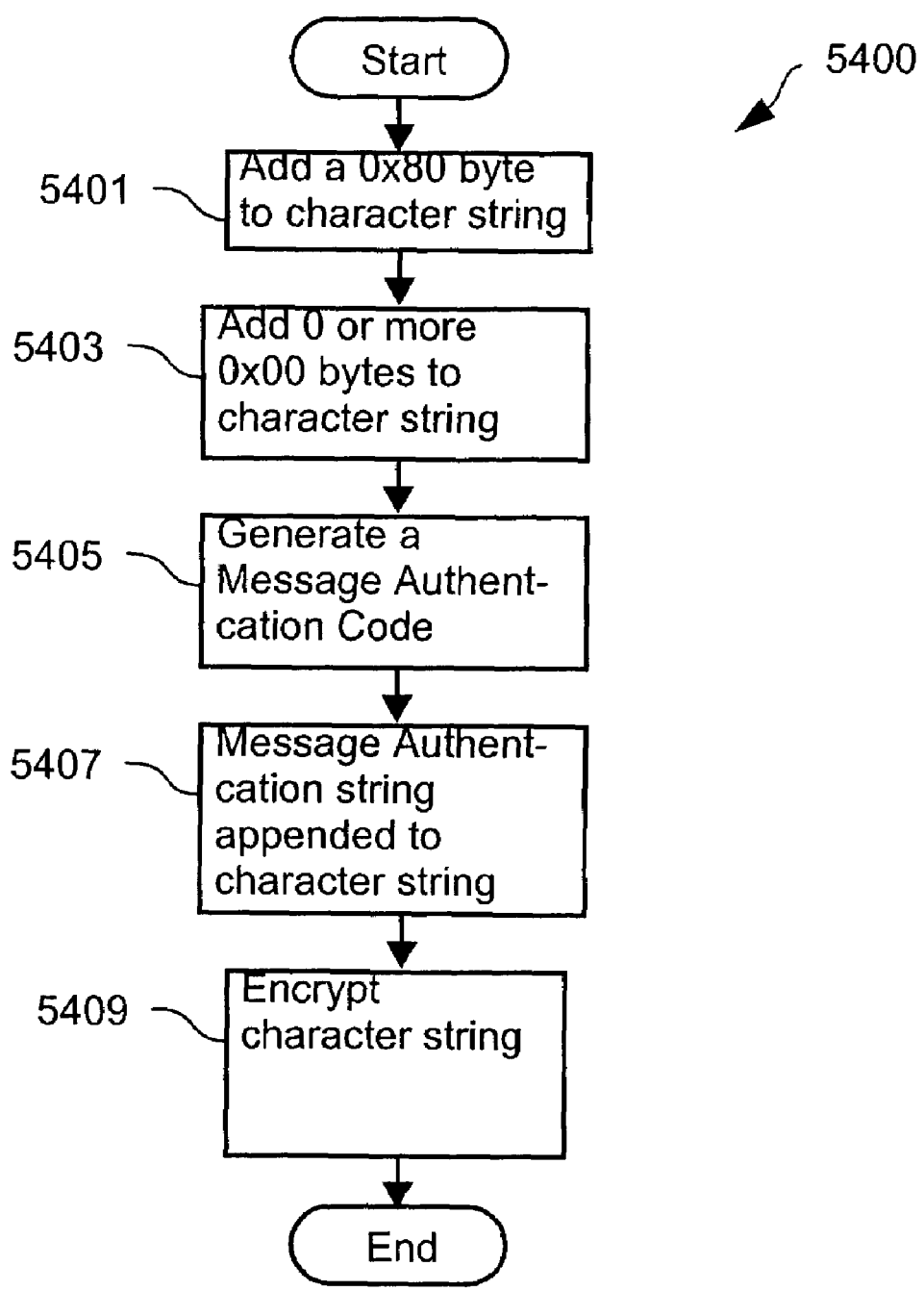
FIG. 54 is a flow diagram showing a process for encrypting a character string.

FIG. 54 is a flow diagram showing a process 5400 for encrypting a character string. The process 5400 is preferably implemented as part of the user interface card resident application program executing within the CPU 275 of the microprocessor 259 and being stored in the storage means 276. The process begins at step 5401 where the user interface card resident application adds a 0x80 byte to the end of the character string. At the next step 5403, 0 or more 0x00 bytes are added to the end of the character string, until the total length of the string is a multiple of 8. Then at step 5405, a Message Authentication Code (MAC) is generated for the message by encrypting the string using the Data Encryption Standard (DES) algorithm in Cipher Block Chaining (CBC) mode, with the user interface card resident application sequence number as an initial value, and the client Message Authentication Code key. The Message Authentication Code is taken to be the final encrypted 8-byte block. The process 5400 continues at the next step 5407, where the Message Authentication Code is appended to the end of the character string. The process 5400 concludes at step 5409, where the user interface card resident application encrypts the entire string using the triple data encryption standard (DES) algorithm in Cipher Blocking Code (CBC) mode. The initial value is taken to be the last encrypted block from the previous message. The first and third keys used in the algorithm are taken to be the first 8 bytes of the client session key. The second key is taken to be the last 8 bytes of the client session key.

The encrypted string can be decrypted by the server 652, for example, by reversing the process 5400.

2.4.4.1 Generate Session Key

A Session Key is generated using a GENERATE SESSION KEY command, which is invoked using the application protocol data unit as shown in Table 55, below:

TABLE 55

| Field | Value |
|---|---|
| CLA | 0x90 |
| INS | 0x30 |
| P1 | 0x00 |
| P2 | 0x00 |
| Lc | Number of bytes in current message |
| Data | Message Fragment |
| Le | Number of bytes to be read |

Since certificate lengths may exceed the maximum amount of data that can be stored in one application protocol data unit, the GENERATE SESSION KEY command command can be broken up into fragments. The first fragment contains the server 652 generated random number as well as the tag and length of the subsequent certificate. Any following fragments contain additional portions of the certificate, and may be broken up in any way.

The server 652 generated random number is preferably introduced by the tag 0x04 and the certificate is introduced by the tag 0x7F21.

If the session key is generated successfully, the output data consists of the tag 0x82 to indicate encrypted data, followed by the length of the encrypted master secret, followed by the encrypted master secret itself.

Table 56 shows the error conditions for the generated session key command:

TABLE 56

| Value | Meaning |
|---|---|
| 0x6989 | No random number supplied in 1st fragment |
| 0x698A | Incorrect length or incomplete random number supplied in 1st fragment |
| 0x698B | No certificate supplied in 1st fragment |
| 0x698C | Certificate is too long to be processed by the card |
| 0x6989D | Command data overflows certificate length |
| 0x698E | Certificate does not contain all required objects |
| 0x698F | Signature verification failed |

2.4.5 Allowing Remote Clients to Access Card Services

There are situations in which a remote entity, such as the server 652, may wish to execute commands on an application resident on the card 100B. The user interface card resident application provides a mechanism to receive commands from the server 652, for example, through the reader 300 and to execute the commands. Such commands are to be issued by the reader 300 within an ENVELOPE command. Command data, representing the commands from the server 652, within the ENVELOPE command contains an application protocol data unit, formatted as described in section in section 5.3 of the ISO 7816-4 standard. If a secure session, as described above, has been established between the card 100B and the server 652, then the application protocol data unit stored within the ENVELOPE command may be encrypted.

Typically, the ENVELOPE command is created by the reader 300, using the data provided to the reader 300 by the remote device, (e.g. the server 652).

Initially, commands issued using the ENVELOPE command may only be directed at the user interface card resident application itself. Some user interface card resident application commands are prevented from execution by the server 652, for example. Others of the interface card resident application commands can be executed depending on certain conditions having been met.

Table 57, below, lists some of the user interface card resident application commands and the corresponding conditions under which the commands are prevented from execution.

TABLE 57

| Command | Conditions |
|---|---|
| PROCESS COORD | Disabled |
| SAVE STATE | Disabled |
| RESTORE STATE | Disabled |
| READ BINARY | Secure messaging required if file's read security level is > 0 |
| WRITE BINARY | Secure messaging required if file's read security level is > 0 |
| UPDATE BINARY | Secure messaging required if file's read security level is > 0 |
| ERASE BINARY | Secure messaging required if file's read security level is > 0 |
| EXT AUTHETICATE | Secure messaging required |
| INT AUTHENTICATE | Passcode input mode must be currently off (ie the user must have already entered a passcode, if the card is protected by one) |
| ENVELOPE | Disabled |
| GET RESPONSE | Disabled |

Any user interface resident application commands not mentioned in the Table 53 may be executed by a remote device such as the server 652 without any restrictions. However, all of the commands of Table 57 can be presented to other card 100B resident applications.

In order for the remote server 652 to communicate with a different card resident application, a logical channel must be established between the card resident application adn the remote server 652. Logical channels are described in section 5.5 of the ISO 7816-4 standards and are processed directly by the user interface card resident application. A logical channel is created using a CREATE CHANNEL command, which specifies the application to connect to and which will be described in detail below. The user interface card resident application can determine whether remote access to the application specified by the CREATE CHANNEL command is allowed with the aid of an access control list.

The access control list will be described in detail below.

Once a channel has been created using the CREATE CHANNEL command, the server 652 can communicate with a particular application by including a channel number in the class byte of an application protocol data unit that is sent to the application by the server 652. Since access to the application is still provided through the user interface card resident application, the user interface card resident application can also consult an access control list to determine which commands are allowed or banned for a particular application.

2.4.5.1 Access Control List

The access control list is a file stored in memory 276 of the CPU card 100B, which is used to determine the conditions required to invoke commands provided by card-resident applications running alongside the user interface card resident application. Table 58, below, shows the fields contained in the access control list file.

TABLE 58

| Name | Value | Description |
| --- | --- | --- |
| Flags | 1 byte | See Table 59 |
| Appid | 1 or more bytes | An application identifier, where the first byte indicates the length of the following field. |
| Command | 4 bytes | The command portion of the application protocol data unti referred to by this entry, consisting of CLA, INS, P1 and P2 bytes |
| Condition flags | 1 byte | A structure detailing the conditions which have to be fulfilled for this access to be allowed See Table 60. |

Table 59, below, list the flags which are defined for the first field of an access control list entry:

TABLE 59

| Name | Length | Description |
| --- | --- | --- |
| Allow | 0x01 | If this flag is set, the current entry instructs the user interface card resident application to allow access to commands matching the given criteria. If not, the current entry instructs the user interface card resident application to deny access to commands matching the given criteria. |
| Partial appid match | 0x02 | If this flag is set, partial matches are allowed on application identifiers. Thus, if the application identifier provided in an entry is shorter than that of the application in question, a match will still be made based on the number of bytes that are available. |
| CLA wildcard | 0x04 | The CLA byte provided in this entry should be treated as a wildcard. |
| INS wildcard | 0x08 | The INS byte provided in this entry should be treated as a wildcard. |
| P1 wildcard | 0x10 | The P1 byte provided in this entry should be treated as a wildcard. |
| P2 wildcard | 0x20 | The P2 byte provided in this entry should be treated as a wildcard. |
| RFU | 0x40 | Reserved for future use |
| RFU | 0x80 | Reserved for future use |

Table 60, below, list the Condition flags which are defined for the condition flags field of an access control list entry:

TABLE 60

| Name | Length | Description |
| --- | --- | --- |
| User Authenticated | 0x01 | If this flag is set, access to current command is allowed if the user has authenticated themselves by entering a Personal Identification Number or other form of secure code which is accepted by the card. |

TABLE 60-continued

| Name | Length | Description |
| --- | --- | --- |
| Secure Session | 0x02 | If this flag is set, access to the current command is allowed if the session is being performed over an encrypted channel. |
| RFU | 0x04 | Reserved for future use |
| RFU | 0x08 | Reserved for future use |
| RFU | 0x10 | Reserved for future use |
| RFU | 0x20 | Reserved for future use |
| RFU | 0x40 | Reserved for future use |
| RFU | 0x80 | Reserved for future use |

2.4.5.2 Envelope

The format of the ENVELOPE command follows a subset of the specification in ISO 7816-4, as shown in Table 61, below.

TABLE 61

| Field | Value |
| --- | --- |
| CLA | 0x00 or 0x04 |
| INS | 0xC2 |
| P1 | 0x00 |
| P2 | 0x00 |
| Lc | Number of bytes in current message |
| Data | Envelope data |
| Le | Number of bytes to be read |

The class byte (CLA) of the ENVELOPE command is set to 0x04 if data enclosed in the command is encrypted using a previously determined session key.

The user interface card resident application interpret the data contained within the ENVELOPE command (after decryption, if necessary) as an application protocol data unit. If the class byte of such an application protocol data unit indicates a logical channel other than 0, the user interface card resident application will delegate the application protocol data unit to the application currently associated with that logical channel.

The data returned to the remote server 652 by the ENVELOPE command is always a response application protocol data unit, containing the response data followed by status bytes obtained by executing the application protocol data unit. If the original ENVELOPE command application protocol data unit was encrypted, then any such response application protocol data unit is also encrypted before being to the server 652.

Table 62 lists the error conditions for the ENVELOPE command:

TABLE 62

| Value | Meaning |
| --- | --- |
| 0x6987 | Expected secure messaging data objects missing: the message is not long enough to contain an 8-byte Message Authentication Code at the end. |
| 0x6988 | Secure messaging data objects incorrect: the length of the command data is not a multiple of 8, or the Message Authentication Code was incorrect |

2.4.5.3 Create Channel Command

Although the functionality of the CREATE CHANNEL command is similar to the ISO standard MANAGE CHANNEL command, the need to explicitly associate a channel to be created with a single application requires that a non-standard command be used.

The format of the CREATE CHANNEL command is shown in in Table 63 as follows:

TABLE 63

| Field | Value |
|---|---|
| CLA | 0x90 |
| INS | 0x70 |
| P1 | 0x00 (if selection by Application ID) or 0x80 (if selection by DIR record number) |
| P2 | DIR file record number (if P1 = 0x80) or 0x00 (if P1 = 0x00) |
| Lc | 0x00 (if P1 = 0x80) or length of appliacation ID (if P1 = 0x00) |
| Data | Application ID (if P1 = 0x00) |
| Le | 0x01 |

The response data returned by the user interface card resident application in response to the CREATE CHANNEL command indicates the identifier allocated to the virtual channel that has been created.

Table 64, below, lists the error conditions that are defined for the CREATE CHANNEL command

TABLE 64

| Value | Meaning |
|---|---|
| 0x6985 | Access to selected application denied due to conditions of use not being met (eg PIN entry, secure messaging). |
| 0x06A81 | Access to selected application denied. |
| 0x6A83 | If selection by DIR record number: record not found or does not contain a valid application identifier.<br>If selection by application ID: application ID not present within DIR file. |

2.4.5.4 Get Directory (DIR) File Record

The GET DIR RECORD command provides a standard mechanism that can be used to request access to a directory file on a the card 100B. The GET DIR RECORD command follows the structure of the READ RECORD command, but does not require that the directory (DIR) file be selected in the first place.

The format of the GET DIR RECORD command is shown in Table 65, below, as follows:

TABLE 65

| Field | Value |
|---|---|
| CLA | 0x90 |
| INS | 0xB2 |
| P1 | The number of the required record (should be 1 or greater) |
| P2 | 0x00 |
| Lc | 0x00 |
| Data | Empty |
| Le | Length of data to be received |

If response data is returned in response to GET DIR RECORD command, the response data contains the contents of the requested record. The response data is in "Tag, Length, Value (TLV)" format, and be structured according to the Application Template described in "ISO/IEC 7816-6: 1996, "Identification cards—Integrated Circuit(s) with Contacts—Part 6: Interindustry data elements" [hereinafter 'ISO 7816-6 standard].

Reading of a "currently selected" record referenced by record number 0 is not allowed.

Table 66, below, lists the error conditions for the GET DIR RECORD command.

TABLE 66

| Value | Meaning |
|---|---|
| 0x6282 | End of record reached before Le bytes |
| 0x06A83 | Record not found |

2.5 Instruction Invocation

The commands and classes referred to herein, including those commands described above, are configured in accordance with the ISO 7816-4 standard. Whenever a command configured as an application protocol data unit is received by the user interface card resident application executing within the CPU 275, an instruction pointer is set to zero. The user interface card resident application analyses a header associated with the received application protocol data unit to determine whether a valid command has been received. If valid, a process corresponding to the command is executed by the CPU 275 of the CPU card 100B. Alternatively, if the command is not valid then an error identifier (e.g. '0x6E00' representing 'class not supported') is returned to the CPU 1045 of the reader 300.

2.5.1 Main Process

Figure 24:
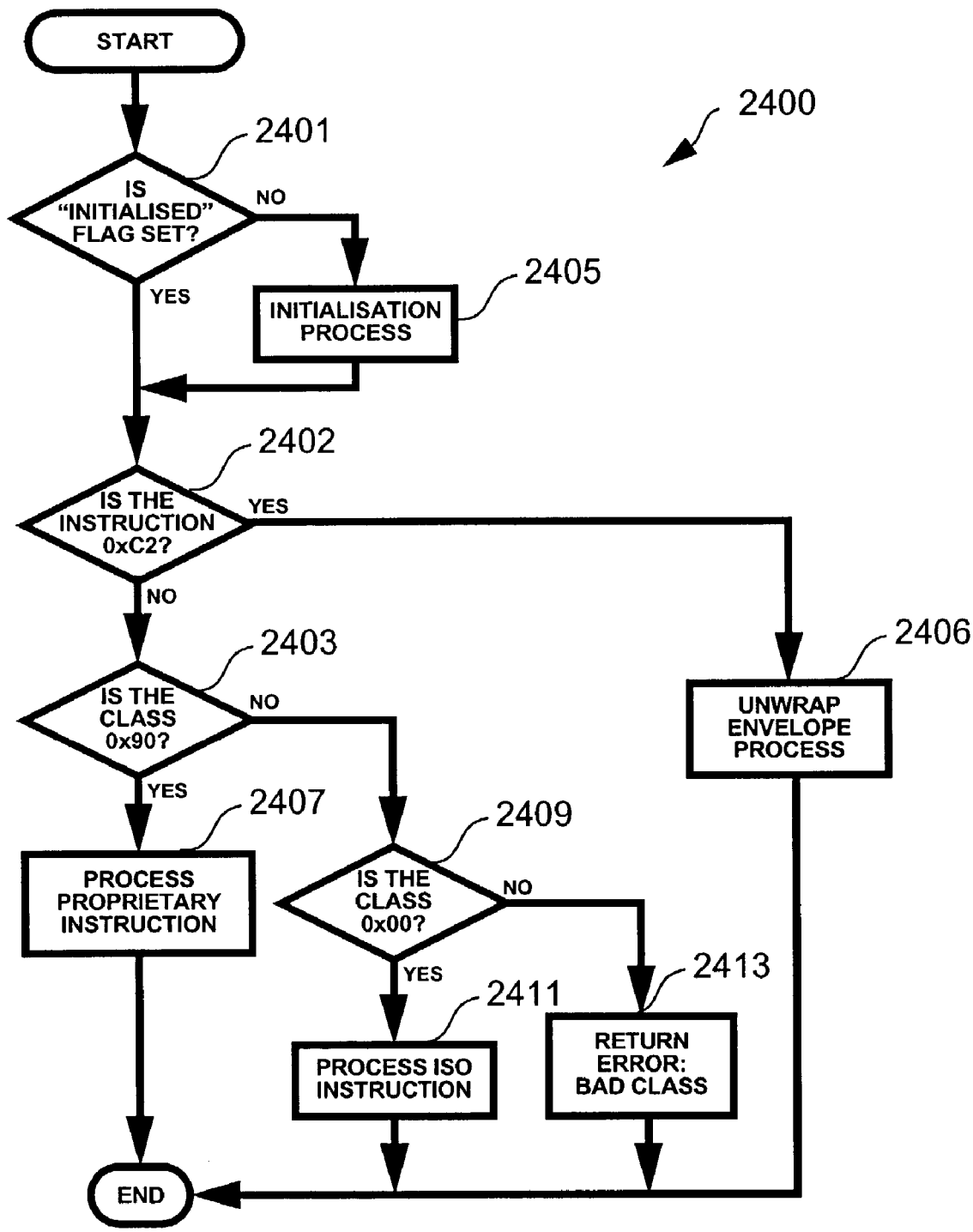
FIG. 24 is a flow diagram showing a process executed when a command is issued to a user interface card resident application executing on the smart card of FIG. 1(a)
Figure 25:
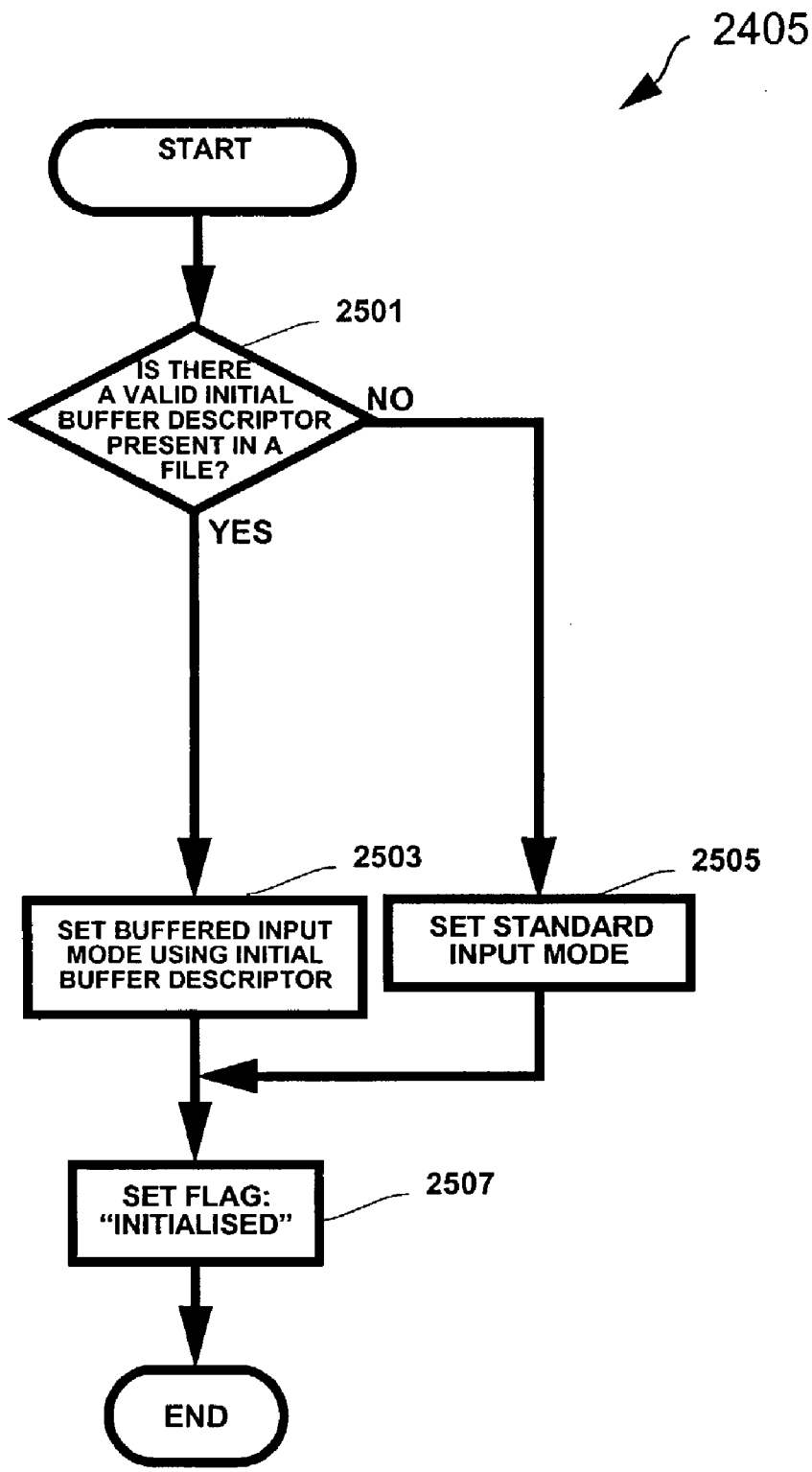
FIG. 25 is a flow diagram showing an initialisation process.

A main process 2400, as shown in FIG. 24, is executed by the CPU 275 upon a command being issued to the user interface card resident application by the reader 300. The process 2400 checks whether or not the CPU card 100B has been initialised and if not, then an initialisation process, as seen in FIG. 25, is executed by the CPU 275. The initialisation process will be explained in detail below.

The main process 2400 is implemented as software, preferably as part of the user interface card resident application program executing within the CPU 275 of the microprocessor 259 and being stored in the storage means 276. The process 2400 begins at step 2401 upon the user interface card resident application receiving a command. If an 'Initialised Flag' stored in the storage means 276 is set then the process 2400 continues at the next step 2402. Otherwise, the process 2400 proceeds to step 2405, where the CPU 275 executes the initialisation process 2500 in order to set the user interface card resident application to a standard or buffered input mode. At step 2402, if the INS field of the command received by the user interface card resident application is '0xC2' representing an ENVELOPE command, then the process 2400 proceeds to step 2406 where an unwrap envelope process is executed by the CPU 275 to unwrap the application protocol data unit of the command. Otherwise, the process 2400 proceeds to step 2402. The unwrap envelope process, as executed at step 2406, is configured to process ENVELOPE commands and will be explained in detail below with reference to FIG. 50.

At step 2403, if the class of the command is '0x90' then the process 2400 proceeds to step 2407 where a proprietry instruction process is executed by the CPU 275, on all commands not conforming to ISO 7816-4 standard interfaces but which are specific to the user interface card resident application. Otherwise the process 2400 proceeds to step 2409 where if the class of the command is '0x00' then the process 2400 proceeds to step 2411. The proprietary instruction process executed at step 2407 will be explained in detail below with reference to FIG. 26. At step 2411, an ISO instruction process is executed by the CPU 275 on all commands not conforming to ISO 7816-4 standard interfaces. The ISO instruction process will be explained in more detail below with reference to FIG. 27. If the class of the command is not '0x00', at step 2409, then the process 2400 proceeds to step 2413, where a 'bad class' error identifier is returned to the CPU 1045 of the reader 300 by the CPU 275 of the CPU card 100B and the process 2400 concludes.

2.5.2 Initialisation Process

FIG. 25 is a flow diagram showing the initialisation process executed at step 2405 by the CPU 275, at the beginning of the first instruction issued to the CPU card 100B. The initialisation process is implemented as software, preferably as part of the user interface card resident application program executing within the CPU 275 of the microprocessor 259 and being stored in the storage means 276. The process of step 2405 begins at sub-step 2501, where if there is a valid initial buffer descriptor described in a file stored in the storage means 276, then the process of step 2405 proceeds to sub-step 2503, where the buffered input mode is set according to the parameters of the initial buffer descriptor. If there is no valid initial buffer descriptor, at sub-step 2501, then the process of step 2405 proceeds to sub-step 2505 where the CPU card 100B is set to standard input mode. At the next sub-step 2505, the initialised flag stored in the storage means 276 is set and the process by the CPU 275 of step 2405 concludes.

2.5.3 Proprietary Instruction Process

Figure 26:
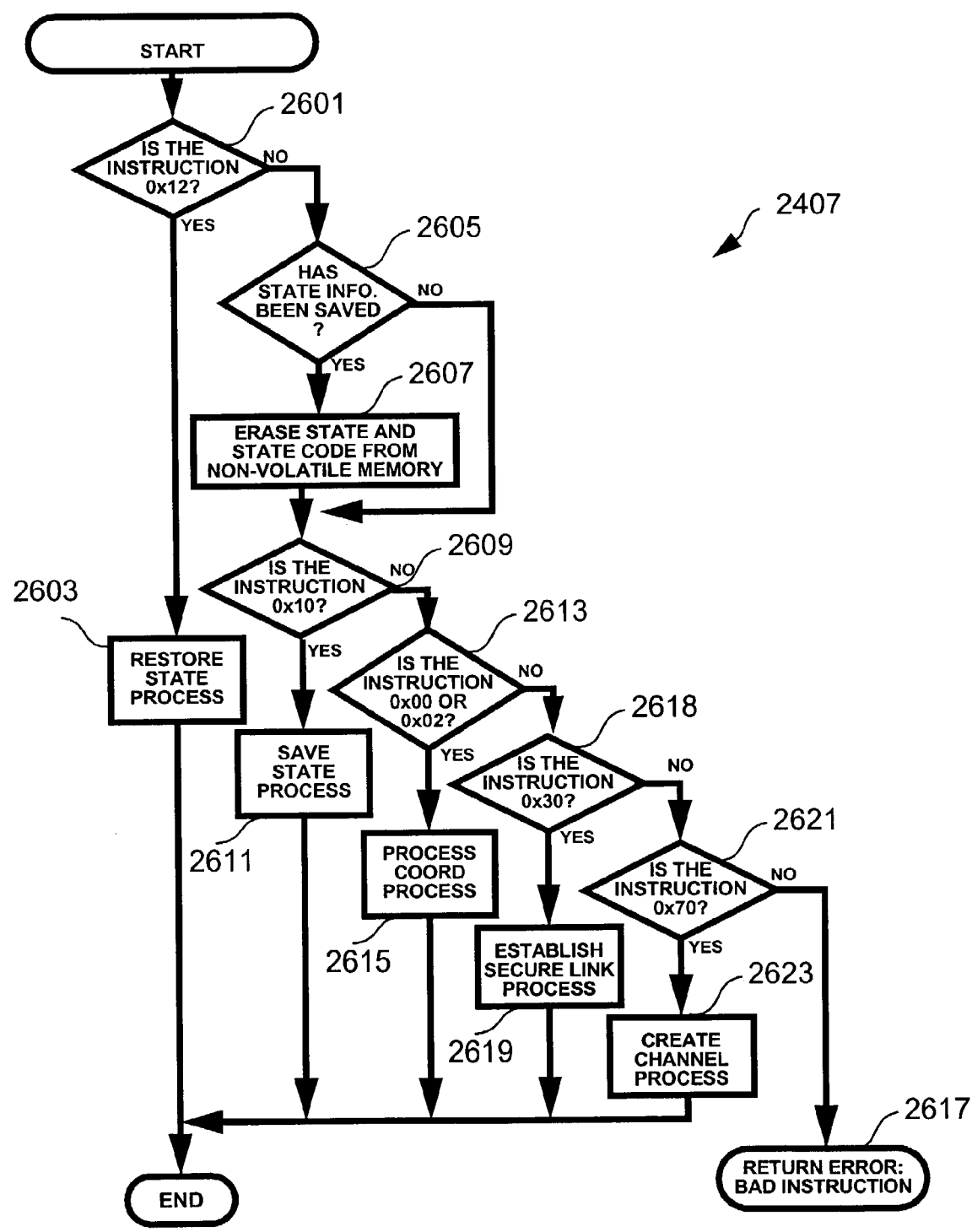
FIG. 26 is a flow diagram showing a proprietary instruction process.

FIG. 26 is a flow diagram showing the proprietary instruction process executed at step 2407. The process of step 2407 is preferably implemented as part of the user interface card resident application program executing within the CPU 275 of the microprocessor 259 and being stored in the storage means 276. As described above, the proprietary instruction process is responsible for all of the commands which do not conform to the ISO 7816-4 standard interfaces, but are specific to the user interface card resident application and have a class byte, 0x90.

The process of step 2407 begins at sub-step 2601, where if the CPU 275 determines that the command received by the user interface card resident application is 0x12 representing a RESTORE STATE command then the process proceeds to sub-step 2603. Otherwise, the process of step 2407 proceeds to sub-step 2605 where if the CPU 275 has saved the state information in the storage means 276 then the process proceeds to sub-step 2607.

At sub-step 2603, a restore state process is executed by the CPU 275. The restore state process is configured to erase previous state information stored in non-volatile memory of the storage means 276 if the present state code is not identical to the previous state code generated during a previous SAVE STATE command. The restore state process will be described in more detail below with reference to FIG. 41.

At sub-step 2607, the state information and state code are erased from the non-volatile memory of the storage means 276. The process of step 2407 continues at the next sub-step 2609 where if the command received by the user interface card resident application is 0x10 representing a SAVE STATE command, then the process continues at sub-step 2611. Otherwise, the process of step 2407 continues at sub-step 2613. At sub-step 2611, a save state process is executed by the CPU 275. The save state process saves all volatile state information to non-volatile memory of the storage means 276 and then generates a random state code of a specified length. The save state process will be described in more detail below with reference to FIG. 40.

At sub-step 2613, if the INS field of the command is 0x00 or 0x02 representing a PROCESS COORD coordinate command then the process of step 2407 proceeds to sub-step 2615 where a process coordinate process is executed by the CPU 275. The process coordinate process searches the data stored on the storage means 276 to determine a user interface element object corresponding to the coordinates provided by the reader 300 upon a user selecting one of the user interface elements 154. The process coordinate process will be described below with reference to FIG. 28. Otherwise, the process of step 2407 continues at sub-step 2613.

At sub-step 2618, if the INS field of the command is 0x30 then the process of step 2407 proceeds to sub-step 2619 where a generate session key process is executed by the CPU 275. Otherwise the process proceeds to sub-step 2621. The generate session key process will be described below with reference to FIG. 53.

At sub-step 2621, if the INS field of the command is 0x70 representing a CREATE CHANNEL command then the process of step 2407 proceeds to sub-step 2623 where a create channel process is executed by the CPU 275. The create channel process determines whether the application requested with the command exists, and, if so, whether the conditions to access the requested application have been satisfied, before associating the application with the channel to be created. The create channel process will be will be described below with reference to FIG. 52. Otherwise, the process of step 2407 proceeds to sub-step 2617 where a bad instruction error identifier is returned to the CPU 1045 of the reader 300 by the user interface card resident application executing within the CPU 275.

2.5.4 ISO Instruction Process

FIG. 27 is a flow diagram showing the ISO instruction process executed at step 2411 of the process 2400. The process of step 2411 is responsible for processing all instructions, received by the user interface card resident application executing within the CPU 275, from the reader 300, which do not conform to the interfaces specified in the ISO 7816-4 standards, and have a class byte of 0x00. The process of step 2411 is preferably implemented as part of the user interface card resident application program executing within the CPU 275 of the microprocessor 259 and being stored in the storage means 276. The process of step 2411 begins at sub-step 2701 where if the the INS field of the command received by the CPU 275 of the CPU card 100B is 0xA4, representing a SELECT FILE command then the process proceeds to sub-step 2703. Otherwise, the process of step 2411 proceeds to sub-step 2705. At sub-step 2703 a select file process is executed by the CPU 275 in order to determine an active file. The select file process will be described in more detail below with reference to FIG. 42.

At sub-step 2705, if the the INS field of the command received by the CPU 275 of the CPU card 100B is 0xB0, representing a READ BINARY command then the process proceeds to sub-step 2707. Otherwise, the process of step 2411 proceeds to sub-step 2709. At sub-step 2707 a read binary process is executed by the CPU 275 to read data from a currently selected elementary file. The read binary process will be described in more detail below with reference to FIG. 43.

The process of step 2411 continues at sub-step 2709, where if the the INS field of the command received by the CPU 275 of the CPU card 100B is 0xD0 or 0xD6, representing a WRITE BINARY command or an UPDATE BINARY command, respectively, then the process proceeds to sub-step 2711. Otherwise, the process of step 2411 proceeds to sub-step 2713. At sub-step 2711 a write binary process is executed to write data to a currently selected elementary file. The write binary process will be described in more detail below with reference to FIG. 44.

At sub-step 2713, if the the INS field of the command received by the CPU 275 of the CPU card 100B is 0x0E, representing an ERASE BINARY command then the process proceeds to sub-step 2715. Otherwise, the process of step 2411 proceeds to sub-step 2717. At sub-step 2715 an erase binary process is executed by the CPU 275 to truncate a currently selected elementary file depending on the parameters received with the ERASE BINARY command. The erase binary process will be described in more detail below with reference to FIG. 45.

The process of step 2411 continues at sub-step 2717, where if the the INS field of the command received by user interface card resident application executing within the CPU 275 of the CPU card 100B is 0x84, representing a GET CHALLENGE command then the process proceeds to sub-step 2719. Otherwise, the process of step 2411 proceeds to sub-step 2721. At sub-step 2719 a get challenge process is executed by the CPU 275 to provide challenge data in order to allow the security level of the CPU card 100B to be changed. The get challenge process will be described in more detail below with reference to FIG. 46.

At sub-step 2721, if the the INS field of the command received by the CPU 275 of the CPU card 100B is 0x82, representing an EXTERNAL AUTHENTICATE command then the process proceeds to sub-step 2723. Otherwise, the process of step 2411 proceeds to sub-step 2727. At sub-step 2723 an external authenticate process is executed by the CPU 275 to decrypt presented challenge data using a key associated with a requested security level. The external authenticate process will be described in more detail below with reference to FIG. 47.

At sub-step 2727, if the the INS field of the command received by the CPU 275 of the CPU card 100B is 0x88, representing an INTERNAL AUTHENTICATE command then the process proceeds to sub-step 2729. Otherwise, the process of step 2411 proceeds to sub-step 2725. At sub-step 2729 an internal authenticate process is executed by the CPU 275. The internal authenticate process will be described in more detail below with reference to FIG. 51.

At sub-step 2725 a bad instruction error identifier is returned by the user interface card resident application executing within the CPU 275 and the process of step 2411 concludes.

2.5.5 Unwrap Envelope Process

Figure 50:
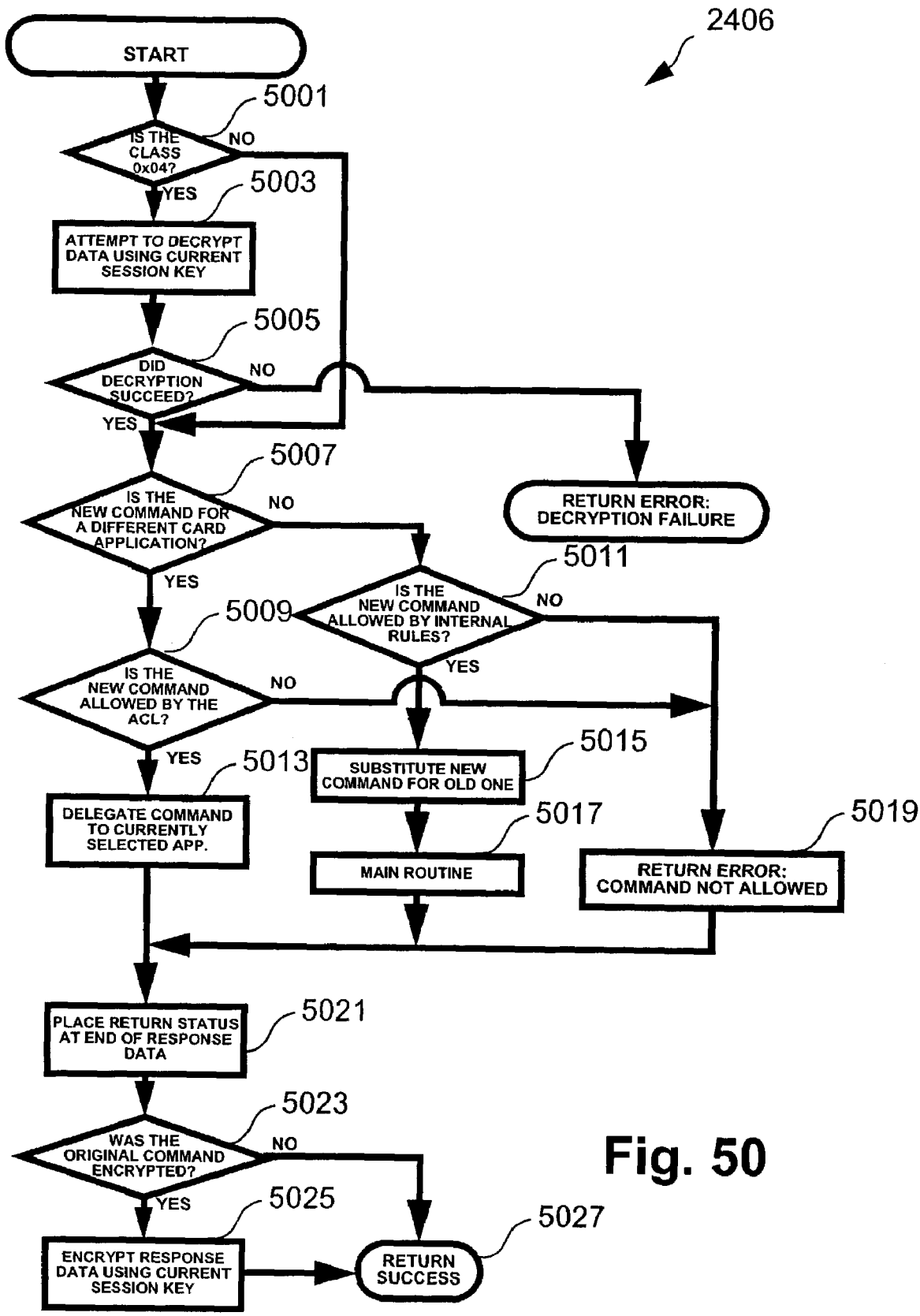
FIG. 50 is a flow diagram showing an unwrap envelope process.

FIG. 50 is a flow diagram showing the unwrap envelope process as executed at step 2406. The process of step 2406 is preferably implemented as part of the user interface card resident application program executing within the CPU 275 of the microprocessor 259 and being stored in the storage means 276.

As described above, the process of step 2406 is responsible for processing ENVELOPE commands received from the CPU 1045 of the reader 300. The ENVELOPE command contains within its command data another command, which is assumed to have originated from a remote application executing on remote server, such as the server 652. The unwrap envelope process must first decrypt the command, if the command has indeed been encrypted, and then determine whether the remote application is allowed to invoke the command. If the command can be invoked by the remote application, then the command is invoked, and the result is returned to the remote application, possibly in an encrypted form.

The process of step 2406 begins at sub-step 5001, where if the user interface card resident application executing on the CPU 275 determines that the class byte of the command is '0x04' then the process proceeds to sub-step 5003. Otherwise, the process proceeds directly to sub-step 5007. At sub-step 5003, the CPU 275 attempts to decrypt command data contained in the ENVELOPE command, using the current session key. At the next sub-step 5005, if the decryption was successful then the process of step 2406 proceeds to sub-step 5007. Otherwise, the user interface card resident application returns a decryption failure error to the CPU 1045 of the reader 300 and the process concludes.

At sub-step 5007, if the command contained within the ENVELOPE command is for a an application resident on the card 100B other than the user interface card resident application then the process of step 2406 proceeds to sub-step 5009. Otherwise, the process proceeds to sub-step 5011. At sub-step 5009, if the command is allowed by an access control list, stored in the memory 276 of the card 100B, then the process proceeds to sub-step 5013. Otherwise the process of step 2406 proceeds to sub-step 5019, where the user interface card resident application returns a command not allowed error to the CPU 1045 of the reader 300. At sub-step 5013, the user interface card resident application delegates the command to the currently selected application.

At sub-step 5011, if the command contained within the ENVELOPE command is allowed by internal rules, as defined in Table 57 above, then the process of step 2406 proceeds to sub-step 5015. Otherwise the process proceeds to sub-step 5019. At sub-step 5015, the command contained within the ENVELOPE command (i.e., the new command) is substituted for the current ENVELOPE command (i.e., the current ENVELOPE command is replaced by the new command which is defined within the current ENVELOPE command). Then at the next sub-step 5017, the process of step 2406 invokes the main process 2400 again recursively, using the new command as opposed to the ENVELOPE command received at step 5001.

The process of step 2406 continues at sub-step 5021 where the user interface card resident application places the return status (i.e., the code returned by the new command) at the end of any data returned to the remote application. At the next sub-step 5023, if the original envelope command was encrypted then the process of step 2406 proceeds to sub-step 5025. Otherwise the process proceeds to sub-step 5027, where the user interface card resident application returns a success message to the CPU 1045 of the reader 300 and the process of step 2406 concludes. At sub-step 5025, any response data is encrypted using the current session key and the process proceeds to sub-step 5027.

2.5.6 Internal Authenticate Process

Figure 51:
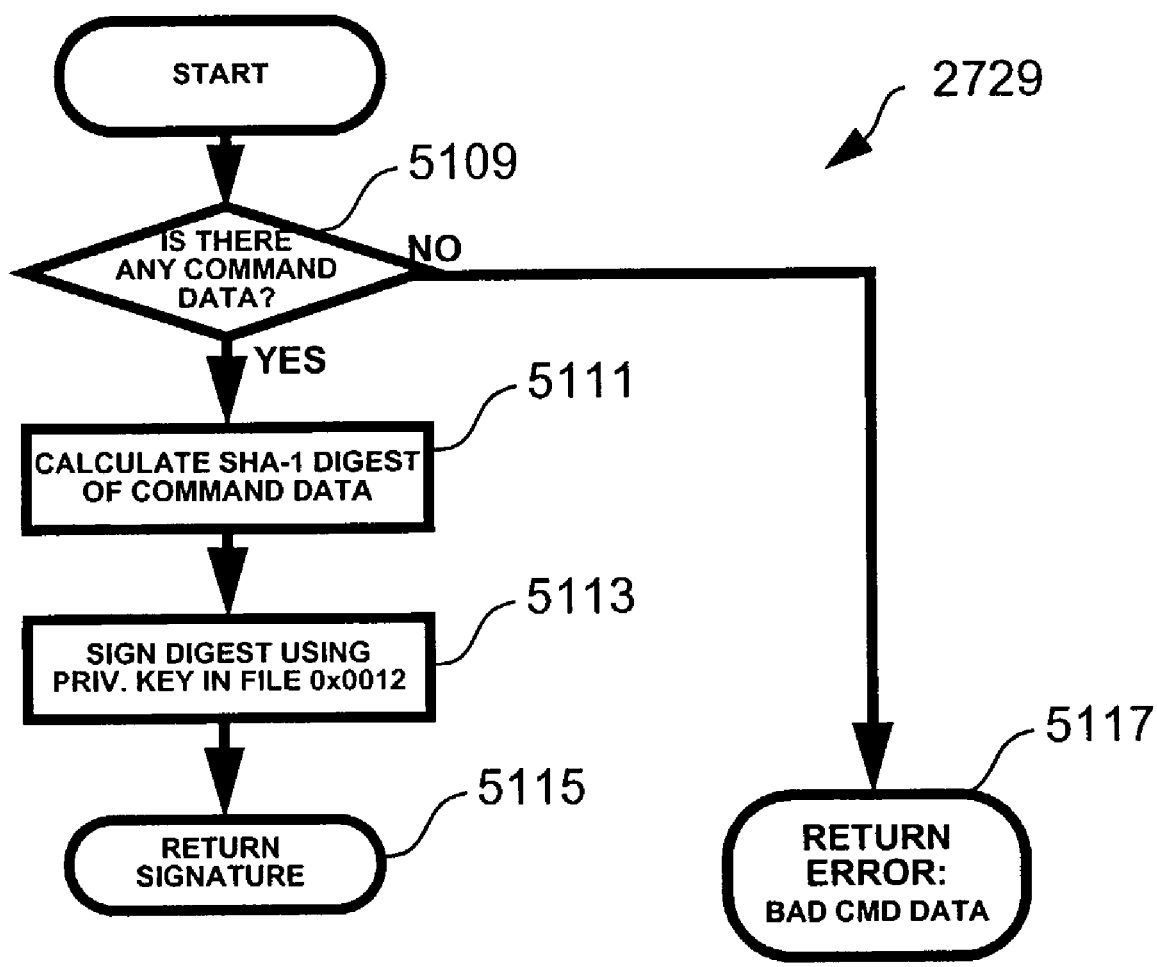
FIG. 51 is a flow diagram showing an internal authenticate process.

FIG. 51 is a flow diagram showing the internal authenticate process as executed at step 2729 in response to an INTERNAL AUTHENTICATE command being received by the user interface card resident application executing within the CPU 275. The process of step 2729 is preferably implemented as part of the user interface card resident application program executing within the CPU 275 of the microprocessor 259 and being stored in the storage means 276.

The process of step 2729 begins at sub-step 5101 where if the command received by the user interface card resident application contains any command data then the process proceeds to sub-step 5111. Otherwise, the process of step 2729 proceeds to sub-step 5117 where the user interface card resident application returns a bad command data error to the CPU 1045 of the reader 300. At sub-step 5111, the user interface card resident application calculates the SHA-1 digest of the command data. At the next sub-step 5113, the user interface card resident application signs the SHA-1 digest determined at sub-step 5111, using the private key of file 0x0012 (i.e., the Card Private Key file), which is stored in the memory 276 of the card 100B. The process of step 2729 concludes at the next sub-step 5115, where the user interface card resident application returns the signature to the CPU 1045 of the reader 300 and the process concludes.

2.5.7 Create Channel Process

Figure 52:
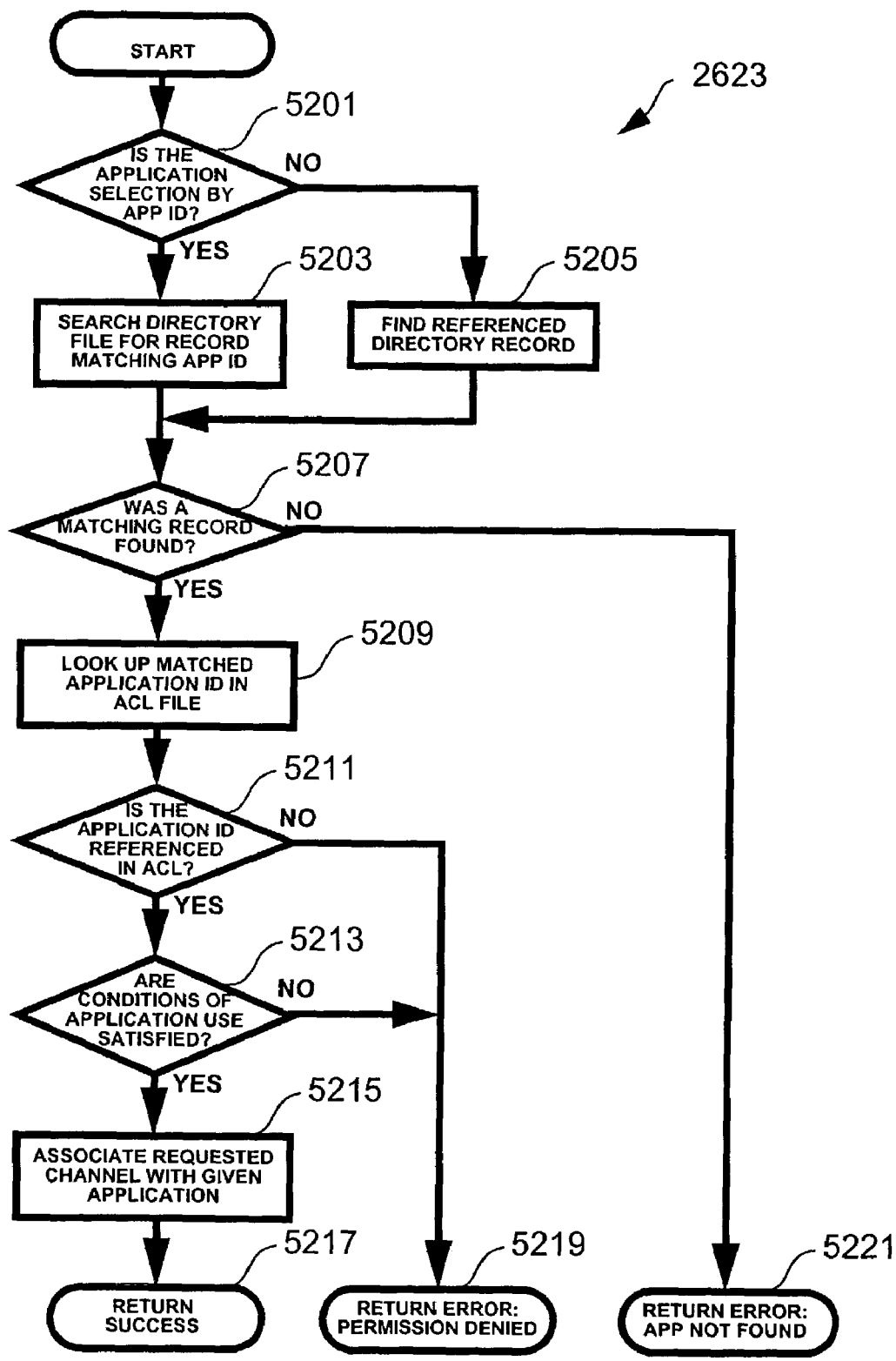
FIG. 52 is a flow diagram showing a create channel process.

FIG. 52 is a flow diagram showing the create channel process executed at sub-step 2623 of the process of sub-step 2407. The process of sub-step 2623 is executed when a CREATE CHANNEL application protocol data unit is received by the user interface resident application. A separate channel between a remote device, such as the server 652, and an application resident on the card 100B other than the user interface card resident application, can be created using the CREATE CHANNEL command. As described above, the process of step 2623 determines whether the application referenced in the CREATE CHANNEL command exists, and, if so, whether the conditions to access the referenced application have been satisfied, before associating the application with a channel.

The process of step 2623 begins at sub-step 5201 where if the application selection is by application identifier, then the process proceeds to sub-step 5203. Otherwise, the process proceeds to sub-step 5205. At sub-step 5203, the CPU 275 searches the file directory of the CPU card 100B for a record which matches the application identifier received by the user interface card resident application with the CREATE CHANNEL command. At sub-step 5205, the CPU 275 finds the directory record referenced with the CREATE CHANNEL command.

The process of step 2623 continues at the next sub-step 5207, where if a matching directory record was found then the process proceeds to sub-step 5209. Otherwise, the process of step 2623 proceeds to sub-step 5221, where an application not found error is returned to the CPU 1045 of the reader 300 by the user interface card resident application. At the next sub-step 5209, the matched application identifier is looked-up in the access control list stored in the memory 276 of the CPU card 100B. If the application identifier is referenced in the access control list at the next sub-step 5211, then the process of step 2623 proceeds to sub-step 5213. Otherwise, the process proceeds to sub-step 5219, where a permission denied error is returned to the CPU 1045 of the reader 300 by the user interface card resident application.

The process of step 2623 continues at sub-step 5213, where if the conditions of use (e.g., PIN entry, secure messaging) for the referenced application are satisfied then the process proceeds to sub-step 5215. Otherwise, the process proceeds to sub-step 5219. At the next sub-step 5215, the requested channel is associated with the application referenced by the CREATE CHANNEL command. The process of sub-step 2623 concludes at the next sub-step 5217, where a success message is returned to the CPU 1045 of the reader 300 by the user interface card resident application.

2.5. Generate Session Key Process

Figure 53:
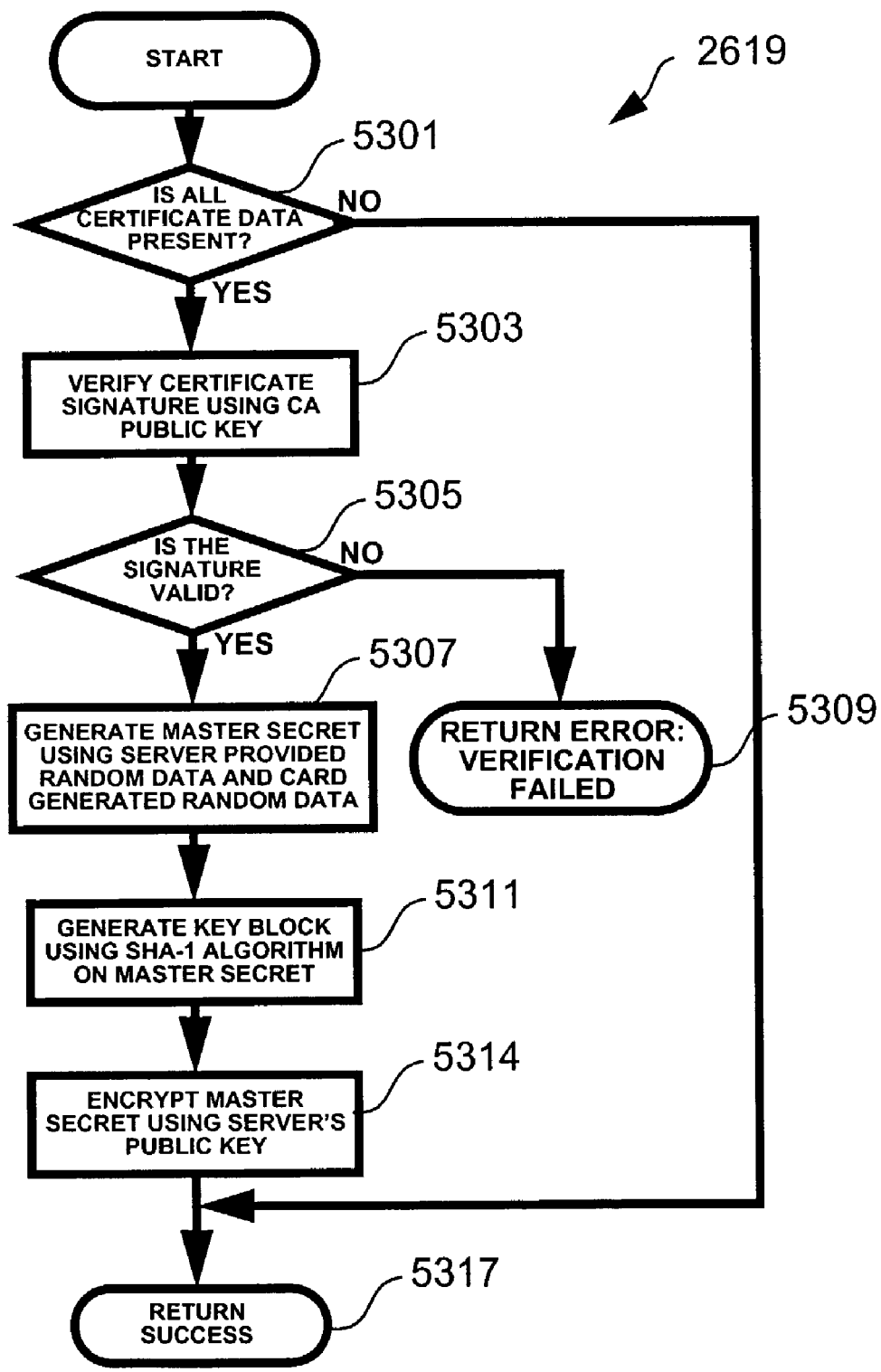
FIG. 53 is a flow diagram showing a generate session key process.

FIG. 53 is a flow diagram showing the generate session key process, as executed at step 2619 in response to a GENERATE SESSION KEY command being received by the user interface card resident application. The process of step 2619 initially determines whether all certificate data, contained in the GENERATE SESSION KEY command application protocol data unit, has been received by the user interface card resident application. If all certificate data has not been received then the process of step 2619 exits immediately in order to allow a subsequent series of GENERATE SESSION KEY application protocol data units to supply the remaining certificate data. If the session key generation is successful, a key block is generated by the CPU 275 of the card 100B. The key block contains keys for message encryption, authentication and an initial value used for cipher block chaining. The master secret of the key block is encrypted using the public key of the server 652, for example, as referenced from the certificate data, and returned to the server 652 which can calculate the key block itself.

The process of step 2619 begins at step 5301 where if all certificate data has been received from the server 652, then the process of step 2619 proceeds to step 5303. Otherwise, the process of step 2619 proceeds directly to step 5317, where a success message is returned by the user interface card resident application to the CPU 1045 of the reader 300. At the next step 5303, the certificate signature is verified using the public key of the Certificate Authority (CA) referenced within the certificate. If the signature is valid at step 5305, then the process of step 2619 proceeds to step 5307. Otherwise, the process proceeds to step 5309, where the user interface card resident application returns a verification failed error. At the next step 5307, a master secret is generated using random data provided by the server 652 and random data generated by the card 100B. Then at the next sub-step 5311, the key block is generated using the SHA-1 algorithm on the master secret. The process then proceeds to the next step 5314, where the master secret is encrypted using the public key associated with the server 652, and the process of step 2619 proceeds to step 5317.

2.6 Process Coordinate Process

Figure 28:
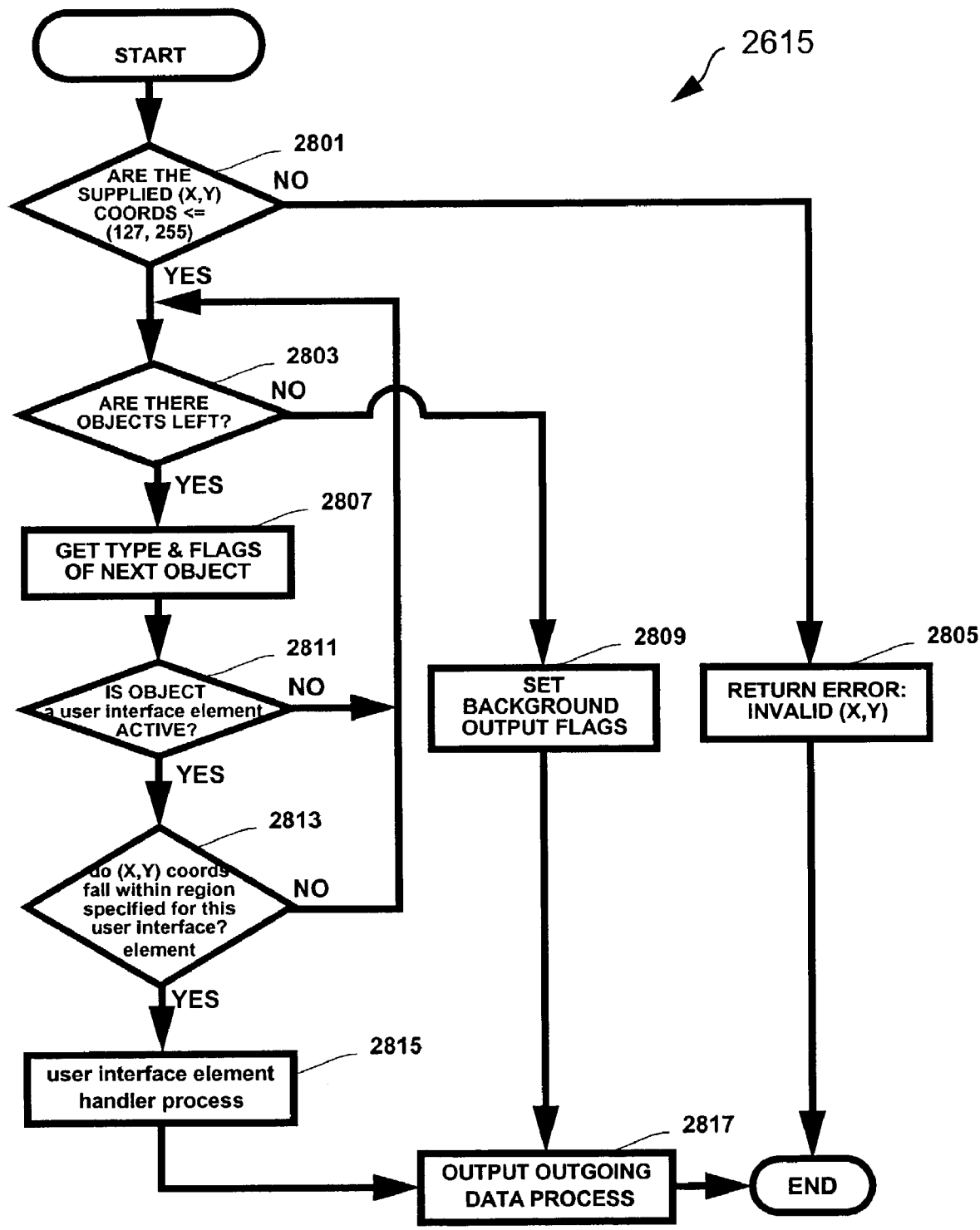
FIG. 28 is a flow diagram showing a process coordinate process.

FIG. 28 is a flow diagram showing a process coordinate process executed at sub-step 2615 of the process of FIG. 26. The process coordinate process is executed by the CPU 275 upon a PROCESS COORD command being received by the user interface card resident application executing within the CPU 275, in response to the selection of a user interface element 154 by a user. The process coordinate process searches the data stored in the storage means 276 of the CPU card 100B to determine a user interface element object corresponding to (X,Y) coordinates provided by the reader 300 in response to a touch on the touch panel 308. The coordinates of the touch are contained in the PROCESS COORD command. The process of sub-step 2615 is preferably implemented as part of the user interface card resident application program executing within the CPU 275 of the microprocessor 259 and being stored in the storage means 276. The process of sub-step 2615 begins at sub-step 2801 where if the (X,Y) coordinates received from the CPU 1045 of the reader 300 are not within the range (127, 255), then the process proceeds to sub-step 2805. Otherwise, the process of sub-step 2615 proceeds to sub-step 2803 where the CPU 275 searches the user interface element objects stored within the storage means 276. If there are no user interface element objects left to search at sub-step 2803 then the process of sub-step 2615 proceeds to sub-step 2809. Otherwise the process proceeds to sub-step 2807 where the flags and type of the next object searched, are determined by examining the fields of the object structure associated with the object. If the object is a user interface element object and is active then the process of sub-step 2615 proceeds to sub-step 2813. Otherwise, the process returns to sub-step 2803. At sub-step 2813, if the (X,Y) coordinates supplied by the CPU 1045 of the reader 300 as part of the PROCESS COORD are within the region specified for the particular user interface element object then the process proceeds to sub-step 2815. Otherwise, the process of sub-step 2615 returns to sub-step 2803. At sub-step 2815 a user interface handler process is executed by the CPU 275 to determine the data associated with the particular user interface element 154 selected by the user. The user interface element handler process will be described in more detail below with reference to FIG. 29.

The process of sub-step 2615 continues at the next sub-step 2817 where an output object data process is executed by the CPU 275. The output object data process is executed when the CPU 275 has to output any data to the reader 300 and will be described in more detail below with reference to FIG. 39.

At sub-step 2809, the output flags associated with a default user interface element are set and the process proceeds to sub-step 2817.

The process of sub-step 2615 concludes at sub-step 2805 where an invalid (X,Y) error is returned to the CPU 1045 of the reader 300 by the user interface card resident application executing within the CPU 275.

2.6.1 User Interface Element Handler Process

Figure 29:
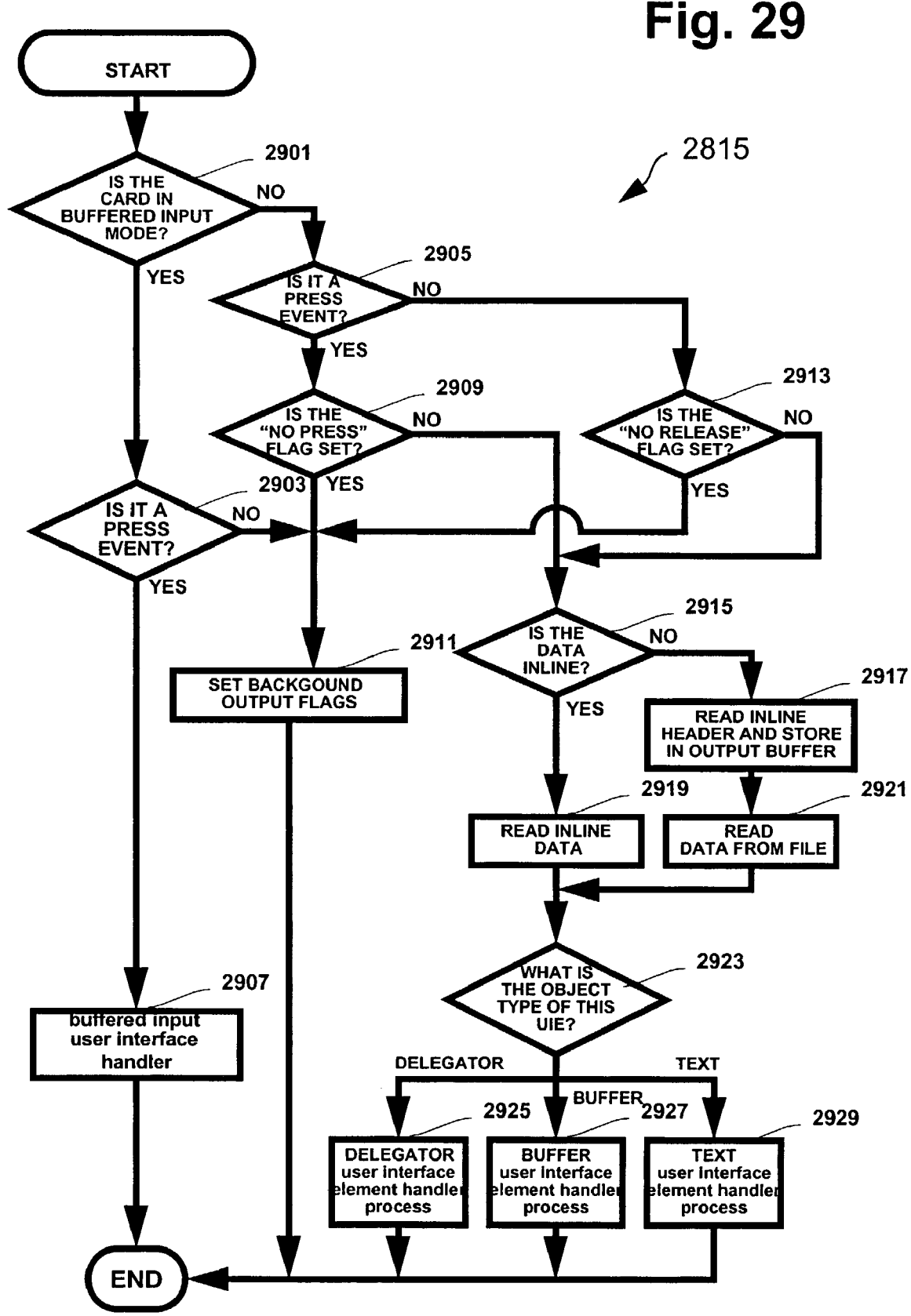
FIG. 29 is a flow diagram showing a user interface element handler process.

The user interface element handler process of FIG. 29 is executed at sub-step 2815 of the process coordinate process, in order to examine a user interface element object associated with a selected user interface element 154. The process of sub-step 2815 determines what action the CPU 275 should take in response to the (X,Y) coordinates received by the user interface card resident application at step 2801. The process of sub-step 2815 is preferably implemented as part of the user interface card resident application program executing within the CPU 275 of the microprocessor 259 and being stored in the storage means 276. The process of sub-step in 2815 begins at sub-step 2901 where if the CPU card 100B is in buffered input mode then the process proceeds to sub-step 2903. Otherwise, the process of sub-step 2815 proceeds to sub-step 2905. At sub-step 2903 if the input event is a press event, then the process of sub-step 2815 proceeds to sub-step 2907 where a buffered input user interface element handler process is executed by the CPU 275. Otherwise, the process of sub-step 2815 proceeds to sub-step 2911. The buffered input user interface element handler process is executed to append a user interface element selection to an input buffer and will be described in more detail below with reference to FIG. 30.

At sub-step 2905, if the input event is a press event (i.e. associated with a user interface element 154 selection), then the process of sub-step 2815 proceeds to sub-step 2909. Otherwise, the process proceeds to sub-step 2913. At sub-step 2909, if a "no press" flag associated with the received command is set, then the process proceeds to sub-step 2911 where the output flags associated with a default user interface element are set and the process of sub-step 2815 concludes. At sub-step 2913 if a "no release" flag is set then the process proceeds to sub-step 2911. Otherwise, the process of sub-step 2815 proceeds to sub-step 2915.

Figure 36:
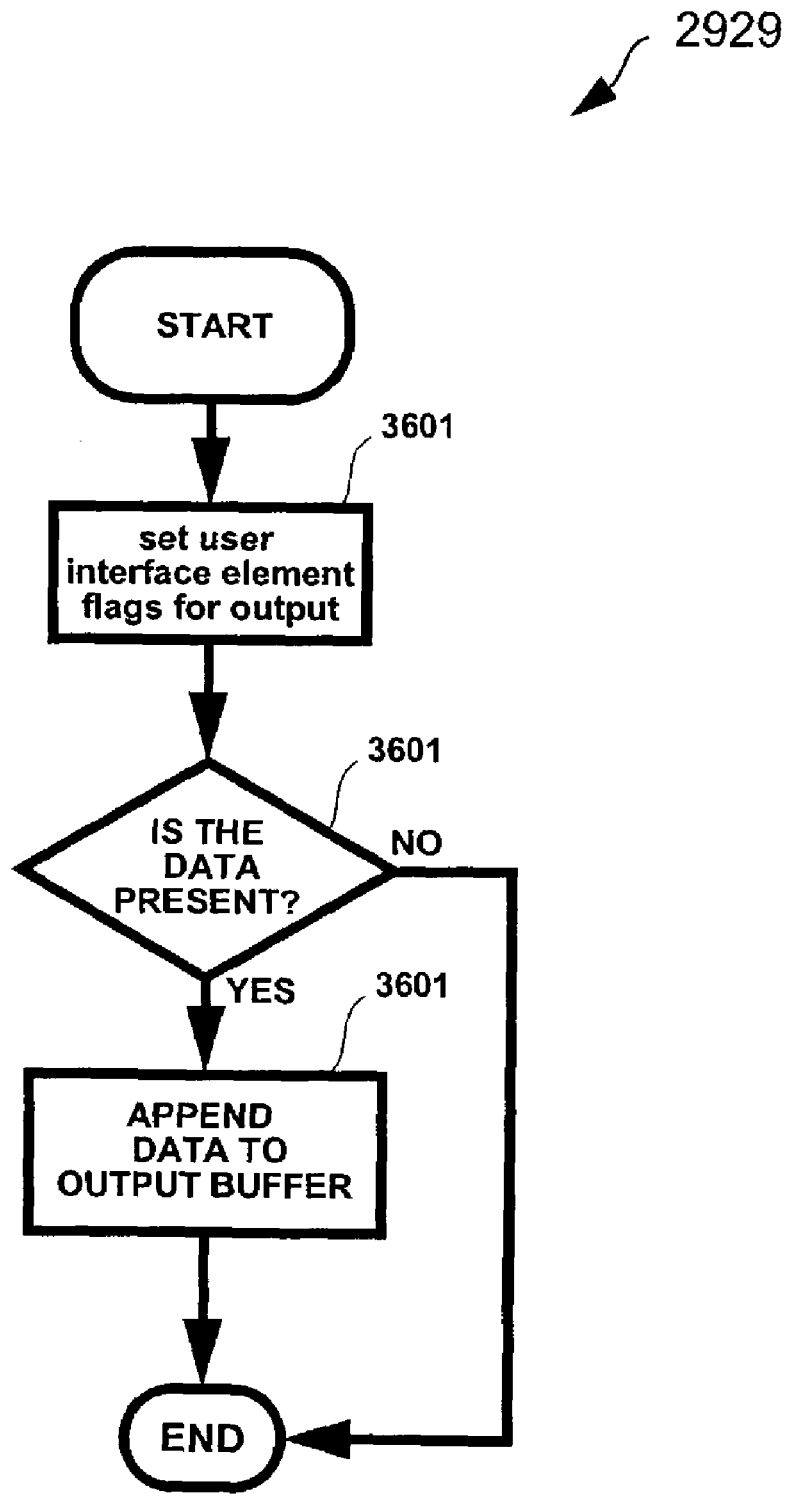
FIG. 36 is a flow diagram showing a standard user interface element process.
Figure 37:
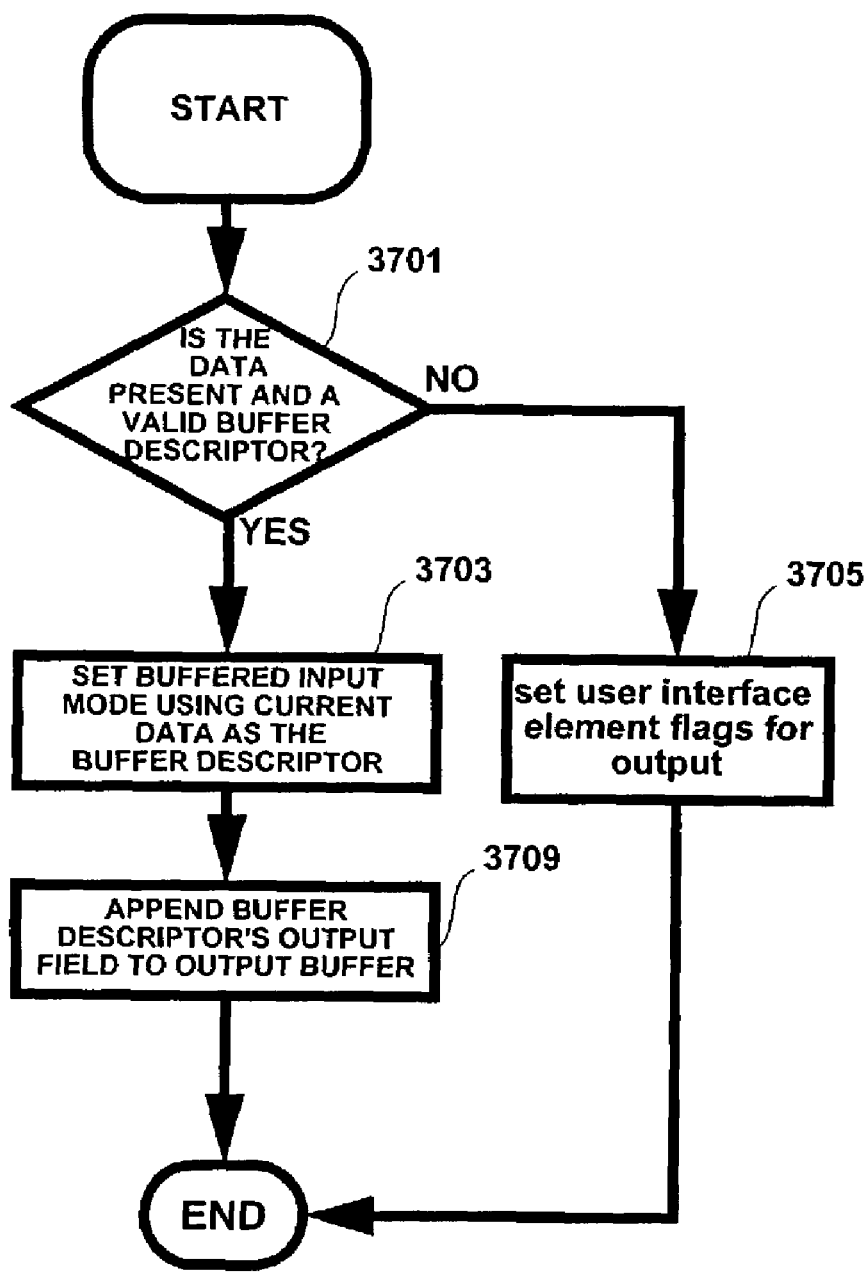
FIG. 37 is a flow diagram showing a buffered user interface element process.
Figure 38:
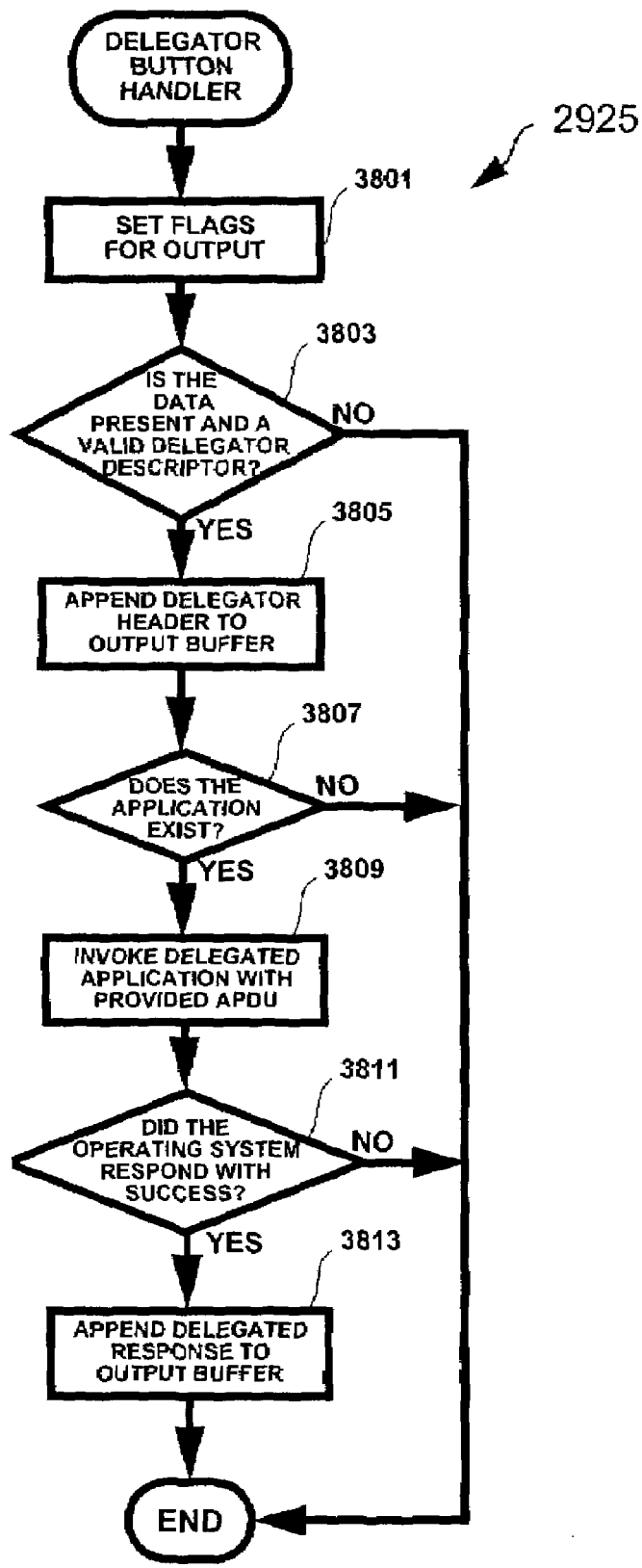
FIG. 38 is a flow diagram showing a delegator user interface element process.

The process of sub-step 2815 continues at sub-step 2915 where if the data associated with the selected user interface element 154 is inline data (as described above) then the process of step 2815 proceeds to sub-step 2919. Otherwise, the data associated with the selected user interface element 154 is file data and the process proceeds to sub-step 2917. At sub-step 2919, the inline data associated with the selected user interface element 154 is read by the CPU 275. At sub-step 2917, an inline header associated with the data is stored in an output buffer. The process of sub-step 2815 continues at sub-step 2921 where the data associated with the selected user interface element 154 is read from an associated file stored in the storage means 276. At the next sub-step 2923, the user interface element object type associated with the selected user interface element 154 is determined. If the user interface element object is a delegator object then the process of sub-step 2815 proceeds to sub-step 2925 where a delegator user interface element handler process is executed by the CPU 275. The delegator user interface element handler process will be described in more detail below with reference to FIG. 38. Alternatively, if the object associated with the selected user interface element is a buffer user interface element object, then the process of sub-step 2815 proceeds to sub-step 2927. At sub-step 2927, a buffer user interface element handler process, which will be explained below in more detail with reference to FIG. 37, is executed by the CPU 275. Still further, if the object associated with the selected user interface element 154 is a text user interface element object, then the process of sub-step 2815 proceeds to sub-step 2929. At sub-step 2929, a text user interface element handler process, which will be explained below with reference to FIG. 36, is executed, by the CPU 275, on the object data associated with the selected user interface element 154. The process of step 2815 concludes after the user interface element handler process of sub-steps 2925, 2927 and 2929 have been executed by the CPU 275.

2.6.2 Buffered Input User Interface Element Handler

Figure 30:
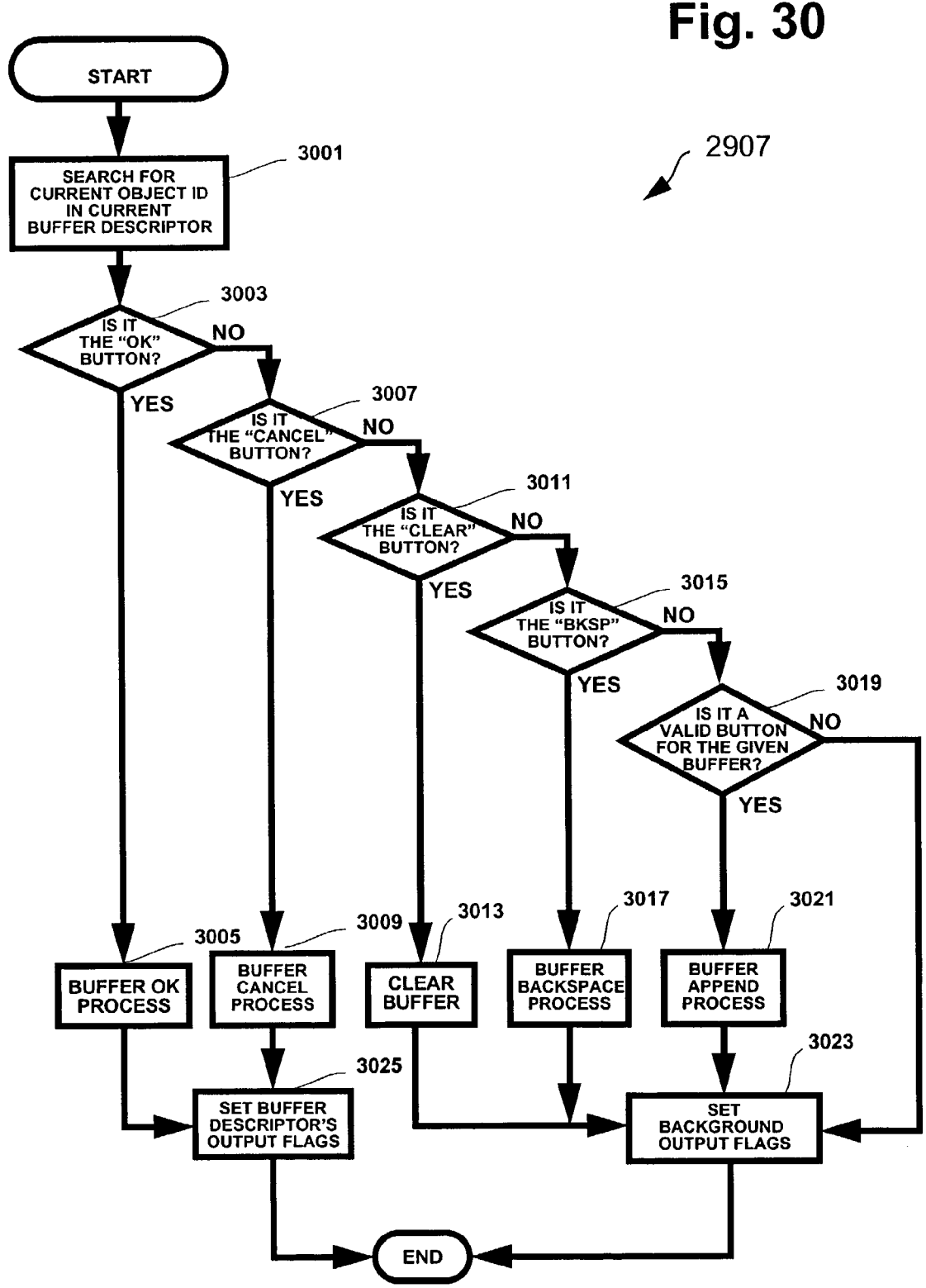
FIG. 30 is a flow diagram showing a buffer input user interface element handler process.

FIG. 30 is a flow diagram showing the buffered input user interface element handler process executed at sub-step 2907 of the process of FIG. 29. The process of sub-step 2907 is executed upon the selection of a user interface element 154 when the CPU card 100B is in buffered input mode, in order to append the object data associated with the selected user interface element to an input buffer. The process of sub-step 2907 is preferably implemented as part of the user interface card resident application program executing within the CPU 275 of the microprocessor 259 and being stored in the storage means 276. The process of sub-step 2907 begins at sub-step 3001, where a buffer descriptor associated with the current input buffer session is searched in order to determine if the buffer descriptor contains the object identifier of the user interface element corresponding to the(X,Y) coordinates, received at step 2801. At the next sub-step 3003, if the buffer descriptor designates the selected user interface element as an "OK button" (i.e. having the function described above) then the process of sub-step 2907 proceeds to sub-step 3005. Otherwise, the process proceeds to sub-step 3007. At sub-step 3005, a buffer OK process is executed by the CPU 275, which will be explained in more detail below with reference to FIG. 31. At sub-step 3007, if the buffer descriptor designates the selected user interface element as a "cancel button" (i.e. having the function described above) then the process of sub-step 2907 proceeds to sub-step 3009. Otherwise, the process proceeds to sub-step 3011. At sub-step 3009 a buffer cancel process is executed by the CPU 275, which will be explained in more detail below with reference to FIG. 33.

The process of sub-step 2907 continues at sub-step 3011 where if the buffer descriptor designates the selected user interface element as a "clear button" (i.e. having the function described above) then the process proceeds to sub-step 3013. Otherwise the process of sub-step 2907 proceeds to sub-step 3015. At sub-step 3013 the input buffer is cleared by the CPU 275. If the buffer descriptor designates the selected user interface element as a "backspace" button (i.e. having the function described above) at sub-step 3015 then the process proceeds to sub-step 3017 where a buffer backspace process is executed by the CPU 275. The buffer backspace process will be explained in more detail below with reference to FIG. 34. If the buffer descriptor does not designate the selected user interface element as a "backspace" button at sub-step 3015 then the process proceeds to sub-step 3019. At sub-step 3019, if the selected user interface element is valid for the given input buffer then the process of sub-step 2907 proceeds to sub-step 3021. Otherwise, the process proceeds to sub-step 3023 where the output flags associated with the default user interface element are set and the process of sub-step 2907 concludes. A buffer append process is executed by the CPU 275 at sub-step 3021, which will be explained in more detail below with reference to FIG. 35.

Following the buffer OK and buffer cancel process executed at sub-steps 3005 and 3009 respectively, the process of sub-step 2907 proceeds to sub-step 3025 where the output flags associated with the buffer descriptor are set and the process concludes.

2.6.3 Buffer OK Process

Figure 31:
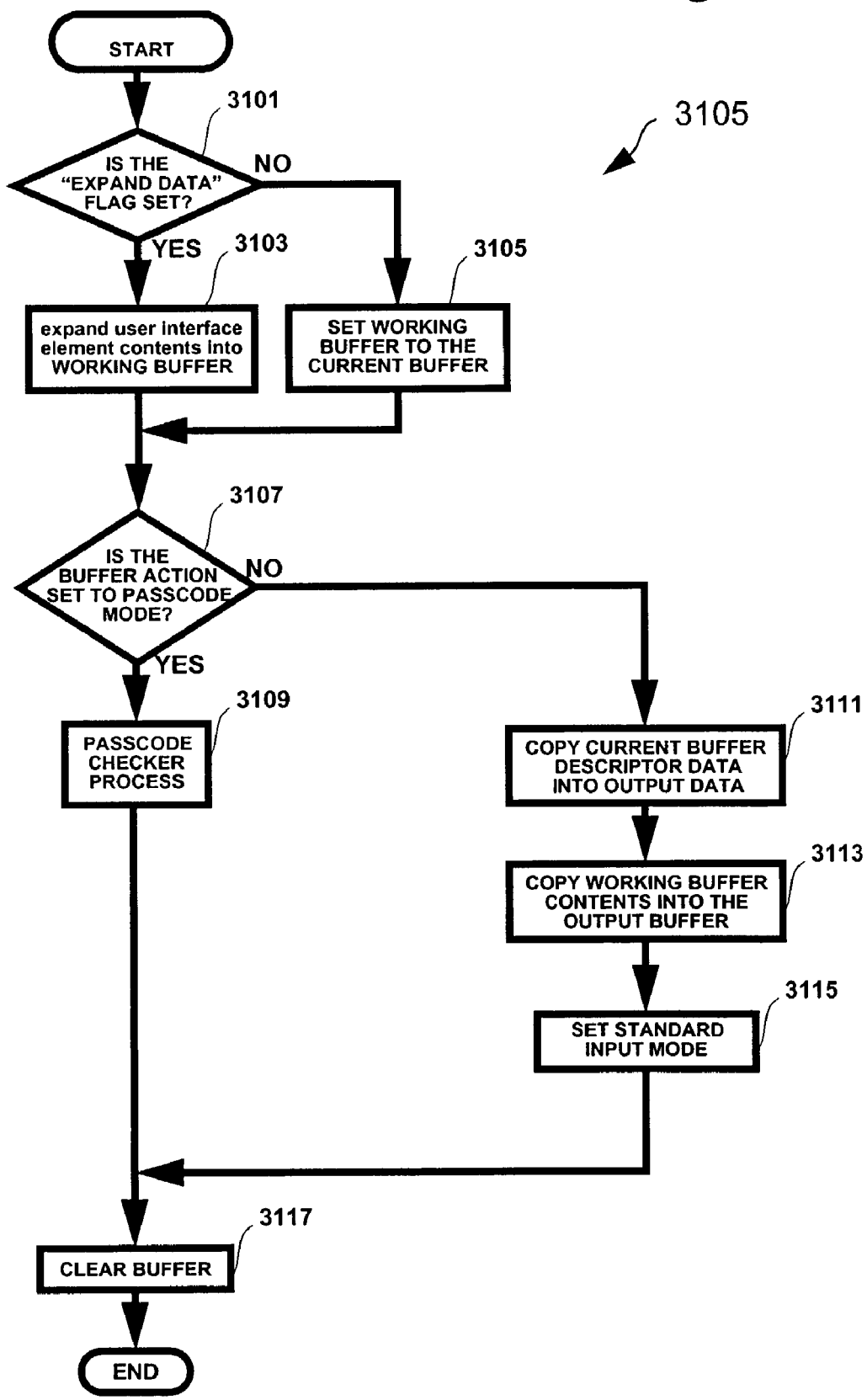
FIG. 31 is a flow diagram showing a buffer OK process.

The buffer OK process of sub-step 3005, as seen in FIG. 31, is executed by the CPU 275, when the CPU card 100B is in buffered input mode and a user interface element configured as an "OK button" (i.e. user interface element 162) has been selected by a user at step 3003. The process of sub-step 3005 is preferably implemented as part of the user interface card resident application program executing within the CPU 275 of the microprocessor 259 and being stored in the storage means 276. The process of sub-step 3005, begins at sub-step 3101 where if an "expand data" flag of the buffer descriptor associated with the current input buffer is set, then the process proceeds to sub-step 3103. Otherwise, the process proceeds to sub-step 3105. At sub-step 3103 the data of the user interface element object associated with the selected user interface element is expanded into a working buffer. At sub-step 3105, the working buffer is set as the current input buffer.

Figure 32:
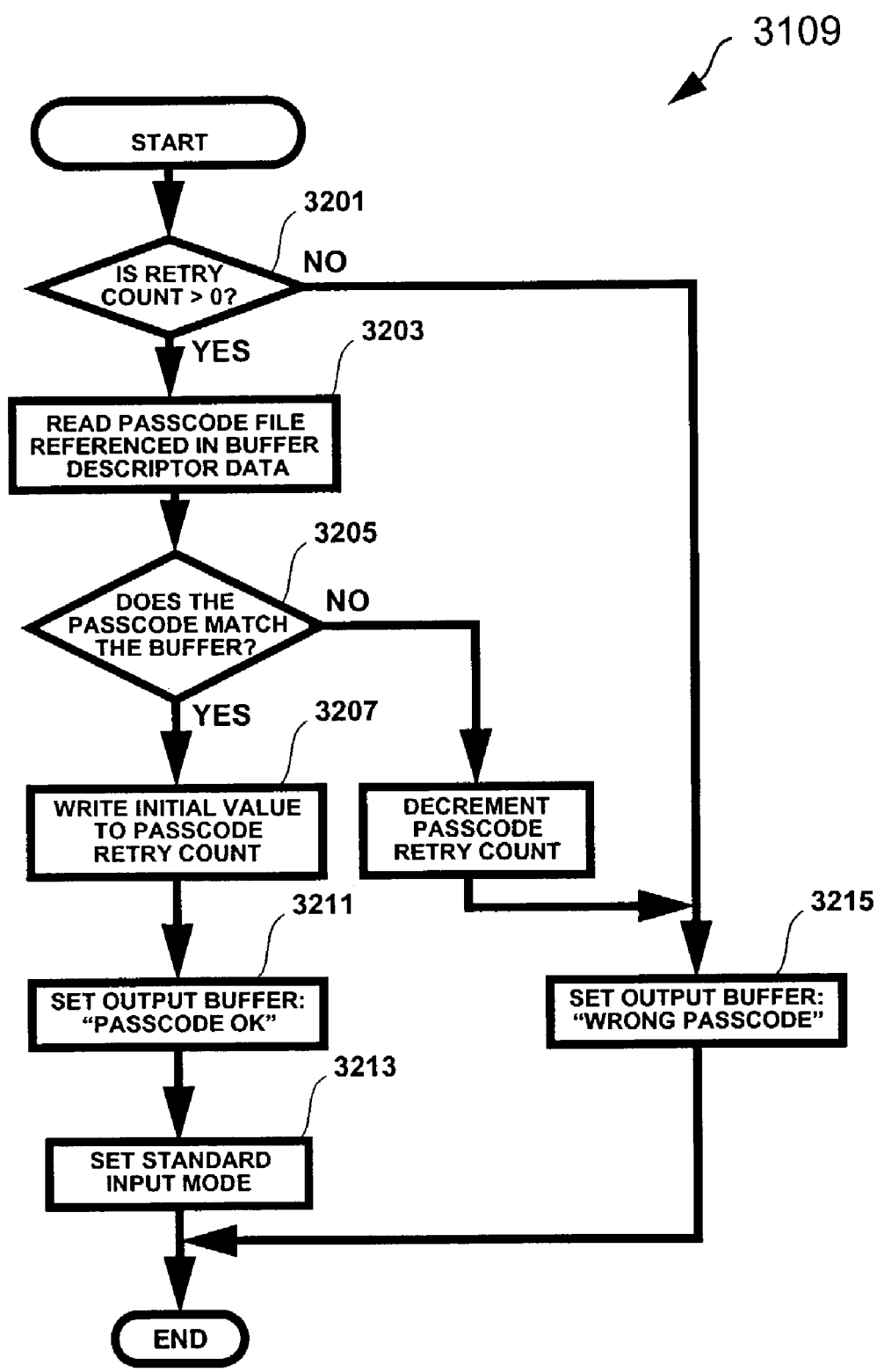
FIG. 32 is a flow diagram showing a pass-code checker process.

The process of sub-step 3005 continues at the next sub-step 3107 where if the buffer action field of the buffer descriptor is set to pass-code mode, then the process proceeds to sub-step 3109. Otherwise, the process proceeds to sub-step 3111. At sub-step 3109 a pass-code checker process is executed by the CPU 275 to determine whether there are valid pass-code entry attempts remaining and if so, whether the entered pass-code stored in the input buffer matches a predetermined pass-code stored in the storage means 276 of the CPU card 100B. The pass-code checker process will be explained in more detail below with reference to FIG. 32. At sub-step 3111, the data in the data field of the buffer descriptor is copied into an output data. The process of sub-step 3005 continues at the next sub-step 3113 where the contents of the working buffer are copied into the output buffer. At the next sub-step 3115, the CPU card 100B is set to standard input mode. The process of sub-step 3005 concludes at the next sub-step 3117 where the input buffer is cleared.

2.6.4 Pass-code Checker Process

The pass-code checker process executed at sub-step 3109 of the process of FIG. 31, is invoked when user interface card resident application executing on CPU 275 of the CPU card 100B is in buffered pass-code input mode and the user interface element 162 is selected. The process of sub-step 3109 is preferably implemented as part of the user interface card resident application program executing within the CPU 275 of the microprocessor 259 and being stored in the storage means 276. As, seen in FIG. 32, the process of sub-step 3109 begins at sub-step 3201 where if a pass-code retry counter stored in the storage means 276 is greater than zero then the process proceeds to sub-step 3203. Otherwise, the process of sub-step 3109 proceeds to sub-step 3215 where the output buffer is set to "wrong password". At sub-step 3203, a pass-code file referenced in the buffer descriptor data is read by the CPU 275. If the pass-code matches the input buffer at the next sub-step 3205, then the process proceeds to sub-step 3207 where an initial value is written to the pass-code retry counter. Otherwise, the process of sub-step 3109 proceeds to sub-step 3209 where the pass-code retry counter is decremented and the process proceeds to sub-step 3215. After sub-step 3207 the process of sub-step 3109 proceeds to sub-step 3211 where the output buffer is set to "pass-code OK". The process of sub-step 3109 concludes at sub-step 3213 where the user interface card resident application executing on the CPU card 100B is set to standard input mode.

2.6.5 Buffer Cancel Process

Figure 33:
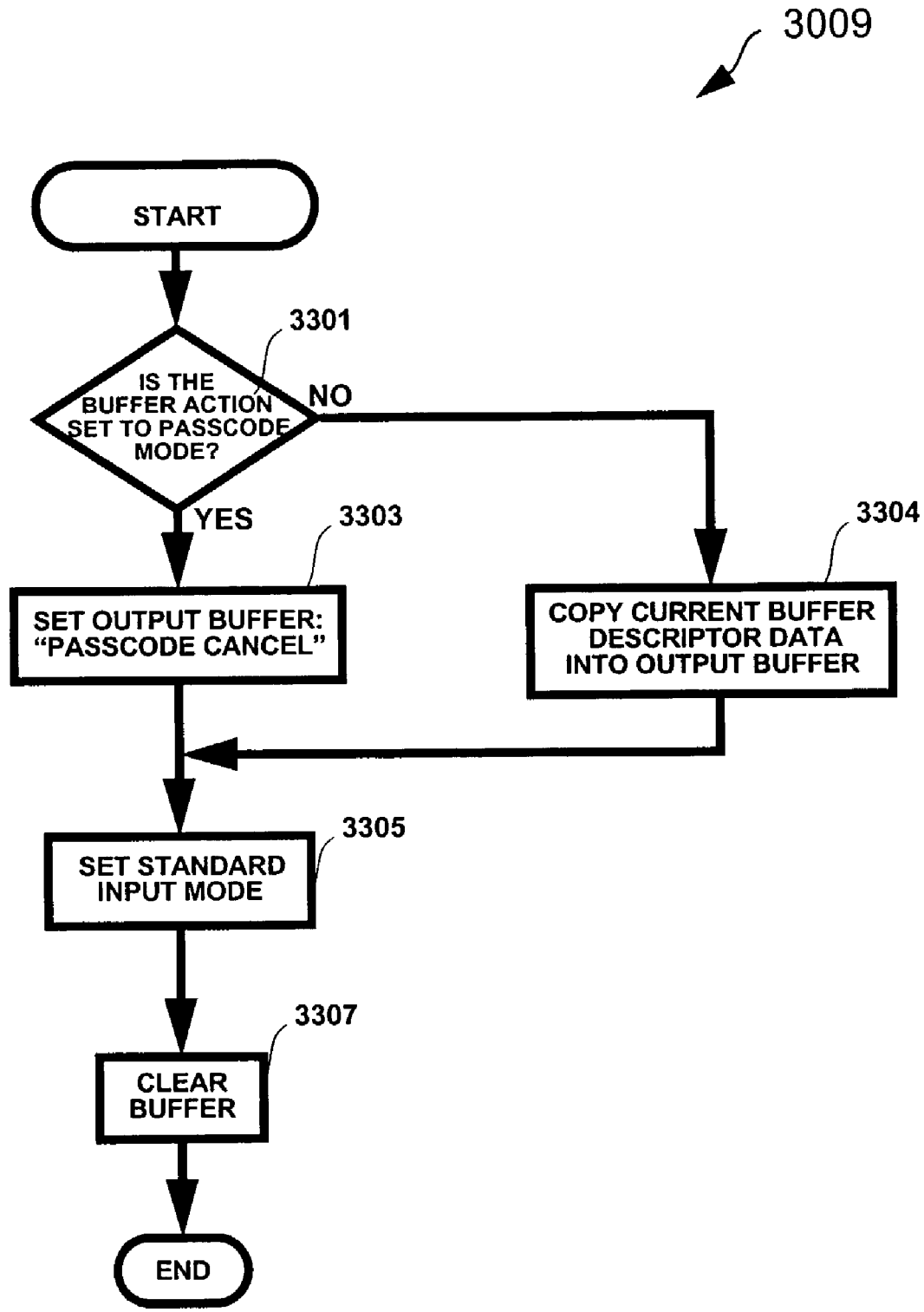
FIG. 33 is a flow diagram showing a buffer cancel process.

The buffer cancel process as executed at sub-step 3009 during the process of FIG. 30 is invoked when the CPU card 100B is in buffered input mode and the user interface element 164 configured as a "cancel button" is selected by a user. The buffer cancel process results in the cancellation of buffered input mode (e.g. pass-code entry). However, in an implementation where pass-code entry is mandatory, a "cancel button" is not defined in the active buffer descriptor. The process of sub-step 3009 is preferably implemented as part of the user interface card resident application program executing within the CPU 275 of the microprocessor 259 and being stored in the storage means 276. As seen in FIG. 33, the process of sub-step 3009 begins at sub-step 3301 where if the buffer action is set to pass-code mode as defined by the action field of the buffer descriptor for the input buffer, then the process proceeds to sub-step 3303. Otherwise, the process proceeds to sub-step 3304 where the data defined by the data field of the current buffer descriptor is copied into the output buffer. At sub-step 3303 the output buffer is set to "pass-code cancel". The process of sub-step 3009 continues at the next sub-step 3305 where the CPU card 100B is set to standard input mode. The process concludes at the next sub-step 3307 when the input buffer is cleared.

2.6.6 Buffer Backspace Process

Figure 34:
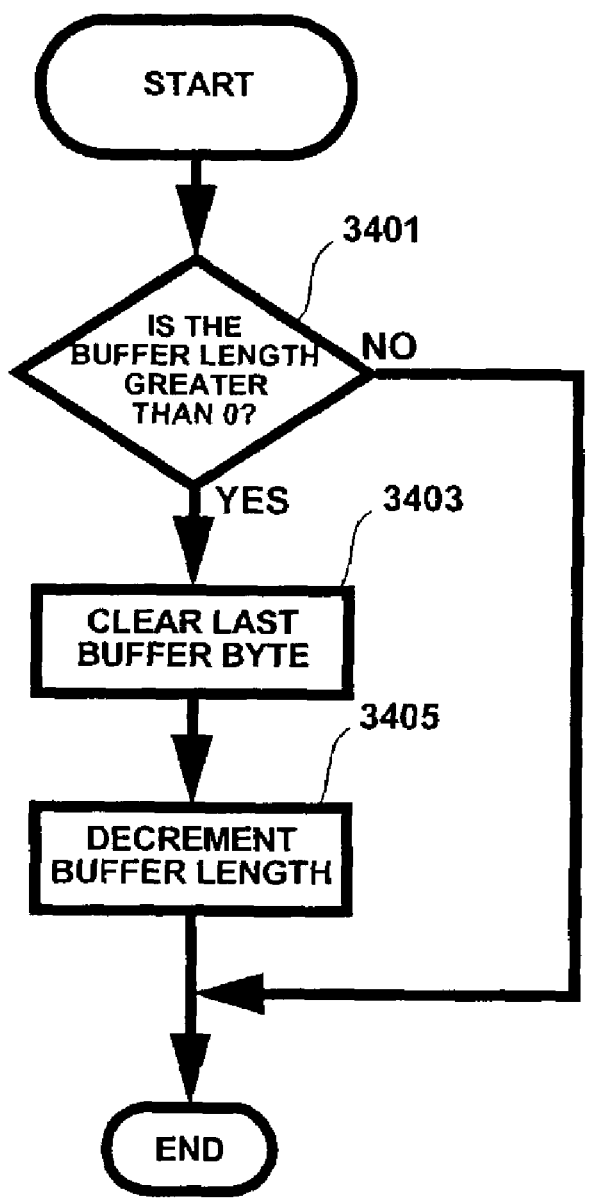
FIG. 34 is a flow diagram showing a buffer backspace process.

The buffer backspace process as executed at sub-step 3017 of FIG. 30 and is invoked when the CPU card 100B is in buffered input mode and a user interface element 154, which is configured as a backspace button (i.e. user interface element 168) is selected by a user. The process of sub-step 3017 is preferably implemented as part of the user interface card resident application program executing within the CPU 275 of the microprocessor 259 and being stored in the storage means 276. As seen in FIG. 34, the process of sub-step 3017 begins at sub-step 3401 where if the input buffer length is greater than zero, then the process of sub-step 3017 proceeds to sub-step 3403. Otherwise, the process of sub-step 3017 concludes. At sub-step 3403, the last byte in the input buffer is cleared. The process of sub-step 3017 concludes at the next sub-step 3405 where the input buffer length is decremented.

2.6.7 Buffer Append Process

Figure 35:
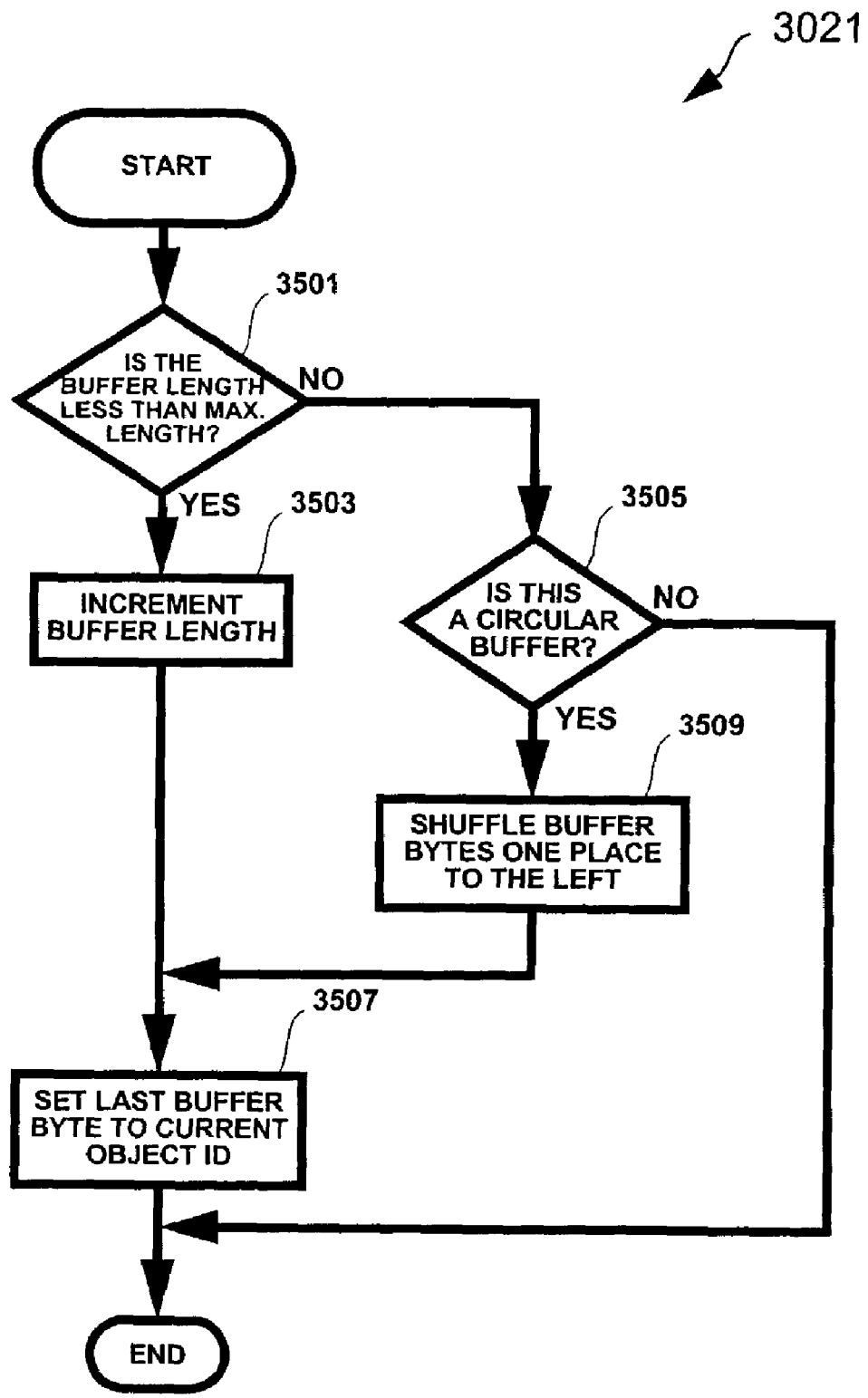
FIG. 35 is a flow diagram showing a buffer append process.

The buffer append process as executed at sub-step 3021 of FIG. 30 is invoked when the CPU card 100B is in buffered input mode and a valid user interface element 154 is selected by a user. The process of sub-step 3021 is preferably implemented as part of the user interface card resident application program executing within the CPU 275 of the microprocessor 259 and being stored in the storage means 276. As seen in FIG. 35, the process of sub-step 3021 begins at sub-step 3501 where if the length of the input buffer is less than a maximum length then the process proceeds to sub-step 3503. Otherwise, the process proceeds to sub-step 3505. At sub-step 3503 the length of the input buffer is incremented. The process of sub-step 3021 continues at the next sub-step 3507 where the last byte in the input buffer is set to the current object identifier corresponding to the data object associated with the selected user interface element. At sub-step 3505 if the input buffer is circular, then the process proceeds to sub-step 3509. Otherwise, the process concludes. At sub-step 3509 the bytes in the input buffer are moved one place to the left and process proceeds to sub-step 3507. The process of sub-step 3021 concludes after sub-step 3507.

2.6.8 Text User Interface Element Process

The text user interface element process of sub-step 2929, is executed to process a standard user interface element 154 having associated data which is stored in a corresponding user interface element object definition stored in the storage means 276. The process of sub-step 2929 is preferably implemented as part of the user interface card resident application program executing within the CPU 275 of the microprocessor 259 and being stored in the storage means 276. As seen in FIG. 36, the process begins at sub-step 3601 where the flags associated with the selected user interface element corresponding to the (X,Y) coordinates received at step 2801, are set for output by the CPU 275. At the next sub-step 3603 if data is associated with the selected user interface element 154, then the process proceeds to sub-step 3605. Otherwise, the process of sub-step 2929 concludes. At sub-step 3605 the data associated with the selected user interface element 154 is appended to the output buffer and the process of sub-step 2929 concludes.

2.6.9 Buffered User Interface Element Process

The buffered user interface element process, as executed at sub-step 2927 of FIG. 29, checks a buffer descriptor associated with the current input buffer session and enters the CPU card 100B into buffered input mode. The process of sub-step 2927 is preferably implemented as part of the user interface card resident application program executing within the CPU 275 of the microprocessor 259 and being stored in the storage means 276. As seen in FIG. 37, the process of sub-step 2927 begins at sub-step 3701 where the input buffer descriptor is examined by the CPU 275 to determine whether the buffer descriptor is valid and whether data is present in the data field of the buffer descriptor. If the result of sub-step 3701 is true, then the process of sub-step 2927 proceeds to sub-step 3703 where the user interface resident application executing on the CPU card 100B is set to buffered input mode using the data associated with the user interface element 154 selected at sub-step 2801. This data is used as the buffer descriptor. At the next sub-step 3707, the output field of the buffer descriptor is appended to the output buffer and the process of sub-step 2927 concludes. If the result of sub-step 3701 is false, then the flags associated with the selected user interface element 154 are set for output and the process of sub-step 2927 concludes.

2.6.10 Delegator User Interface Element Process

The delegator user interface element process of sub-step 2925 reads the object data associated with the user interface element 154 corresponding to the (X,Y) coordinates received by the user interface card resident application and determines an application identifier and an application protocol data unit to be sent to the application referenced by the identifier (i.e. the delegated application). The process of sub-step 2925 then invokes the identified application and returns the result of the application as the data associated with the selected user interface element. The 'Multos' delegate command can be used to invoke the identified application. Therefore, as discussed above, the CPU card 100B can be loaded with several different application programs, which can interact with one another. This allows card resident applications (e.g secure online payment applications), to provide additional functionality to the user interface card resident application described below, allowing data generated by these applications to be associated with user interface elements.

The process of sub-step 2925 is preferably implemented as part of the user interface card resident application program executing within the CPU 275 of the microprocessor 259 and being stored in the storage means 276. The process of sub-step 2925 begins at sub-step 3801 where the flags associated with the selected user interface element 154 are set for output. At the sub-step 3803 if the data associated with the selected user interface element is present and identifies a valid delegator descriptor then the process proceeds to sub-step 3805. Otherwise, the process of sub-step 2925 concludes. At the sub-step 3805 a delegator header associated with the delegate command is appended to the output buffer. The process continues at the next sub-step 3807, where if the application identified in the delegator header exists then the process continues at sub-step 3809. Otherwise, the process of sub-step 2925 concludes. At sub-step 3809 the identified application is invoked by the CPU 275 with a provided application protocol data unit. The process of sub-step 2925 continues at the next sub-step 3811 where if the operating system executing on the CPU card 100B responded with success then the process continues at sub-step 3813. Otherwise, the process of sub-step 2925 concludes. At sub-step 3813 the delegator response is appended to the output buffer and the process concludes.

2.6.11 Output Object Data Process

Figure 39:
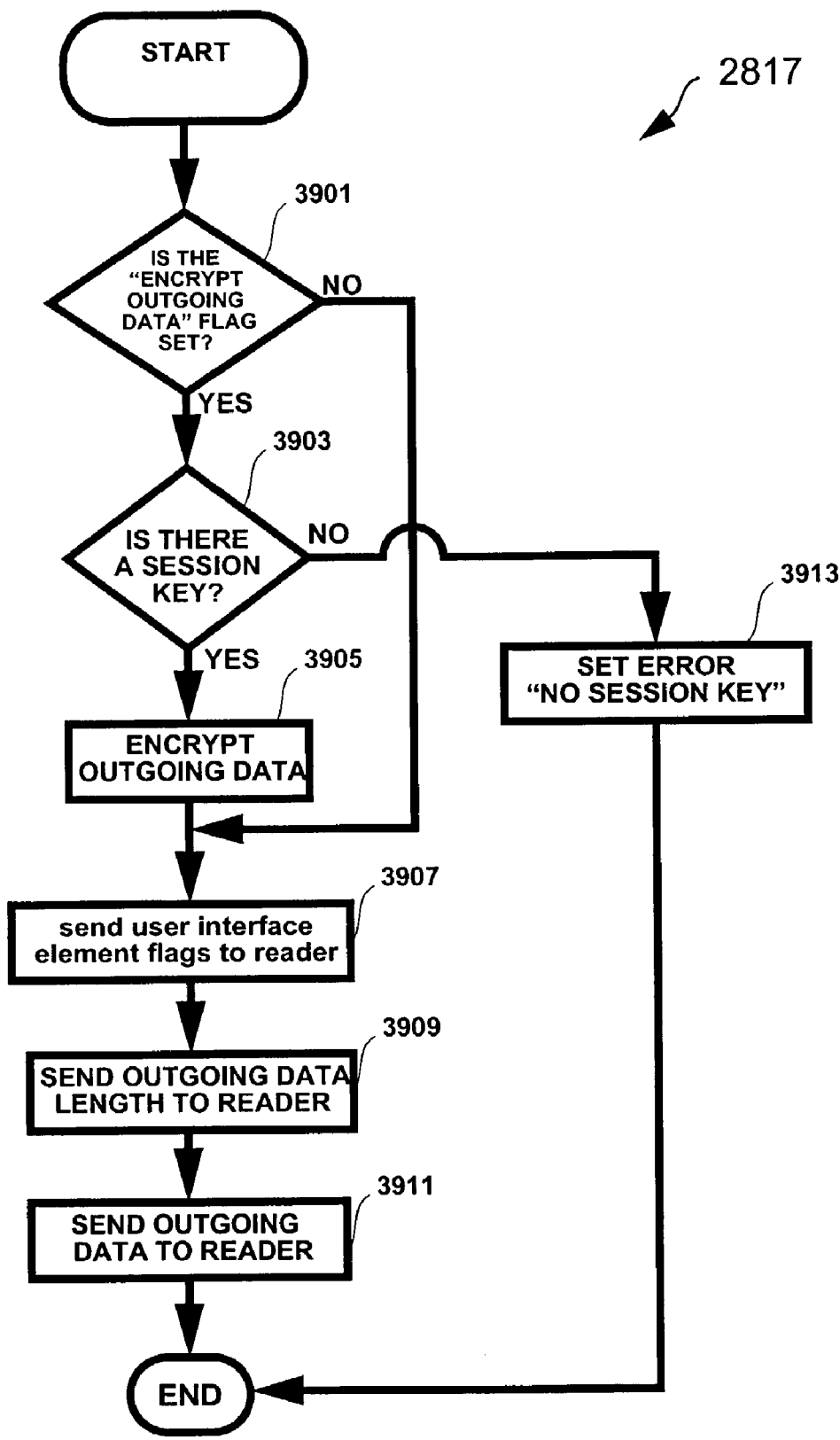
FIG. 39 is a flow diagram showing an output object data process executed when the card of FIG. 1(b) outputs data to the reader of FIG. 3.

FIG. 39 is a flow diagram showing an output object data process as executed at sub-step 2817 when the CPU 275 of the CPU card 100B outputs data to the reader 300. The process of sub-step 2817 is preferably implemented as part of the user interface card resident application program executing within the CPU 275 of the microprocessor 259 and being stored in the storage means 276. The process of sub-step 2817 begins at sub-step 3001 where if an "encrypt outgoing data" flag associated with the user interface element 154 selected at step 2801 is set then the process 3000 continues at sub-step 3003. Otherwise, the process 3000 proceeds directly to sub-step 3007. At sub-step 3003 if there is a session key stored in the storage means 276, as explained above with reference to Table 28, then the process of sub-step 2817 proceeds to sub-step 3005. Otherwise, the process of sub-step 2817 proceeds to sub-step 3913 where a "no session key" error identifier is returned by the CPU 275 and the process of sub-step 2817 concludes. At sub-step 3005 outgoing data is encrypted. The process of sub-step 2817 continues at the next sub-step 3007 where the flags associated with the selected user interface element are transmitted to the reader 300 via the data contacts 278. At the next sub-step 3009, the length of the outgoing data is sent to the CPU 1045 of the reader 300. The process of sub-step 2817 concludes at the next sub-step 3911 where the outgoing data is sent to the CPU 1045 of the reader 300.

2.6.12 Save State Process

Figure 40:
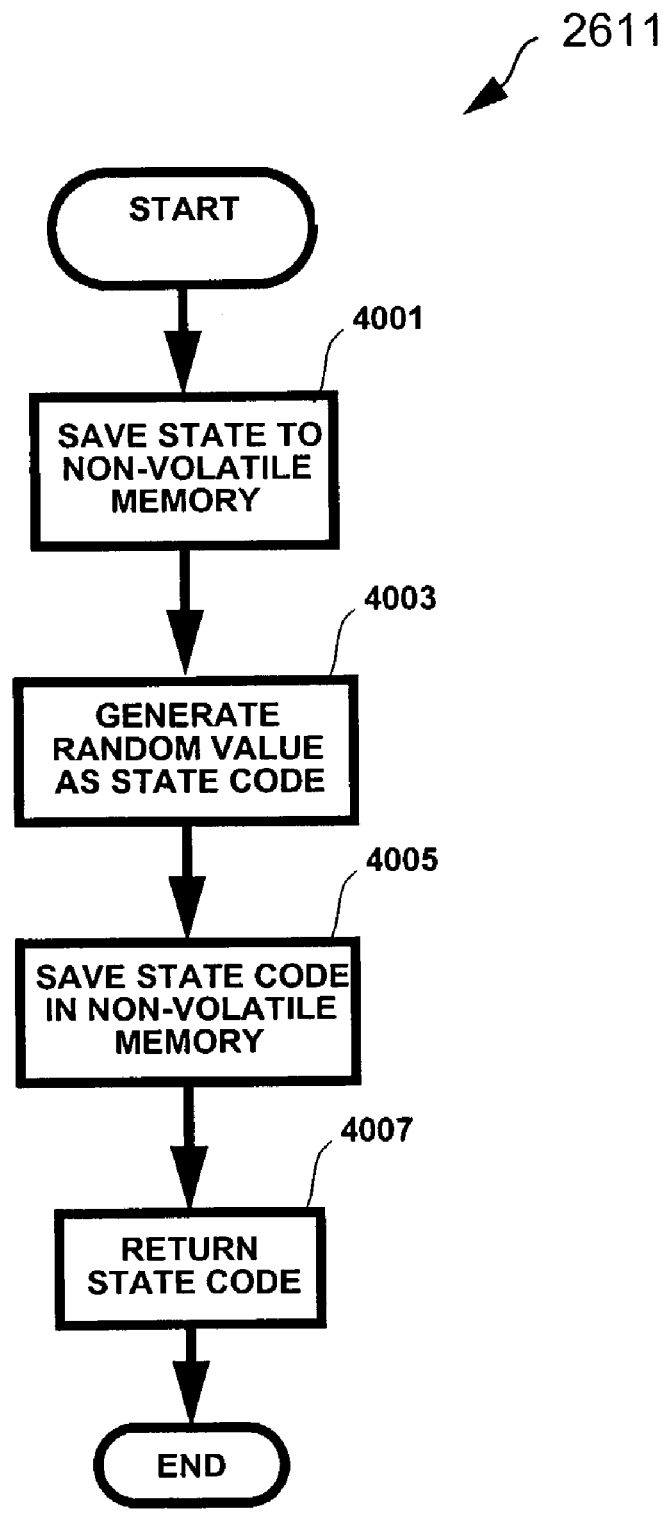
FIG. 40 is a flow diagram showing a save state process.

FIG. 40 is a flow diagram showing the save state process executed by the CPU 275 at sub-step 2611 of the proprietary instruction process of FIG. 26 in response to a SAVE STATE command. The save state process saves all volatile state information to non-volatile memory of the storage means 276 and then generates a random state code of a specified length. The process of sub-step 2611 is preferably implemented as part of the user interface card resident application program executing within the CPU 275 of the microprocessor 259 and being stored in the storage means 276. As seen in FIG. 40, the save state process of sub-step 2611 begins at sub-step 4001 where the CPU 275 saves state information associated with a present state of the user interface card resident application to non-volatile memory of the storage means 276. At the next sub-step 4003 the CPU 275 generates a random value to be used as a state code. The save state process of sub-step 2611 continues at the next sub-step 4005 where the state code is saved to the non-volatile memory of the storage means 276. The process of sub-step 2611 concludes at the next sub-step 4007 where the state code is sent to the CPU 1045 of the reader 300 and can be stored in memory 1046.

2.6.12 Restore State Process

Figure 41:
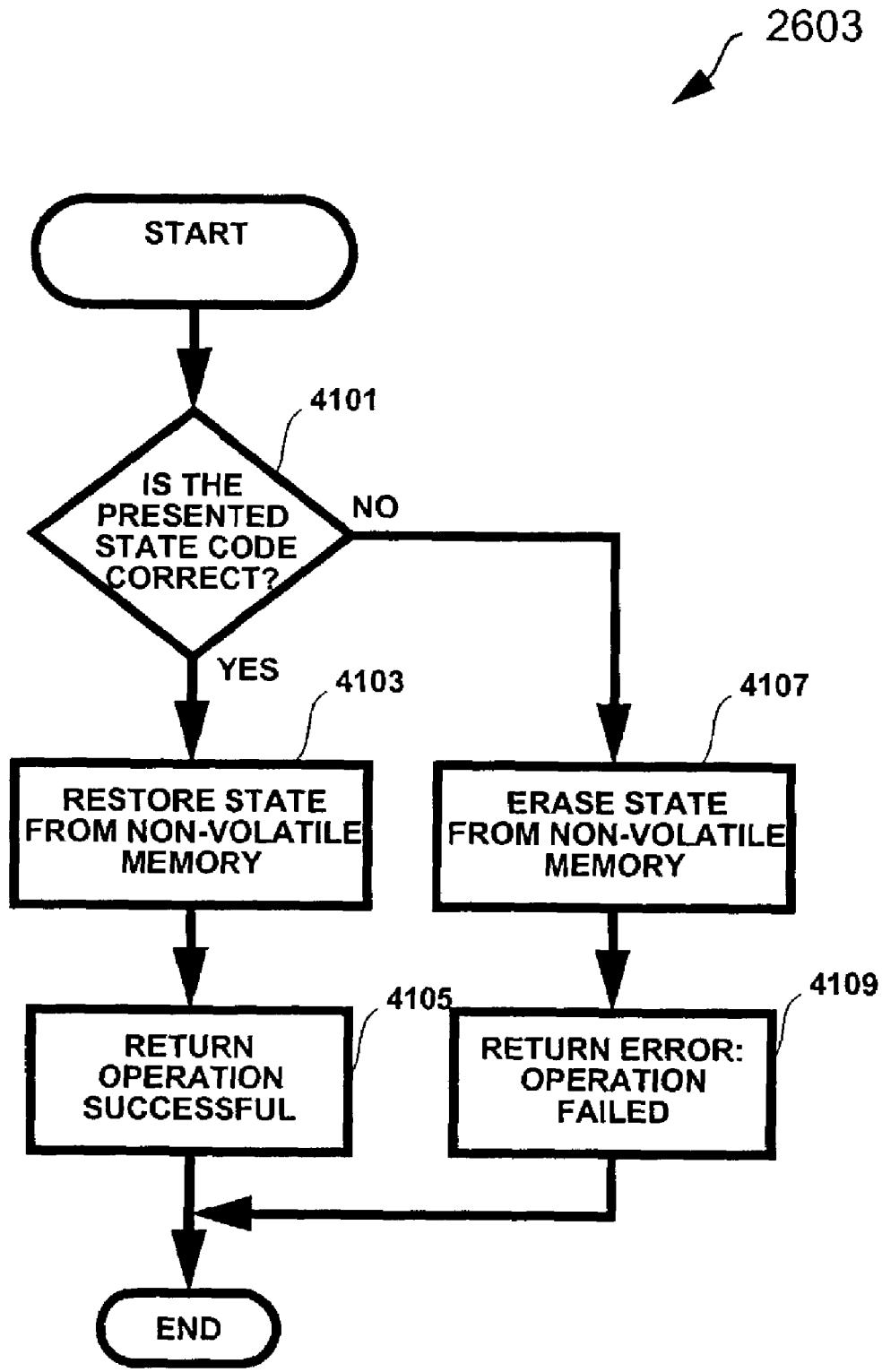
FIG. 41 is a flow diagram showing a restore state process.

FIG. 41 is a flow diagram showing the restore state process executed by the CPU 275 at sub-step 2603 of the proprietary instruction process of FIG. 26 in response to a RESTORE STATE command. The restore state process is configured to erase previous state information stored in non-volatile memory of the storage means 276 if the presented state code is not identical to the previous state code generated during a previous SAVE STATE command. The process of sub-step 2603 is preferably implemented as part of the user interface card resident application program executing within the CPU 275 of the microprocessor 259 and being stored in the storage means 276. As seen in FIG. 41, the restore state process of sub-step 2603 begins at sub-step 4101 where if the present state code stored in non-volatile memory 276 matches the state code contained in the data field of the RESTORE STATE application protocol data unit then the process proceeds to sub-step 4103. At sub-step 4103, the state information stored in volatile memory of the storage means 276 is replaced by the previously stored state information stored in the non-volatile memory of the storage means 276. Therefore, the save state process allows the user interface card resident application to return to the state that the application was in prior to the reader 300 being suspended to a low power state, for example, and it is not necessary for a user of the CPU card 100B to log back into the CPU card 100B. Such a function provides greater convenience to a user of the CPU card 100B. At the next sub-step 4105, the CPU 275 returns a successful operation identifier to the reader 300.

If the presented state code is not correct, at sub-step 4101, then the save state process of sub-step 2603 proceeds to sub-step 4107, where the state information previously stored in non-volatile memory of the storage means 276 is erased.

At the next sub-step 4109, an operations failed error is returned by the CPU 275 to the CPU 1045 of the reader 300 and the process of sub-step 2603 concludes. Therefore, the user interface card resident application returns to an initial default state and a user of the CPU card 100B is forced to log back in the CPU card 100B, for example. This function provides the card 100B with greater security since it prevents unauthorised readers from restoring the state information of the user interface card resident application and thus the CPU card 100B. The state of the CPU card 100B can only be restored when the present state code is equal to the previous state code supplied by the reader 300.

2.6.13 Select File Process

Figure 42:
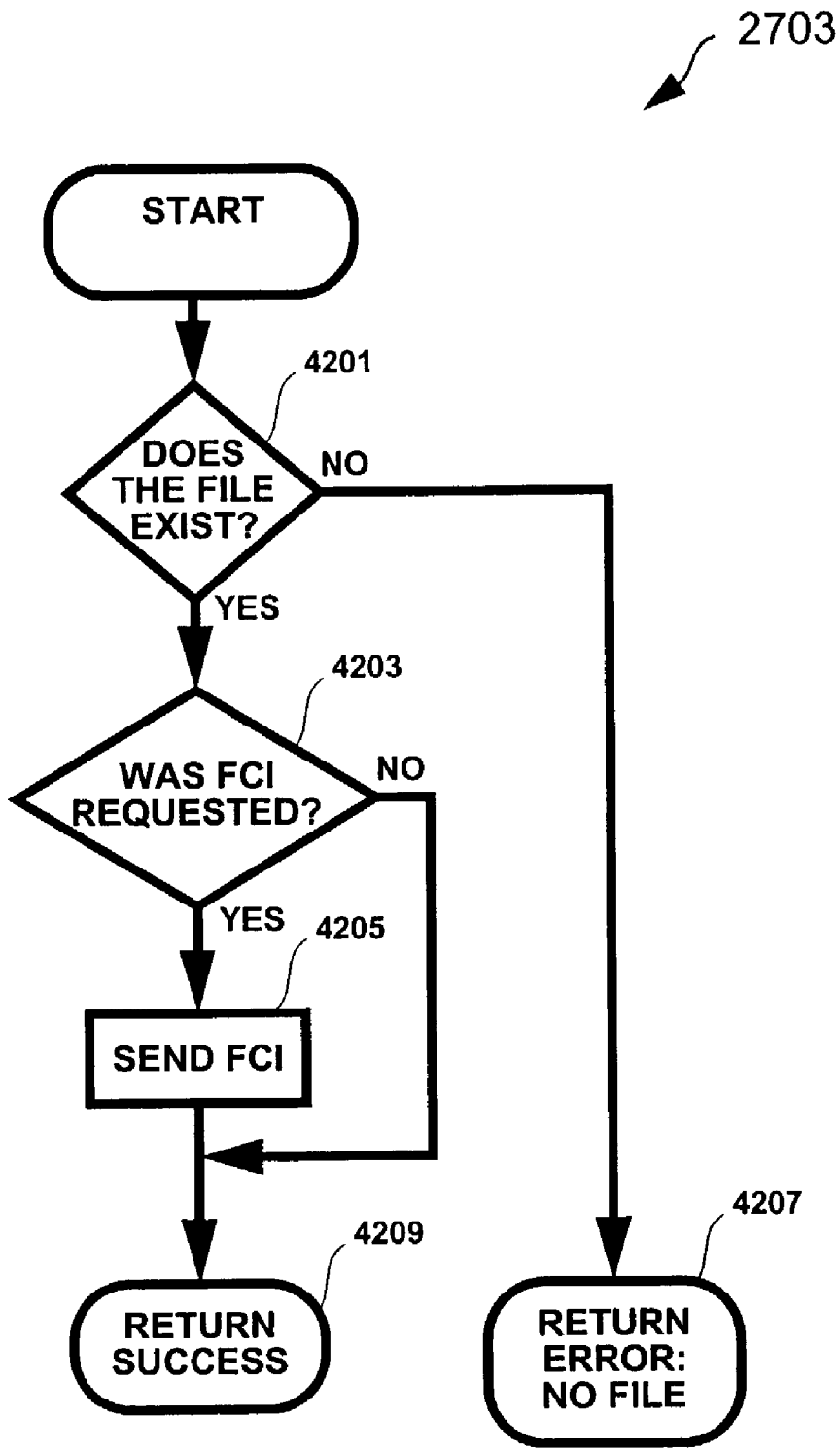
FIG. 42 is a flow diagram showing a select file process.

FIG. 42 is a flow diagram showing a select file process executed by the CPU 275 at sub-step 2703 in response to a SELECT FILE command being received by the user interface card resident application executing within the CPU 275. The process of sub-step 2703 is preferably implemented as part of the user interface card resident application program executing within the CPU 275 of the microprocessor 259 and being stored in the storage means 276. As seen in FIG. 42, the process of sub-step 2703 begins at sub-step 4201 where if the file identified in the data field of the select file application protocol data unit (as shown in table 40) exists then the process continues at sub-step 4203. Otherwise, a "no file" error is returned by the CPU 275 to the reader 300 and the process of sub-step 2703 concludes. At sub-step 4203, if file control information was requested by the parameter P2 field of the select file application protocol data unit then the process continues at the next sub-step 4205. Otherwise, the process of sub-step 2703 proceeds to sub-step 4209 where a success code is returned by the CPU 275 to the reader 300 and the process concludes. At sub-step 4205, file control information is sent by the CPU 275 to the CPU 1045 of the reader 300 and the process of sub-step 2703 concludes.

2.6.14 Read Binary Process

Figure 43:
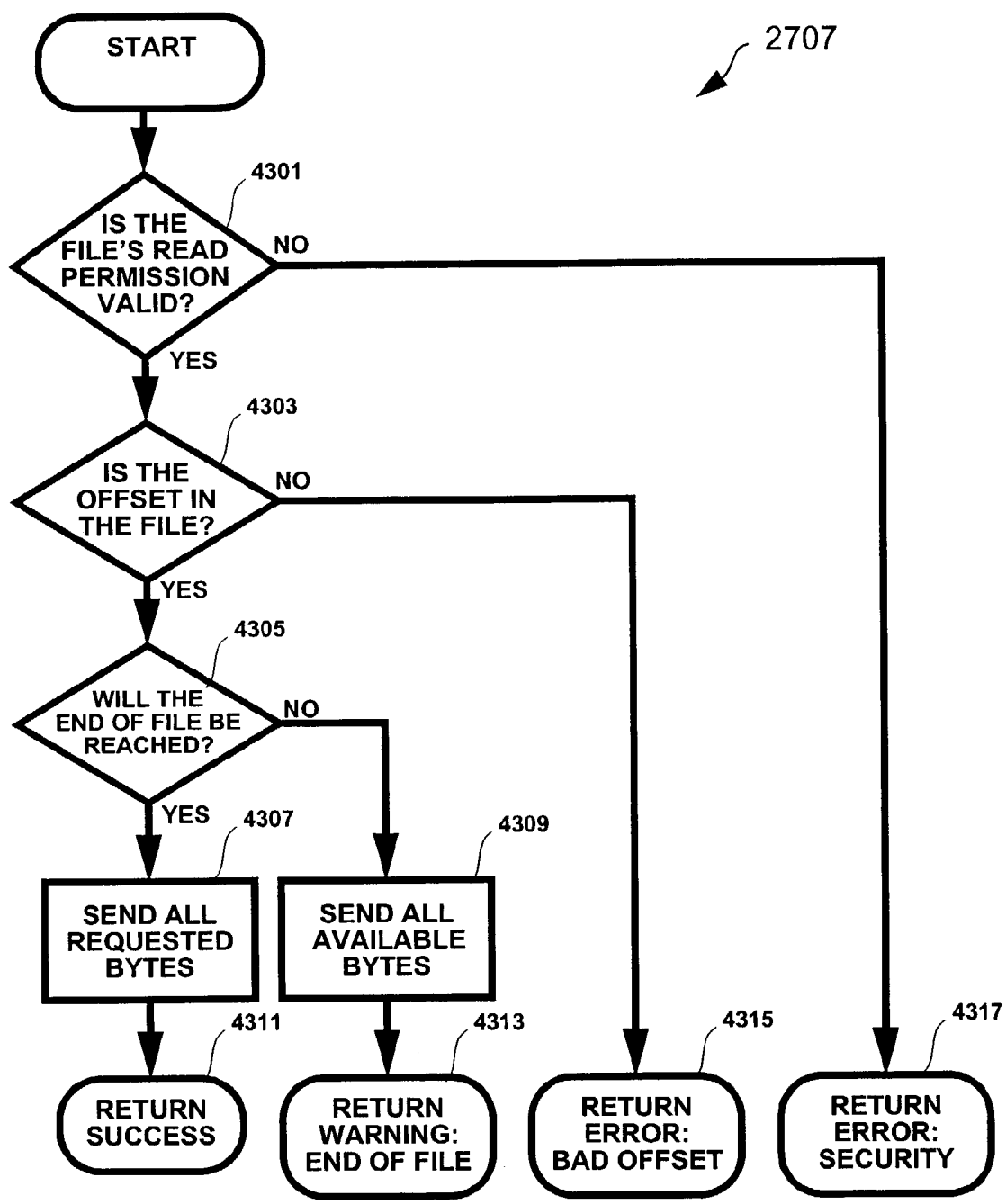
FIG. 43 is a flow diagram showing a read binary process.

FIG. 43 is a flow diagram showing a read binary process executed by the CPU 275 at sub-step 2707 in response to a READ BINARY command being received by the user interface card resident application executing within the CPU 275. The process of sub-step 2707 is preferably implemented as part of the user interface card resident application program executing within the CPU 275 of the microprocessor 259 and being stored in the storage means 276. As shown in FIG. 43, the read binary process is executed to read data from a currently selected elementary file stored in the storage means 276. The process of sub-step 2707 begins at sub-step 4301 where if the currently selected file is able to be read then the process proceeds to sub-step 4303. Otherwise, the process proceeds to sub-step 4317 where a security error is returned to the reader 300 by the CPU 275. At sub-step 4303 if the offset identified by the P1 and P2 parameters of the read binary application protocol data unit is valid then the process proceeds to sub-step 4305. Otherwise, the process of sub-step 2707 proceeds to sub-step 4315 where a bad offset error identifier is returned to the reader 300 by the CPU 275. At sub-step 4305 if the number of bytes requested by the Le field of the read binary application protocol data unit are able to be read by the CPU 275, then the process proceeds to sub-step 4307. Otherwise, the process proceeds to sub-step 4309. At sub-step 4307, all of the bytes of the requested file are sent to the reader 300 by the CPU 275. The process continues at sub-step 4311 where a success code identifier is returned to the reader 300 by the CPU 275 and the process of sub-step 2707 concludes. At sub-step 4309, all available bytes of the requested file are sent to the user interface card resident application by the CPU 275. At the next sub-step 4313 an end of file warning is returned by the CPU 275 and the process of sub-step 2707 concludes.

2.6.15 Write Binary Process

Figure 44:
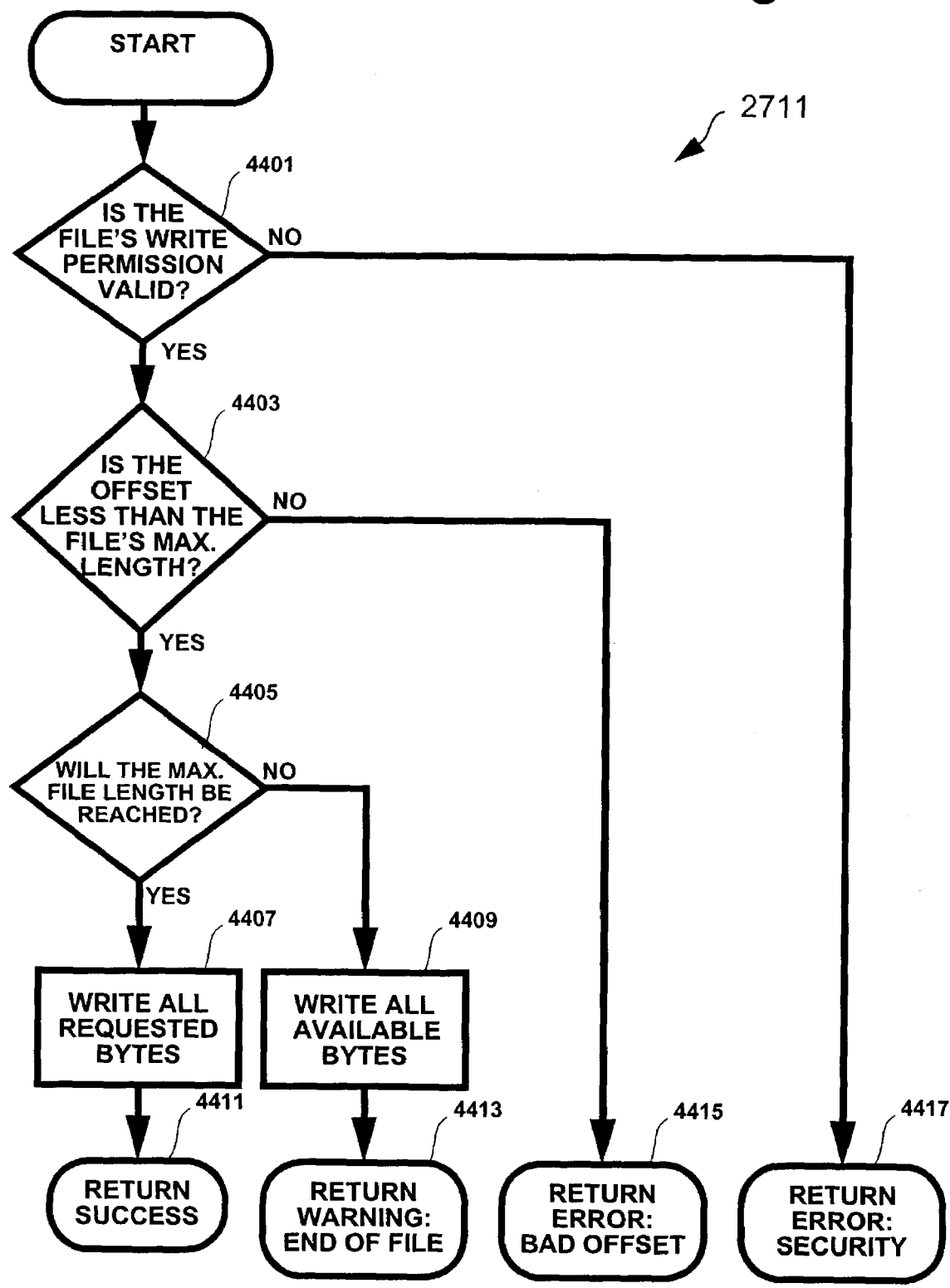
FIG. 44 is a flow diagram showing a write binary process.

FIG. 44 is a flow diagram showing a write binary process executed by the CPU 275 at sub-step 2711 in response to a WRITE BINARY command being received by the user interface card resident application executing within the CPU 275. The process of sub-step 2711 is preferably implemented as part of the user interface card resident application program executing within the CPU 275 of the microprocessor 259 and being stored in the storage means 276. The write binary process is executed at sub-step 2711 to write data to a currently selected elementary file. As seen in FIG. 44, the process of sub-step 2711 begins at sub-step 4401 where if the currently selected file is able to be written to by the CPU 275 then the process proceeds to sub-step 4403. Otherwise, the process proceeds to sub-step 4417 where a security error identifier is returned to the reader 300 by the CPU 275. At sub-step 4403 if the offset identified by the P1 and P2 parameters of the write binary application protocol data unit are less than the maximum length of the selected file then the process of sub-step 2711 proceeds to sub-step 4405. Otherwise, the process of sub-step 2711 proceeds to sub-step 4415 where a bad offset error identifier is returned to the reader 300 by the CPU 275. At sub-step 4405 if the number of bytes requested by the data field of the write binary application protocol data unit are able to be written by the CPU 275, then the process proceeds to sub-step 4407. Otherwise, the process proceeds to sub-step 4409. At sub-step 4407 all of the bytes of the requested file are written to by the CPU 275. The process continues at sub-step 4411 where a success code identifier is returned to the reader 300 by the CPU 275 and the process of sub-step 2711 concludes. At sub-step 4409, all available bytes of the requested file are written by the CPU 275 to the selected file stored in the storage means 276. At the next sub-step 4413 an end of file warning identifier is returned by the CPU 275 to the reader 300 and the process of sub-step 2711 concludes.

2.6.16 Erase Binary Process

Figure 45:
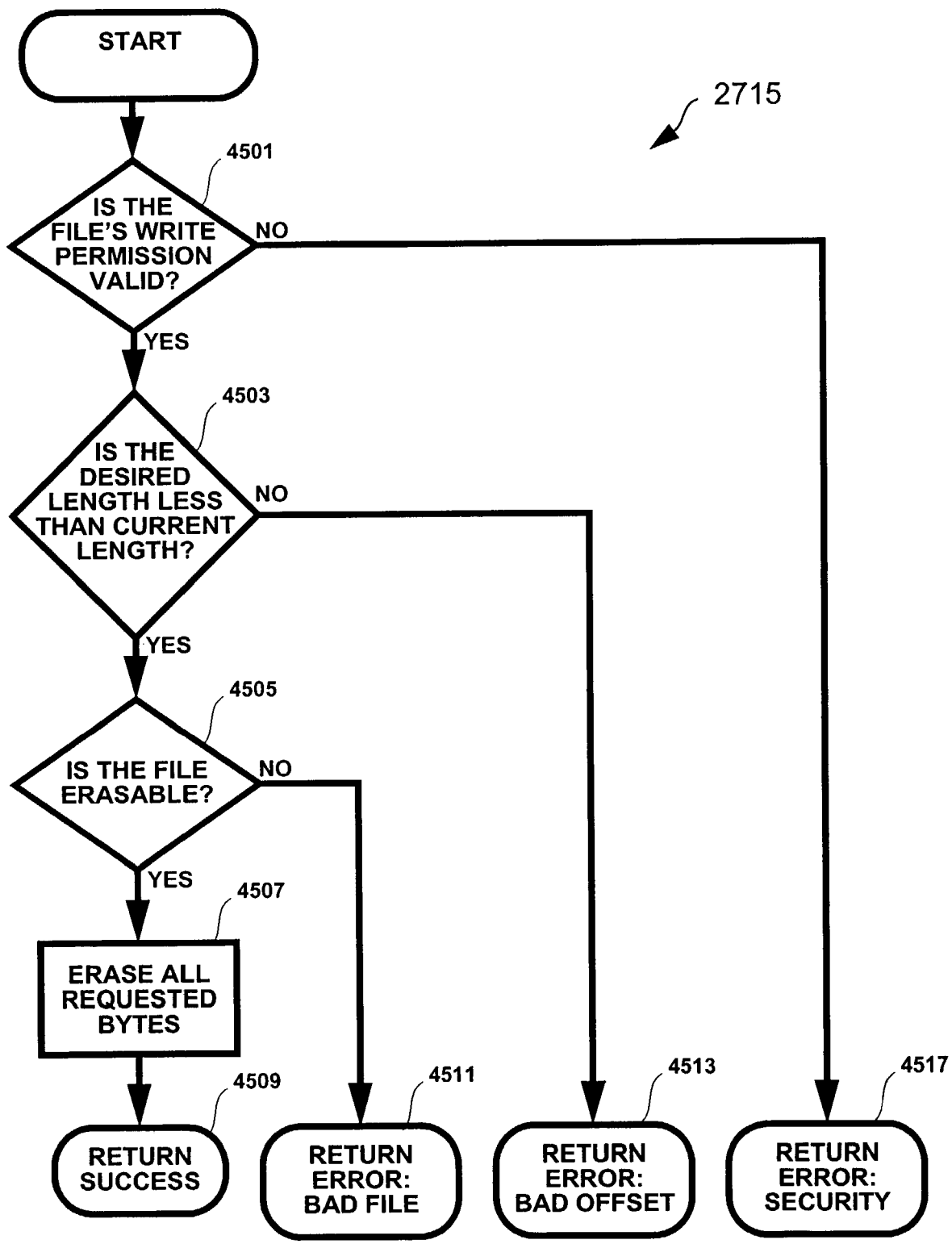
FIG. 45 is a flow diagram showing an erase binary process.

FIG. 45 is a flow diagram showing an erase binary process executed by the CPU 275 at sub-step 2715 in response to an ERASE BINARY command being received by the user interface resident application executing within the CPU 275. The process of sub-step 2715 is preferably implemented as part of the user interface card resident application program executing within the CPU 275 of the microprocessor 259 and being stored in the storage means 276. The erase binary process is executed at sub-step 2715 to truncate a currently selected elementary file stored in the storage means 276, depending on the parameters received with the ERASE BINARY command. The process of sub-step 2715 begins at sub-step 4501 where if the write permission of the currently selected file is valid then the process proceeds to sub-step 4503. Otherwise, the process proceeds to sub-step 4517 where a security error is returned to the reader 300 by the CPU 275. At sub-step 4503 if the desired length of the file identified by the offsets of the P1 and P2 parameters of the erase binary application protocol data unit is less than the current length of the file then the process proceeds to sub-step 4505. Otherwise, the process of sub-step 2715 proceeds to sub-step 4513 where a bad offset error identifier is returned to the reader 300 by the CPU 275. At sub-step 4505 if the selected file is erasable (i.e. it is not write protected and an associated 'erasable' flag is set) then the process proceeds to sub-step 4507. Otherwise, the process proceeds to sub-step 4511. At sub-step 4507 all of the requested bytes are erased from the selected file by the CPU 275. The process continues at sub-step 4509 where a success code identifier is returned to the reader 300 by the CPU 275 and the process of sub-step 2715 concludes. At sub-step 4511, a bad file warning is returned to the reader 300 by the CPU 275 and the process of sub-step 2715 concludes.

2.6.17 Get Challenge Instruction

2.6.17.1 Get Challenge

Figure 46:
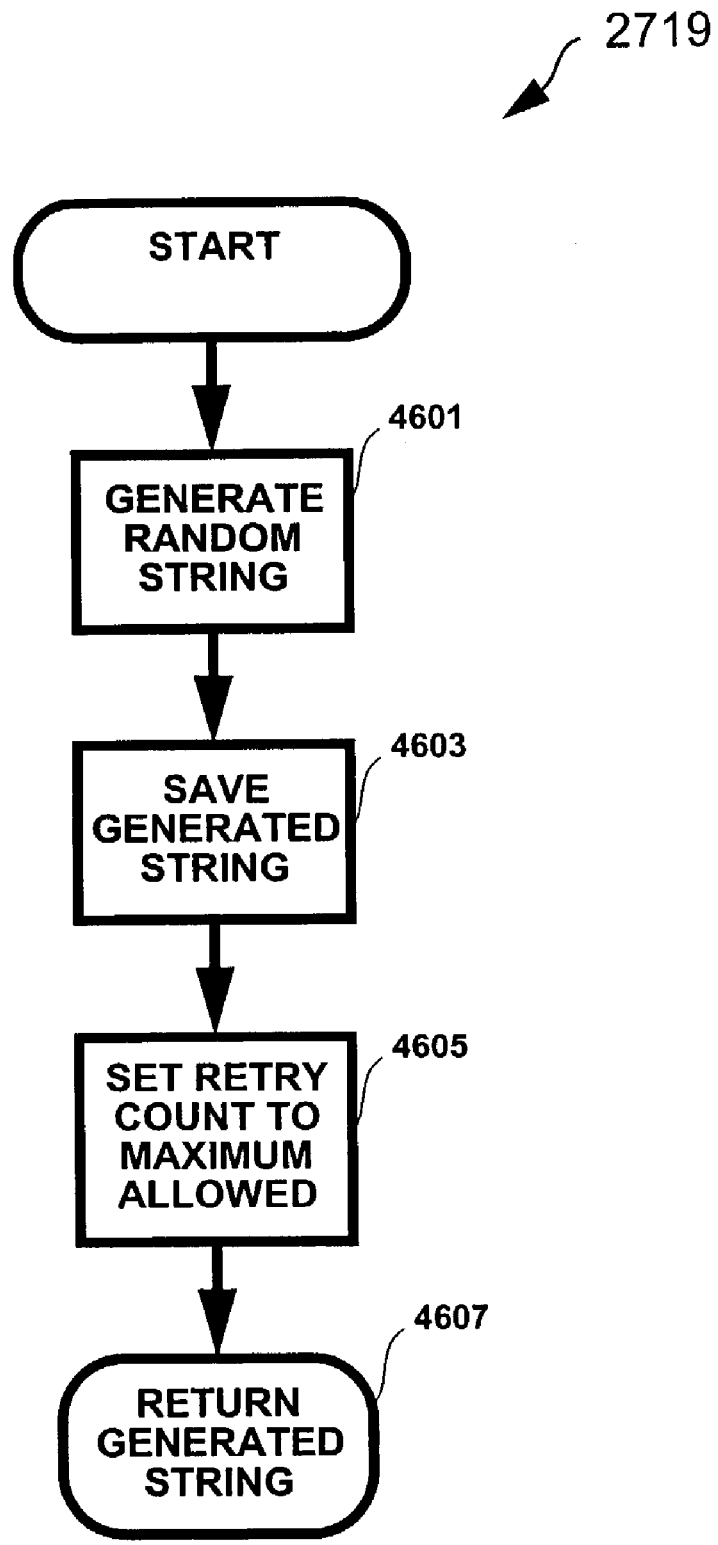
FIG. 46 is a flow diagram showing a get challenge process.

FIG. 46 is a flow diagram showing a get challenge process executed by the CPU 275 at sub-step 2719 in response to a GET CHALLENGE command being received by the user interface card resident application executing within the CPU 275. The process of sub-step 2719 is preferably implemented as part of the user interface card resident application program executing within the CPU 275 of the microprocessor 259 and being stored in the storage means 276. The get challenge process is executed to provide challenge data in order to allow the security level of the CPU card 100B to be changed. The process of sub-step 2719 begins at sub-step 4601 where the CPU 275 generates a random data string. At the next step 4603 the data string is saved to the storage means 276. Then at sub-step 4605 the retry counter stored in the storage means 276 is set to maximum. The process of sub-step 2719 concludes at sub-step 4607 where the generated data string is sent to the CPU 1045 of the reader 300.

2.6.17.2 External Authenticate

Figure 47:
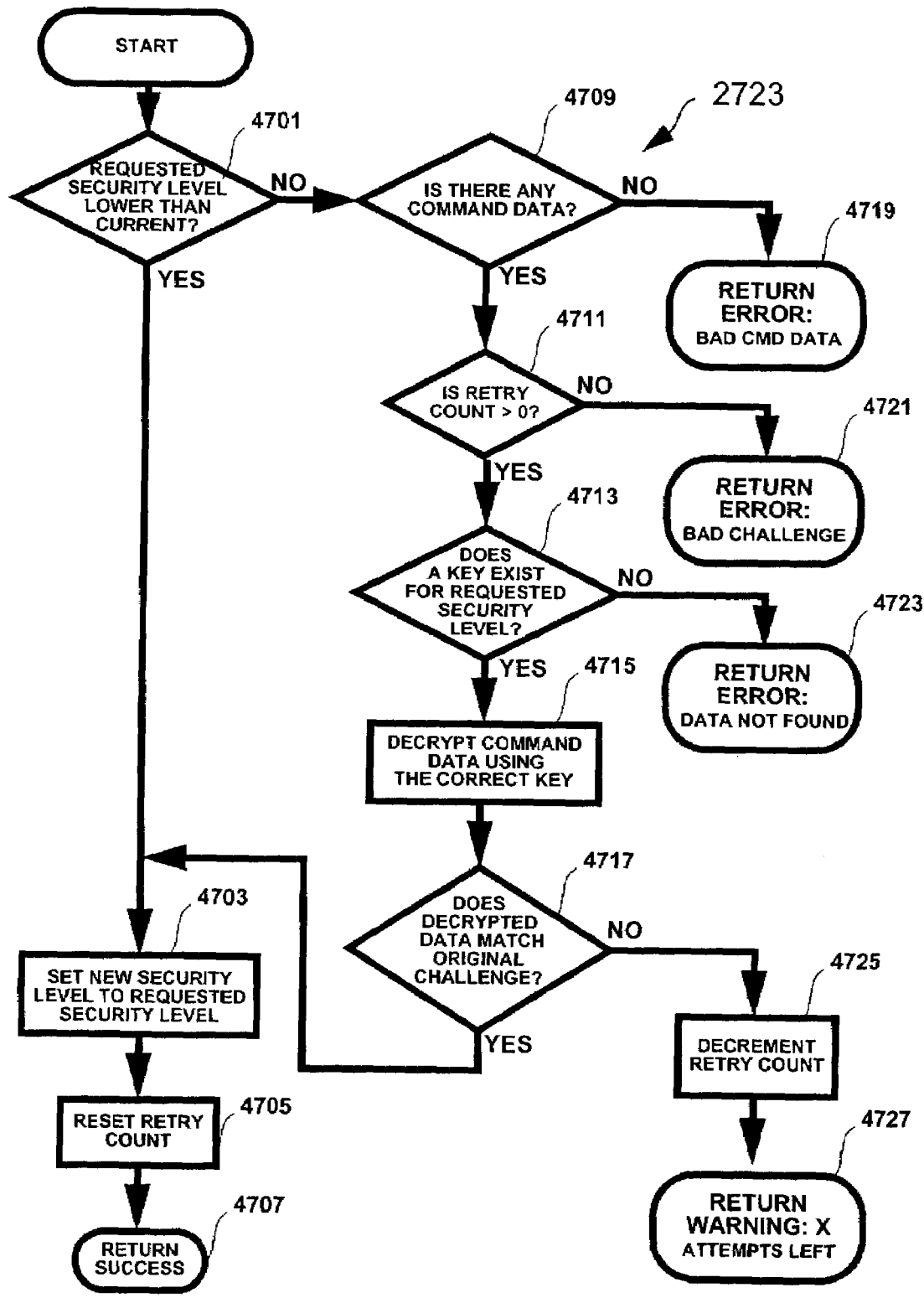
FIG. 47 is a flow diagram showing an external authenticate process.

FIG. 47 is a flow diagram showing an external authenticate process executed by the CPU 275 at sub-step 2723 in response to a EXTERNAL AUTHENTICATE command being received by the user interface card resident application executing within the CPU 275. The process of sub-step 2723 is preferably implemented as part of the user interface card resident application program executing within the CPU 275 of the microprocessor 259 and being stored in the storage means 276. The external authenticate process decrypts presented data using a private key associated with a requested security level. The process of sub-step 2723 begins sub-step 4701 where if the requested security level is lower than the current security level then the process proceeds sub-step 4703. Otherwise, the process proceeds to 4709. At sub-step 4703 the security level of the CPU card 100B is set to the requested security level by the CPU 275. The process of sub-step 2723 continues at the next sub-step 4705 where the retry counter stored in the storage means 276 is reset. At the next sub-step 4707 a success code identifier is returned by the CPU 275.

At sub-step 4709 if there is any command data associated with the EXTERNAL AUTHENTICATE command then the process proceeds to sub-step 4711. Otherwise, the process proceeds to sub-step 4719 where a bad command data error identifier is returned by the CPU 275. At sub-step 4711 if the retry counter is greater than zero then process proceeds to sub-step 4713. Otherwise, the process proceeds to sub-step 4721 where a bad challenge error identifier is returned to the reader 300 by the CPU 275. At sub-step 4713 if a private key exists for the requested security level then the process proceeds to sub-step 4715. Otherwise, the process proceeds to sub-step 4723 where a data not found error is returned to the reader 300 by the CPU 275. At sub-step 4715, the command data associated with the external authenticate command is decrypted using the private key. The process of sub-step 2723 continues at the next sub-step 4717 where if the decrypted data matches the original challenge data then the process proceeds to sub-step 4703. Otherwise, the process of step 2723 proceeds to sub-step 4725 where the retry count is decremented. The process of sub-step 2723 concludes at the next sub-step 4727 where the CPU 275 generates the number of attempts remaining.

The aforementioned preferred methods comprise a particular control flow. There are many other variants of the preferred methods which use different control flows without departing the spirit or scope of the invention. Furthermore one or more of the sub-steps of the preferred method(s) may be executed in parallel rather sequential.

The foregoing describes only some embodiments of the present invention, and modifications and/or changes can be made thereto without departing from the scope and spirit of the invention, the embodiments being illustrative and not restrictive. For example, the user interface elements 114, 154 can be positioned otherwise than on the smart card 100. The user interface elements 114, 154 may, for example, be displayed on a display device (e.g. 616).

The invention claimed is:

1. A method of processing a message using a first software application and a second software application, wherein each of said first and second software applications are resident in a memory means of an electronic card and are configured to be executed on said electronic card, wherein said electronic card is constructed for coupling to a reading device to facilitate reading of said memory means said reading device is configured for receiving said message from a third software application executing on a remote apparatus, and wherein said message comprises a code identifying said first application or said second application, said method comprising the steps of:
   using said first software application to determine which of said first and second software applications is identified in said message; and
   if said first software application is identified in said message, determining whether a first set of conditions is satisfied and processing said message using said first software application if said first set of conditions is satisfied, or
   if said second software application is identified in said message, determining whether a second set of conditions is satisfied and using said first software application to pass said message to said second software application if said second set of conditions is satisfied, wherein said second set of conditions are secure access conditions.

2. The method according to claim 1, wherein said secure access conditions include whether a user of said electronic card has been verified by a personal identification number.

3. The method according to claim 1, wherein said secure access conditions include whether a secure communications link has been established between said third application and one of said first and second software applications.

4. The method according to claim 1, wherein said secure access conditions include a general denial of processing.

5. The method according to claim 1, wherein said secure access conditions include a general allowance of processing.

6. The method according to claim 1, wherein said electronic card has one or more user interface elements formed on a surface thereof.

7. The method according to claim 6, wherein said first application is configured to process reading signals generated from a user selection of one or more of said user interface elements.

8. The method according to claim 1, further comprising the step of sending a response from said first software application or said second software application to said third software application.

9. The method according to claim 8, further comprising the step of applying a signature to said response.

10. The method according to claim 8, further comprising the step of encrypting said response.

11. The method according to claim 10, wherein said encryption is performed using a first security key stored in said memory means.

12. An electronic card for processing a message using a first software application and a second software application, wherein each of said first and second software applications are resident in a memory means of said electronic card and are configured to be executed on said electronic card, wherein said electronic card is constructed for coupling to a reading device to facilitate reading of said memory means and said reading device is configured for receiving said message from a third application executing on a remote apparatus, and wherein said message comprises a code identifying said first application or said second application, said electronic card comprising:
   processor means for using said first software application to determine which of said first and second software applications is identified in said message, and
   if said first software application is identified in said message, determining whether a first set of conditions is satisfied and processing said message using said first software application if said first set of conditions is satisfied, or
   if said second software application is identified in said message, determining whether a second set of conditions is satisfied and using said first software application to pass said message to said second software application if said second set of conditions is satisfied, wherein said second set of conditions are secure access conditions.

13. A first software application resident in an electronic card and configured for processing a message, wherein said first software application and a second software application are resident in a memory means of said electronic card and are configured to be executed on said electronic card, wherein said electronic card is adapted for coupling to a reading device to facilitate reading of said memory means and said reading device is configured for communication for receiving said message from a third application executing on a remote apparatus, and wherein said message comprises a code identifying said first application or said second application, said first software application comprising:
   code for using said first software application to determine which of said first and second software applications is identified in said message; and
   if said first software application is identified in said message, determining whether a first set of conditions is satisfied and processing said message using said first software application if said first set of conditions is satisfied, or
   if said second software application is identified in said message, determining whether a second set of conditions is satisfied and using said first software application to pass said message to said second software application if said second set of conditions is satisfied, wherein said second set of conditions are secure access conditions.

* * * * *

UNITED STATES PATENT AND TRADEMARK OFFICE
CERTIFICATE OF CORRECTION

PATENT NO. : 7,194,768 B2 Page 1 of 1
APPLICATION NO. : 10/323802
DATED : March 20, 2007
INVENTOR(S) : Kisliakov It is certified that error appears in the above-identified patent and that said Letters Patent is hereby corrected as shown below:

COLUMN 7:
Line 40, "card 101A" should read -- card 100A --.

COLUMN 79:
Line 28, "means said" should read -- means and said --.

Signed and Sealed this

Twenty-seventh Day of November, 2007

JON W. DUDAS
*Director of the United States Patent and Trademark Office*